(12) United States Patent  (10) Patent No.: US 8,199,397 B2
Usui et al.  (45) Date of Patent: Jun. 12, 2012

(54) NEGATIVE DISPERSION MIRROR AND MODE-LOCKED SOLID-STATE LASER APPARATUS INCLUDING THE MIRROR

(75) Inventors: Makio Usui, Saitama (JP); Tadashi Kasamatsu, Kanagawa-ken (JP); Shogo Yamazoe, Kanagawa-ken (JP)

(73) Assignees: Fujifilm Corporation, Tokyo (JP); Fujinon Corporation, Saitama-Shi (JP)

( * ) Notice: Subject to any disclaimer, the term of this patent is extended or adjusted under 35 U.S.C. 154(b) by 365 days.

(21) Appl. No.: 12/239,381

(22) Filed: Sep. 26, 2008

(65) Prior Publication Data

US 2009/0086771 A1    Apr. 2, 2009

(30) Foreign Application Priority Data

Sep. 28, 2007 (JP) ................ 2007-254237
Sep. 28, 2007 (JP) ................ 2007-254238
Sep. 28, 2007 (JP) ................ 2007-254239

(51) Int. Cl.
  *H01S 3/00*   (2006.01)
(52) U.S. Cl. ............ 359/337.5; 359/584; 359/615; 359/883
(58) Field of Classification Search ............ 359/584, 359/337.5
  See application file for complete search history.

(56) References Cited

U.S. PATENT DOCUMENTS

| 5,912,915 A | 6/1999 | Reed et al. |
| 6,055,261 A | 4/2000 | Reed et al. |
| 6,081,379 A * | 6/2000 | Austin et al. ............ 359/584 |
| 6,154,318 A * | 11/2000 | Austin et al. ............ 359/584 |
| 6,256,434 B1 * | 7/2001 | Matuschek et al. ...... 385/37 |
| 2004/0047387 A1* | 3/2004 | Bunting et al. ............ 372/70 |

FOREIGN PATENT DOCUMENTS

| JP | 2-23302 A | 1/1990 |
| JP | 11-168252 A | 6/1999 |
| JP | 2000-138407 A | 5/2000 |
| JP | 2001-525999 A | 12/2001 |
| JP | 2002-528906 A | 9/2002 |
| WO | WO-00/11501 A1 | 3/2000 |

(Continued)

OTHER PUBLICATIONS

C. Y. Liao et al., "Negative Dispersion Mirrors in Ta2O5/SiO2 for Femtosecond Ti-Sapphire Lasers by Using Gires-Tournois Interferometers," Chin. Phys. Lett., vol. 22, No. 6 (2005), p. 1443-1445.*

(Continued)

*Primary Examiner* — Jessica Stultz
*Assistant Examiner* — Xnning Niu
(74) *Attorney, Agent, or Firm* — Birch, Stewart, Kolasch & Birch, LLP

(57) ABSTRACT

In a mirror including a substrate and a dielectric multilayer coating structure formed on the substrate, the multilayer coating structure includes two mirror-function layer portions, each formed by a plurality of layers deposited one on another, and a cavity layer that is arranged between the two mirror-function layer portions, and which causes light having a predetermined wavelength to resonate between the two mirror-function layer portions. Further, a dispersion value with respect to the light having the predetermined wavelength is in the range of $-600$ $fs^2$ to $-3000$ $fs^2$ and a reflectance with respect to the light having the predetermined wavelength is in the range of 97% to 99.5%.

14 Claims, 31 Drawing Sheets

FOREIGN PATENT DOCUMENTS

WO     WO-00/25154 A1     5/2000

OTHER PUBLICATIONS

Szipocs et al., "Chirped multilayer coatings for broadband dispersion control in femtosecondl lasers", Optics Letters, vol. 19, No. 3, pp. 201-203, Feb. 1, 1994.

Kuhl et al., "Compression of Femtosecond Optical Pulses with Dielectric Multilayer Interferometers", IEEE Transaction on Quantum Electronics, vol. QE-22, No. 1, pp. 182-185, Jan. 1986.

Anonymous: "What's new in OptiLayer in 2010 (major updates, version 8.18)," pp. 1-29, OptiLayer Thin Film Software, Retrieved on Oct. 6, 2010 from the Internet: URL:http://www.optilayer.com/whats_new.htm, XP-002603805.

Kholokhonova, et al., "Method for calculating a negative-dispersion resonator-type multilayer mirror," Quantum Electronics, vol. 35, No. 11, Nov. 2005, pp. 1053-1056, XP-002603803.

Liao et al., "Negative Dispersion Mirrors in $Ta_2O_5/SiO_2$ for Femtosecond Ti:Sapphire Lasers by Using Gires-Tournois Interferometers," Chinese Physics Letters, vol. 22, No. 6, Jun. 1, 2005, pp. 1443-1445, XP-020085213.

Pervak, et al., "Synthesis and manufacturing the mirrors for ultrafast optics," Proceedings of the SPIE—The International Society for Optical Engineering USA, vol. 5963, Sep. 30, 2005, pp. 59631P-1-59631P-10, XP-002603804.

Gomes et al., "Picosecond SESAM-Based Ytterbium Mode-Locked Fiber Lasers", IEEE Journal Topics in Quantum Electronics, Feb. 2004, vol. 10, No. 1, pp. 129-136.

JP-2007-254237 Office Action dated Mar. 6, 2012.

\* cited by examiner

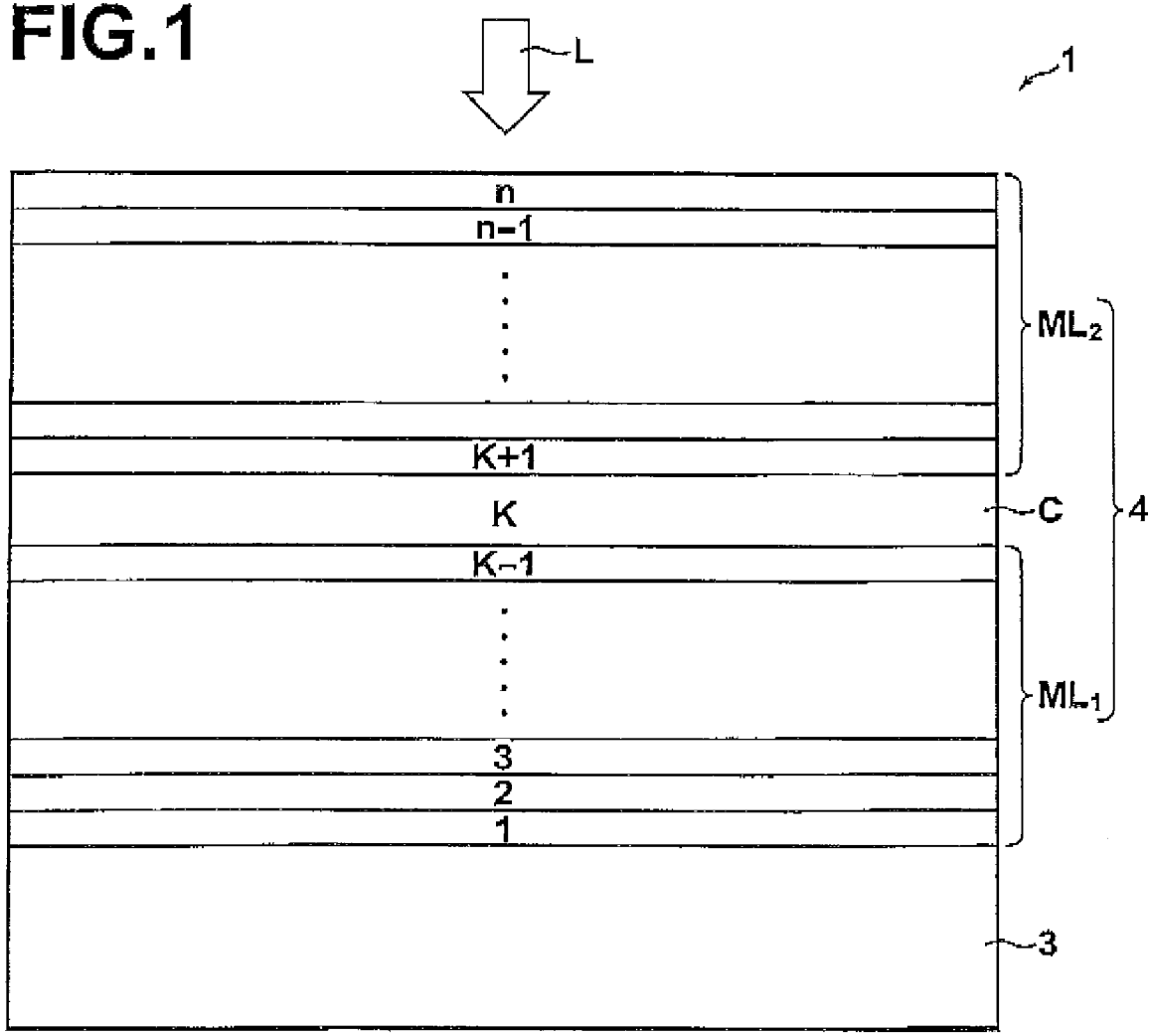

DESIGN EXAMPLE 1-1

DESIGN EXAMPLE 1-1

DESIGN EXAMPLE 1-3

DESIGN EXAMPLE 1-4

DESIGN EXAMPLE 1-4

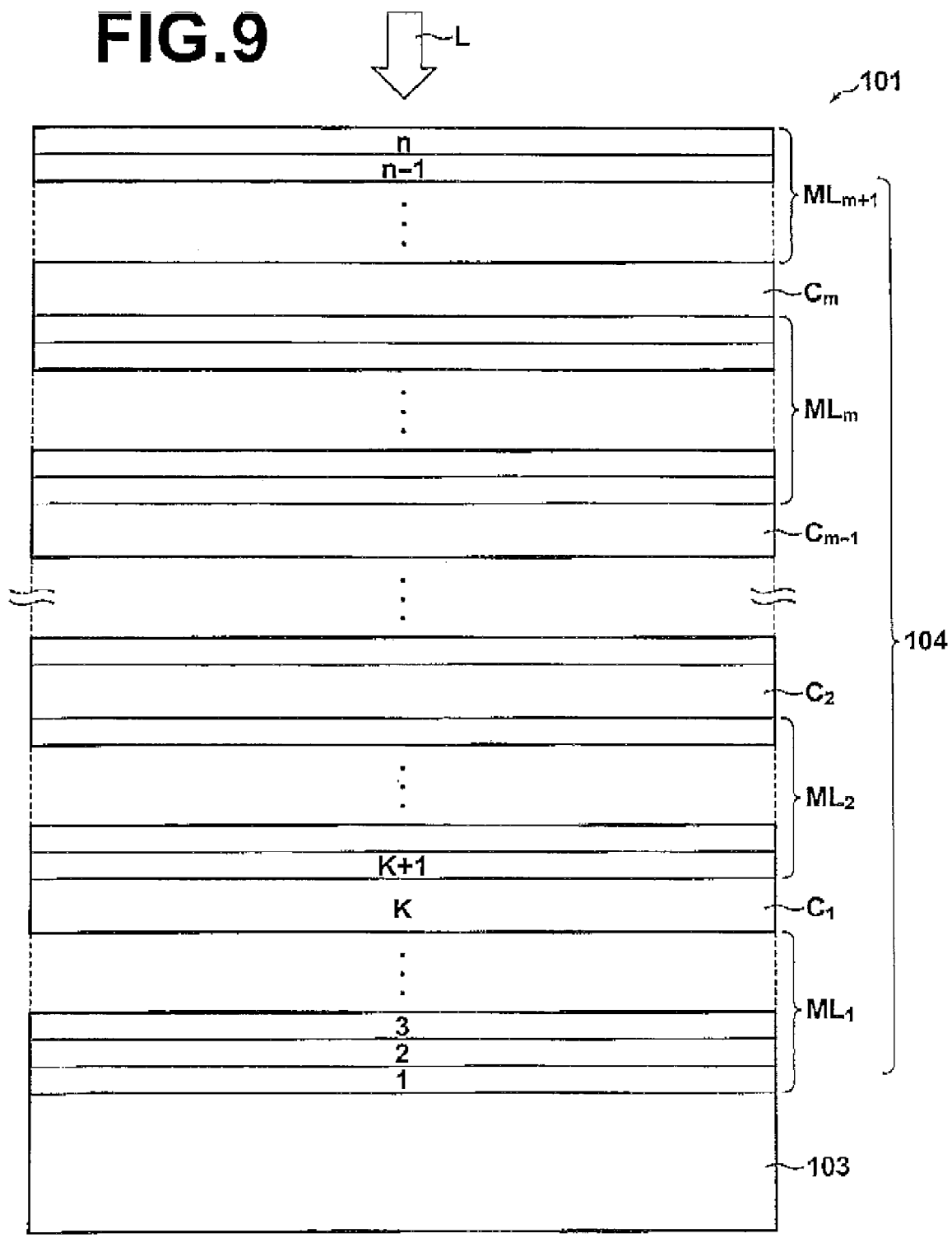

DESIGN EXAMPLE 2-4

DESIGN EXAMPLE 2-4

— REFLECTANCE
---- NEGATIVE DISPERSION VALUE

DESIGN EXAMPLE 2-6

DESIGN EXAMPLE 2-6

— REFLECTANCE
---- NEGATIVE DISPERSION VALUE

DESIGN EXAMPLE 2-8

DESIGN EXAMPLE 2-8

—— REFLECTANCE
---- NEGATIVE DISPERSION VALUE

DESIGN EXAMPLE 2-11

DESIGN EXAMPLE 2-11

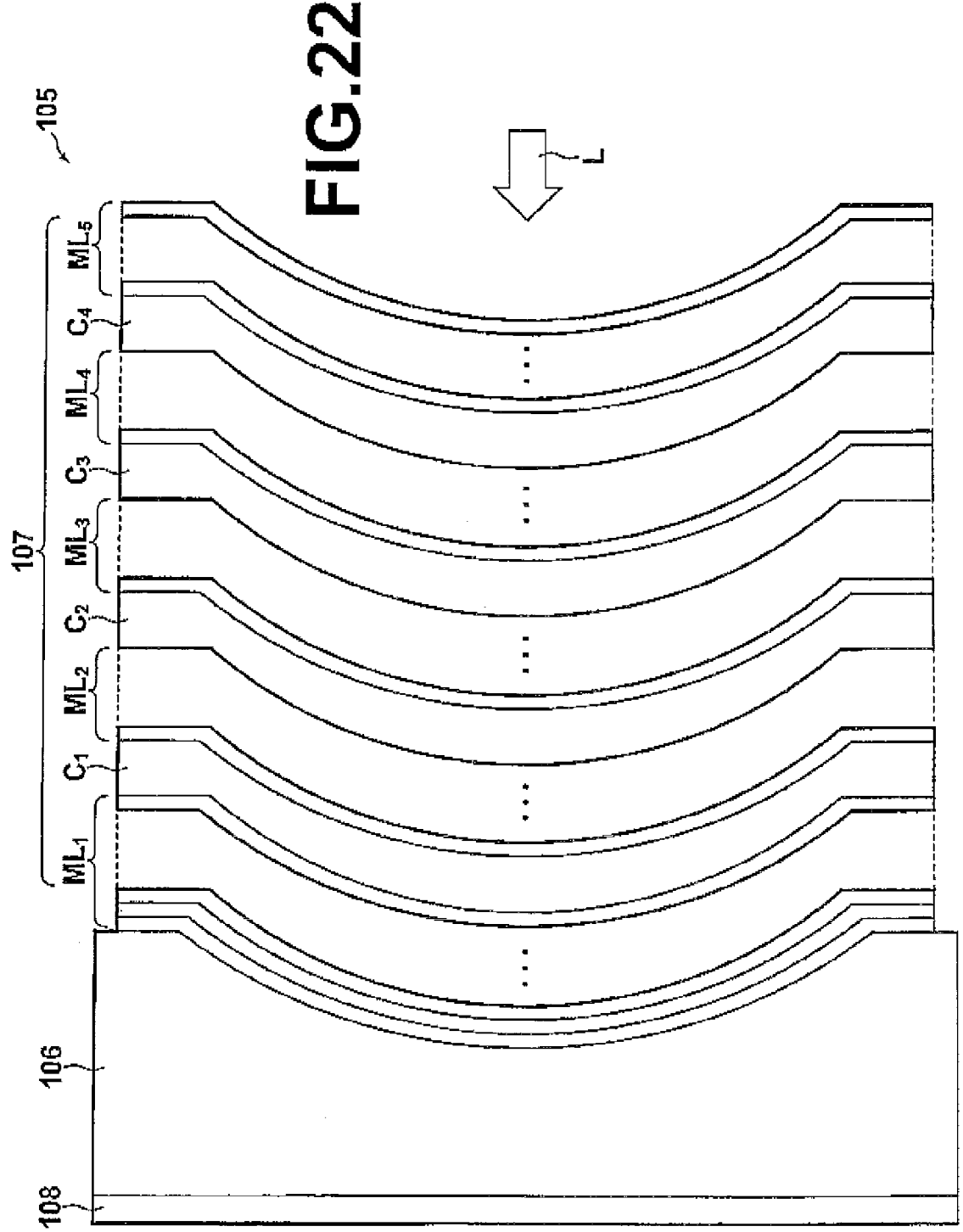

NEGATIVE DISPERSION MIRROR AND MODE-LOCKED SOLID-STATE LASER APPARATUS INCLUDING THE MIRROR

BACKGROUND OF THE INVENTION

1. Field of the Invention

The present invention relates to a negative dispersion mirror and a solid-state laser apparatus including the negative dispersion mirror. Particularly, the present invention relates to a soliton-type mode-locked solid-state laser apparatus, which has a small size, and which can perform short-pulse operation.

2. Description of the Related Art

Conventionally, solid-state laser apparatuses using semiconductor lasers (LD), as excitation light sources (pump light sources), and solid-state laser media (laser crystal, ceramics or glass) doped with rare-earth ions or transition-metal ions, as laser media, have actively been developed. Especially, application of short-pulse laser apparatuses, which generate so-called short pulse light (short pulsed light) in the picosecond to femtosecond regime, to various fields such as medicine, biology, machine industries and measurement has been sought and proposed. Further, some of the short-pulse laser apparatuses have been practically used after their efficiency was confirmed.

This kind of laser apparatus generates short pulses by an operation called as mode-locking. In brief, the mode-locking is a phenomenon in which when a laser oscillates, the phases of all of a multiplicity of longitudinal modes (axial modes) are locked in the frequency regime (relative phase difference=0). Therefore, multimode interference between the longitudinal modes occurs and extremely short pulses are generated in the time regime.

Particularly, in soliton-type mode-locking, which is an example of CW (continuous wave oscillation) mode-locking, negative group-velocity dispersion in a laser cavity (resonator) and self-phase modulation mainly in a laser medium are combined and pulses in the femtosecond regime can be generated.

Basically, the solid-state laser apparatus that can realize the soliton-type mode-locking includes a solid-state laser medium, a saturable absorber mirror and a negative group-velocity dispersion device, which are provided in a cavity (resonator). In the following description, the "negative group-velocity dispersion" may simply be referred to as "negative dispersion".

Conventionally, one of a prism pair (a pair of prisms), a diffraction grating pair (a pair of diffraction gratings), a negative dispersion mirror and the like or a combination thereof has been used as the negative group-velocity dispersion device.

As the negative dispersion mirror, there are a chirp-type mirror (chirp mirror) and a GTI (Gires-Tournois interferometer) type mirror. The chirp-type mirror performs negative dispersion compensation (in other words, compensates positive dispersion by performing negative dispersion compensation) by utilizing a difference in the penetration depth between light having a long wavelength and light having a short wavelength. The GTI-type mirror performs negative dispersion compensation by utilizing interference of light between a total reflection mirror and a partial reflection mirror.

A typical example of the chirp-type mirror is a mirror in which high refractive index layers, which have a relatively high refractive index, and low refractive index layers, which have a relatively low refractive index, are alternately deposited one on another. In the chirp-type mirror, these layers are deposited in such a manner that the optical thickness of each of the high refractive index layers and the low refractive index layers linearly changes in the direction of deposition of the layers (for example, please refer to R. Szipöcs et al., "Chirped multilayer coatings for broadband dispersion control in femtosecond lasers", Optics Letters, Vol. 19, No. 3, pp. 201-203, 1994.

Meanwhile, the characteristic of the GTI-type mirror is that a resonation structure is provided within the dielectric multilayer coating (please refer to J. Xuhl and J. Heppner, "Compression of Femtosecond Optical Pulses with Dielectric Multilayer Interferometers", IEEE Transaction on Quantum Electronics, Vol. QE-22, No. 1, pp. 182-185, 1986 for example). Further, a double GTI structure mirror that has two cavity layers within the multilayer coating has been proposed (please refer to International Patent Publication No. WO00/25154). Further, a mirror that has no cavity layer, but the multilayer coating of which is structured in such a manner that it has a resonance structure has been proposed (please refer to International Patent Publication No. WO00/11501). In the mirror that has no cavity layer, the multilayer coating is structured in such a manner that the optical thickness of each layer forming the multilayer coating changes according to a certain pattern or rule so that the resonance structure is obtained.

Further, in Japanese Unexamined Patent Publication No. 2(1990)-023302, a dielectric multilayer coating that performs not only second-order dispersion compensation but third-or-higher-order dispersion compensation has been proposed. The third-or-higher-order dispersion compensation is performed by depositing at least two stacks of dielectric multilayer coatings one on another. In each of the stacks, at least two kinds of layers that have different refractive indices from each other are alternately deposited one on another. Further, each of the stacks is formed in such a manner that the central wavelength thereof differs from each other. Further, in Japanese Unexamined Patent Publication No. 2000-138407, a multilayer coating mirror that has a reflectance of greater than or equal to 95% in the visible light band has been proposed. In the multilayer coating mirror, the refractive index of the outermost layer is set lower than that of a layer that is immediately under the outermost layer. The multilayer coating mirror is formed in such a manner that negative group velocity dispersion occurs.

Further, in Japanese Unexamined Patent Publication No. 11(1999)-168252, a technique of providing a chirp mirror coating on a laser medium, a saturable absorber or an output mirror has been proposed to reduce the size of the mode-locked solid-state laser apparatus.

The inventors of the present invention have discovered that a negative dispersion mirror that can compensate at a greater negative dispersion value than a conventional mirror and that has a sufficient reflectance as an output mirror is necessary to reduce the size of a soliton-type mode-locked solid-state laser apparatus.

However, the negative dispersion values of conventional negative dispersion mirrors are approximately in the range of minus tens to minus hundreds $fs^2$. Therefore, it has been necessary to provide a plurality of mirrors in a resonator, if necessary.

Further, in Japanese Unexamined Patent Publication No. 11(1999)-168252, a technique of providing a negative dispersion function in the output mirror has been proposed. However, Japanese Unexamined Patent Publication No. 11(1999)-168252 fails to specifically disclose the optical transmittance, negative dispersion value and the like of the mirror in the case of using the mirror as the output mirror. Further, a coating that constitutes the mirror is not specifically described. Further, in Japanese Unexamined Patent Publication No. 2000-138407, the feature that the frequency chirp can be compensated by providing a dielectric multilayer coating in the output mirror is disclosed. However, the negative dispersion value of a multilayer coating that is disclosed as a concrete example is extremely low. Therefore, if a single device (element) is used, sufficient negative dispersion is not obtained. Further, since the reflectance is greater than or equal to 99.9%, which is very close to 100%, substantially no output light is obtained Hence, the function as the output mirror is not sufficient.

SUMMARY OF THE INVENTION

In view of the foregoing circumstances, it is an object of the present invention to provide a negative dispersion mirror that can generate great negative group-velocity dispersion and that can be used an output mirror of a solid-state laser apparatus. Further, it is another object of the present invention to provide a mode-locked solid-state laser apparatus that has a small size, and that can be produced at low cost, and that can realize a stable CW mode-locking in the femtosecond regime.

A first negative dispersion mirror according to the present invention is a negative dispersion mirror comprising a substrate; and a dielectric multilayer coating structure formed on the substrate, wherein the multilayer coating structure includes two mirror-function layer portions, each formed by a plurality of layers deposited one on another, and a cavity layer that is arranged between the two mirror-function layer portions, and which causes light having a predetermined wavelength to resonate between the two mirror-function layer portions, and wherein a dispersion value with respect to the light having the predetermined wavelength is in the range of $-600$ $fs^2$ to $-3000$ $fs^2$ and a reflectance with respect to the light having the predetermined wavelength is in the range of 97% to 99.5%.

Here, the expression "a dispersion value is in the range of $-600$ $fs^2$ to $-3000$ $fs^2$" means that the absolute value of the negative dispersion value is a predetermined value greater than or equal to 600 $fs^2$ and less than or equal to 3000 $fs^2$. Similarly, the expression "a reflectance is in the range of 97% to 99.5%" means that the value is a predetermined value greater than or equal to 97% and less than or equal to 99.5%.

It is desirable that the substrate has a concave surface and that the multilayer coating structure is formed on the concave surface.

It is desirable that the predetermined wavelength has a bandwidth that is greater than or equal to 10 nm. Specifically, it is desirable that the dispersion value with respect to the bandwidth of greater than or equal to 10 nm is a predetermined value in the range of $-600$ $fs^2$ to $-3000$ $fs^2$ and that the reflectance with respect to the bandwidth of greater than or equal to 10 nm is a predetermined value in the range of 97% to 99.5%.

Further, the center wavelength of the predetermined wavelength may be set at a desirable value. Particularly, it is desirable that the center wavelength is in the range of 1000 nm to 1100 nm or in the range of 700 nm to 900 nm.

When the center wavelength of the predetermined wavelength is $\lambda$, it is desirable that the optical thickness of the cavity layer is greater than or equal to $\lambda/2$. Further, it is desirable that the optical thickness is substantially less than or equal to $10\lambda$. Particularly, it is desirable that the optical thickness is approximately in the range of $2\lambda$ to $4\lambda$.

When the center wavelength of the predetermined wavelength is $\lambda$, it is desirable that the optical thickness of each layer forming the mirror-function layer portions is greater than or equal to $\lambda/8$ and less than $\lambda/2$.

It is desirable that each of the mirror-function layer portions is formed by layers having a relatively high refractive index and layers having a relatively low refractive index that are alternately deposited one on another and that the total number of the deposited layers in each of the mirror-function layer portions is greater than or equal to eight.

It is desirable that the cavity layer is made of the same material as that of the layers having the relatively high refractive index or the layers having the relatively low refractive index.

The layers having the relatively high refractive index may essentially consist of a material that is selected from the group consisting of Ti-oxide, Zr-oxide, Hf-oxide, Nb-oxide, Al-oxide, Zn-oxide, Y-oxide, Sc-oxide, La-oxide, Ce-oxide, Pr-oxide, Ta-oxide and Zn-sulfide or of a mixture or compound containing at least one of the oxides and the sulfide. Here, the mixture or compound containing at least one of the oxides and the sulfide may contain a component other than these oxides and sulfide. However, the mixture or compound should contain one of the oxides and the sulfide or a plurality thereof, as a main component (at least 50 weight % of the total mixture or compound).

Further, the layers having the relatively low refractive index may essentially consist of a material selected from the group consisting of Si-oxide, Ca-fluoride, Li-fluoride, Mg-fluoride, Na-fluoride, Th-fluoride, Al-fluoride, Hf-fluoride, La-fluoride, Y-fluoride and Zr-fluoride or a mixture or compound containing at least one of the oxide and the fluorides. Here, the mixture or compound containing at least one of the oxide and the fluorides may contain a component other than these oxide and fluorides. However, the mixture or compound should contain one of the oxide and the fluorides or a plurality thereof, as a main component (at least 50 weight % of the total mixture or compound).

A second negative dispersion mirror according to the present invention is a negative dispersion mirror comprising:

a substrate; and a dielectric multilayer coating structure formed on the substrate, wherein the multilayer coating structure includes at least three mirror-function layer portions, each formed by a plurality of layers deposited one on another, and cavity layers, each of which is arranged between the mirror-function layer portions, and each of which causes light having a predetermined wavelength to resonate between the mirror-function layer portions, which are arranged on both sides of the cavity layer, and wherein the cavity layers are arranged across the entire multilayer coating structure at predetermined intervals with the mirror-function layer portion therebetween, and wherein a dispersion value with respect to the light having the predetermined wavelength is in the range of $-600$ $fs^2$ to $-3000$ $fs^2$ and a reflectance with respect to the light having the predetermined wavelength is in the range of 97% to 99.5%.

Specifically, the negative dispersion mirror according to the present invention includes at least three mirror-function layer portions and at least two cavity layers.

The phrase "across the entire multilayer coating structure" means that the cavity layers are arranged in a balanced manner (evenly) from the substrate side to the outermost layer side. The phrase is used to exclude the arrangement of the cavity layers, in which two or at least three cavity layers are arranged in close proximity to each other only in a part of the multilayer coating structure, for example. Especially, the phrase is used to exclude at least the arrangement of the cavity layers, in which all of the cavity layers are arranged in a part of the multilayer coating structure, the part including consecutive layers, the number of which is half the total number of layers forming the entire multilayer coating structure.

When the number of the cavity layers is three or greater, it is desirable that the predetermined intervals are substantially equal intervals for the plurality of cavity layers. The term "substantially equal intervals" means that the intervals between the cavity layers are within ±35% of the average value of the intervals.

Here, the expression "a dispersion value is in the range of $-600$ fs$^2$ to $-3000$ fs$^2$" means that the absolute value of the negative dispersion value is a predetermined value greater than or equal to 600 fs$^2$ and less than or equal to 3000 fs$^2$. Similarly, the expression "a reflectance is in the range of 97% to 99.5%" means that the value is a predetermined value greater than or equal to 97% and less than or equal to 99.5%.

It is desirable that the substrate has a concave surface and that the multilayer coating structure is formed on the concave surface.

It is desirable that the predetermined wavelength has a bandwidth that is greater than or equal to 10 nm. Specifically, it is desirable that the dispersion value with respect to the bandwidth of greater than or equal to 10 nm is a predetermined value in the range of $-600$ fs$^2$ to $-3000$ fs$^2$ and that the reflectance with respect to the bandwidth of greater than or equal to 10 nm is a predetermined value in the range of 97% to 99.5%.

Further, the center wavelength of the predetermined wavelength may be set at a desirable value. Particularly, it is desirable that the center wavelength is in the range of 1000 nm to 1100 nm or in the range of 700 nm to 900 nm.

When the center wavelength of the predetermined wavelength is $\lambda$, it is desirable that the optical thickness of the cavity layer is greater than or equal to $\lambda/2$. Further, it is desirable that the optical thickness is substantially less than or equal to 10$\lambda$. Particularly, it is desirable that the optical thickness is approximately in the range of 2$\lambda$ to 4$\lambda$.

When the center wavelength of the predetermined wavelength is $\lambda$, it is desirable that the optical thickness of each layer forming the mirror-function layer portions is greater than or equal to $\lambda/8$ and less than $\lambda/2$.

It is desirable that each of the mirror-function layer portions is formed by layers having a relatively high refractive index and layers having a relatively low retractive index that are alternately deposited one on another and that the total number of the deposited layers in each of the mirror-function layer portions is greater than or equal to five.

It is desirable that the cavity layers are made of the same material as that of the layers having the relatively high refractive index or the layers having the relatively low refractive index.

The layers having the relatively high refractive index may essentially consist of a material that is selected from the group consisting of Ti-oxide, Zr-oxide, Hf-oxide, Nb-oxide, Al-oxide, Zn-oxide, Y-oxide, Sc-oxide, La-oxide, Ce-oxide, Pr-oxide, Ta-oxide and Zn-sulfide or of a mixture or compound containing at least one of the oxides and the sulfide. Here, the mixture or compound containing at least one of the oxides and the sulfide may contain a component other than these oxides and sulfide. However, the mixture or compound should contain one of the oxides and the sulfide or a plurality thereof, as a main component (at least 50 weight % of the total mixture or compound).

Further, the layers having the relatively low refractive index may essentially consist of a material selected from the group consisting of Si-oxide, Ca-fluoride, Li-fluoride, Mg-fluoride, Na-fluoride, Th-fluoride, Al-fluoride, Ht-fluoride, La-fluoride, Y-fluoride and Zr-fluoride or a mixture or compound containing at least one of the oxide and the fluorides. Here, the mixture or compound containing at least one of the oxide and the fluorides may contain a component other than these oxide and fluorides. However, the mixture or compound should contain one of the oxide and the fluorides or a plurality thereof, as a main component (at least 50 weight % of the total mixture or compound).

A third negative dispersion mirror according to the present invention is a negative dispersion mirror comprising:

a substrate; and a dielectric multilayer coating structure formed on the substrate, wherein a dispersion value with respect to light having a predetermined wavelength is in the range of $-100$ fs$^2$ to $-1000$ fs$^2$ and a reflectance with respect to the light having the predetermined wavelength is in the range of 97% to 99.5%, and wherein the multilayer coating structure is formed by layers that have a relatively high refractive index and layers that have a relatively low refractive index that are alternately deposited one on another, and wherein when the center wavelength of the predetermined wavelength is $\lambda$, the optical thickness of each of the layers randomly changes in the range of $\lambda/8$ to $\lambda/2$.

The phrase "randomly changes" is used to exclude the coating structure described in the "Description of the Related Art". Specifically, the phrase is used to exclude the arrangement of layers, in which the optical thickness of each of the high refractive index layers and the low refractive index layers linearly changes in the deposition direction of the layers, and the arrangement, in which the optical thickness of each layer changes according to a certain pattern or rule.

Here, the expression "a dispersion value is in the range of $-100$ fs$^2$ to $-1000$ fs$^2$" means that the absolute value of the negative dispersion value is a predetermined value that is greater than or equal to 100 fs$^2$ and less than or equal to 1000 fs$^2$. Similarly, the expression "a reflectance is in the range of 97% to 99.5%" means that the value is a predetermined value greater than or egual to 97% and less than or equal to 99.5%.

It is desirable that the substrate has a concave surface and that the multilayer coating structure is formed on the concave surface.

It is desirable that the predetermined wavelength has a bandwidth that is greater than or equal to 10 nm. Specifically, it is desirable that the dispersion value with respect to the bandwidth of greater than or equal to 10 nm is a predetermined value in the range of $-100$ fs$^2$ to $-1000$ fs$^2$ and that the reflectance with respect to the bandwidth of greater than or equal to 10 nm is a predetermined value in the range of 97% to 99.5%.

Further, the center wavelength of the predetermined wavelength may be set at a desirable value. Particularly, it is desirable that the center wavelength is in the range of 1000 nm to 1100 nm or in the range of 700 nm to 900 nm.

The layers having the relatively high refractive index may essentially consist of a material that is selected from the group consisting of Ti-oxide, Zr-oxide, Hf-oxide, Nb-oxide, Al-oxide, Zn-oxide, Y-oxide, Sc-oxide, La-oxide, Ce-oxide, Pr-oxide, Ta-oxide and Zn-sulfide or of a mixture or compound containing at least one of the oxides and the sulfide. Here, the mixture or compound containing at least one of the oxides and the sulfide may contain a component other than these oxides and sulfide. However, the mixture or compound should contain one of the oxides and the sulfide or a plurality thereof, as a main component (at least 50 weight % of the total mixture or compound).

Further, the layers having the relatively low refractive index may essentially consist of a material selected from the group consisting of Si-oxide, Ca-fluoride, Li-fluoride, Mg-fluoride, Na-fluoride, Th-fluoride, Al-fluoride, Hf-fluoride, La-fluoride, Y-fluoride and Zr-fluoride or a mixture or compound containing at least one of the oxide and the fluorides. Here, the mixture or compound containing at least one of the oxide and the fluorides may contain a component other than these oxide and fluorides. However, the mixture or compound should contain one of the oxide and the fluorides or a plurality thereof, as a main component (at least 50 weight % of the total mixture or compound).

Further, a mode-locked solid-state laser apparatus according to the present invention is a mode-locked solid-state laser apparatus comprising:

a resonator;

a solid-state laser medium arranged within the resonator; and a mode-locking device arranged within the resonator, wherein an output mirror that forms one end of the resonator is the aforementioned negative dispersion mirror according to the present invention. Here, the expression "arranged within the resonator" refers not only to a case in which the device is arranged in the inside of the resonator but to a case in which the device itself forms an end of the resonator. As the mode-locking device, a semiconductor saturable absorber mirror (SESAM), a saturable absorber mirror using a Kerr mode-locking device or a carbon nanotube, or the like may be used. One of the ends of the resonator may be formed by a saturable absorber mirror.

Further, an optical pulse dispersion compensation apparatus according to the present invention is an optical pulse dispersion compensation apparatus comprising:

at least two negative dispersion mirrors according to the present invention that are arranged in such a manner that the multilayer coating structures thereof face each other. Here, the expression "the multilayer coating structures thereof face each other" refers to a condition in which the multilayer coating structures are arranged in such a manner that light that has entered a surface of one of the negative dispersion mirrors, the surface having the multilayer coating structure, is reflected at the surface and enters a surface of another negative dispersion mirror, the surface having the multilayer coating structure.

Further, a nonlinear optical imaging apparatus according to the present invention is a nonlinear optical imaging apparatus for obtaining a two-dimensional image or a three-dimensional image by detecting fluorescence generated from a sample containing a substance to be measured, the substance having been marked with a fluorescent marker. The fluorescence is generated by irradiating the sample with excitation light (pump light) while the irradiation position of the excitation light is two-dimensionally or three-dimensionally moved relative to the sample. The apparatus includes the mode-locked solid-state laser apparatus according to the present invention, as a light source for emitting the excitation light.

Further, a laser processing apparatus according to the present invention is a laser processing apparatus for processing an object to be processed by irradiating the object with laser light. The apparatus includes the mode-locked solid-state laser apparatus according to the present invention, as a light source for emitting the laser light.

The first negative dispersion mirror according to the present invention has a dispersion value in the range of $-600$ $fs^2$ to $-3000$ $fs^2$ with respect to light having a predetermined wavelength and a reflectance in the range of 97% to 99.5% with respect to the light having the predetermined wavelength. Therefore, the negative dispersion mirror according to the present invention may optionally be used as an output mirror that forms an end of a resonator of a mode-locked solid-state laser apparatus. The negative dispersion mirror may be designed in such a manner that the dispersion value becomes an arbitrary value in the range of $-600$ $fs^2$ to $-3000$ $fs^2$ based on the structure of the mode-locked solid-state laser apparatus. Since the dispersion value is extremely high compared with the dispersion value of a conventional negative dispersion mirror, the negative dispersion mirror alone, in other words, a single negative dispersion mirror can perform sufficient negative dispersion compensation. Further, the negative dispersion mirror may be designed in such a manner that the reflectance becomes an arbitrary value in the range of 97% to 99.5%. Since the negative dispersion mirror transmits light at 3 to 0.5%, the negative dispersion mirror can sufficiently function as an output mirror. If the negative dispersion mirror according to the present invention is used as the output mirror, it is not necessary to provide a single negative dispersion device or a plurality of negative dispersion devices within the resonator. Therefore, the size of the mode-locked solid-state laser apparatus can be reduced.

Further, the absolute value of the dispersion value of the first negative dispersion mirror according to the present invention is extremely large. Therefore, the negative dispersion mirror can effectively be used as an ordinary negative dispersion device.

If the cavity layer is made of the same material as that of the layers having a high refractive index or low refractive index, it is possible to prevent an increase in the number of the kinds of materials and the number of steps in production. Therefore, it is possible to prevent an increase in the cost.

The second negative dispersion mirror according to the present invention has a dispersion value in the range of $-600$ $fs^2$ to $-3000$ $fs^2$ with respect to light having a predetermined wavelength and a reflectance in the range of 97% to 99.5% with respect to the light having the predetermined wavelength. Therefore, the negative dispersion mirror according to the present invention may optionally be used as an output mirror that forms an end of a resonator of a mode-locked solid-state laser apparatus. The negative dispersion mirror may be designed in such a manner that the dispersion value becomes an arbitrary value in the range of $-600$ $fs^2$ to $-3000$ $fs^2$ based on the structure of the mode-locked solid-state laser apparatus. Since the dispersion value is extremely high compared with the dispersion value of a conventional negative dispersion mirror, the negative dispersion mirror alone, in other words, a single negative dispersion mirror can perform sufficient negative dispersion compensation, in other words, compensate dispersion at a sufficiently great negative dispersion value. Further, the negative dispersion mirror may be designed in such a manner that the reflectance becomes an arbitrary value in the range of 97% to 99.5%. Since the negative dispersion mirror transmits light at 3 to 0.5%, the negative dispersion mirror can sufficiently function as an output mirror. If the negative dispersion mirror according to the present invention is used as the output mirror, it is not necessary to provide a single negative dispersion device or a plurality of negative dispersion devices within the resonator. Therefore, the size of the mode-locked solid-state laser apparatus can be reduced.

Further, the absolute value of the dispersion value of the second negative dispersion mirror according to the present invention is extremely large. Therefore, the negative dispersion mirror can effectively be used as an ordinary negative dispersion device.

It the cavity layer are made of the same material as that of the layers having a high refractive index or low refractive index, it is possible to prevent an increase in the number of the kinds of materials and the number of steps in production. Therefore, it is possible to prevent an increase in the cost.

The third negative dispersion mirror according to the present invention has a dispersion value in the range of −100 fs² to −1000 fs² with respect to light having a predetermined wavelength and a reflectance in the range of 97% to 99.5% with respect to the light having the predetermined wavelength. Therefore, the negative dispersion mirror according to the present invention may optionally be used as an output mirror that forms an end of a resonator of a mode-locked solid-state laser apparatus. The negative dispersion mirror may be designed in such a manner that the dispersion value becomes an arbitrary value in the range of −100 fs² to −1000 fs² based on the structure of the mode-locked solid-state laser apparatus. Since the dispersion value is sufficiently great compared with the dispersion value of a conventional negative dispersion mirror, the negative dispersion mirror alone, in other words, a single negative dispersion mirror can perform sufficient negative dispersion compensation. Further, the negative dispersion mirror may be designed in such a manner that the reflectance becomes an arbitrary value in the range of 57% to 99.5%. Since the negative dispersion mirror transmits light at 3 to 0.5%, the negative dispersion mirror can sufficiently function as an output mirror. If the negative dispersion mirror according to the present invention is used as the output mirror, it is not necessary to provide a single negative dispersion device nor a plurality of negative dispersion devices within the resonator. Therefore, the size of the mode-locked solid-state laser apparatus can be reduced.

Further, the absolute value of the dispersion value of the third negative dispersion mirror according to the present invention is extremely large. Therefore, the negative dispersion mirror can effectively be used as an ordinary negative dispersion device.

It cavity layers are made of the same material as that of the layers having a high refractive index or low refractive index, it is possible to prevent an increase in the number of the kinds of materials and the number of steps in production. Therefore, it is possible to prevent an increase in the cost.

Further, a mode-locked solid-state laser apparatus according to the present invention includes a negative dispersion mirror according to the present invention, as the output mirror forming an end of the resonator. Therefore, it is possible to greatly reduce the number of parts of the whole apparatus, thereby reducing the size of the apparatus. Hence, reduction in the cost and stabilization in the laser output can be achieved at the same time.

Further, an optical pulse dispersion compensation apparatus according to the present invention uses a negative dispersion mirror according to the present invention. Therefore, it is possible to shorten the optical-path length compared with the optical-path length in a dispersion compensation apparatus that uses a diffraction grating pair, which has been conventionally used in general Hence, it is possible to compensate dispersion with low power loss, keeping the loss of power at a low level. Further, it is possible to greatly reduce the size of the dispersion compensation apparatus compared with the apparatus using the diffraction grating pair.

Further, a nonlinear optical imaging apparatus according to the present invention includes a mode-locked solid-state laser apparatus according to the present invention as the light source. Therefore, it is possible to reduce the size of the whole structure and to obtain stable excitation light. Hence, it becomes possible to obtain highly accurate images by imaging.

Further, a laser processing apparatus according to the present invention includes a mode-locked solid-state laser apparatus according to the present invention as the light source. Therefore, it is possible to reduce the size of the whole structure and to obtain a stable pulsed laser beam. Hence, it becomes possible to perform highly accurate laser processing.

BRIEF DESCRIPTION OF THE DRAWINGS

FIG. 1 is a schematic diagram illustrating the structure of a negative dispersion mirror according to an embodiment of the present invention;

FIG. 9 is a schematic diagram illustrating the structure of a negative dispersion mirror according to an embodiment of the present invention;

FIG. 22 is a schematic diagram illustrating the structure of a negative dispersion mirror that is used as an output mirror;

DESCRIPTION OF THE PREFERRED EMBODIMENTS

Figure 2A:
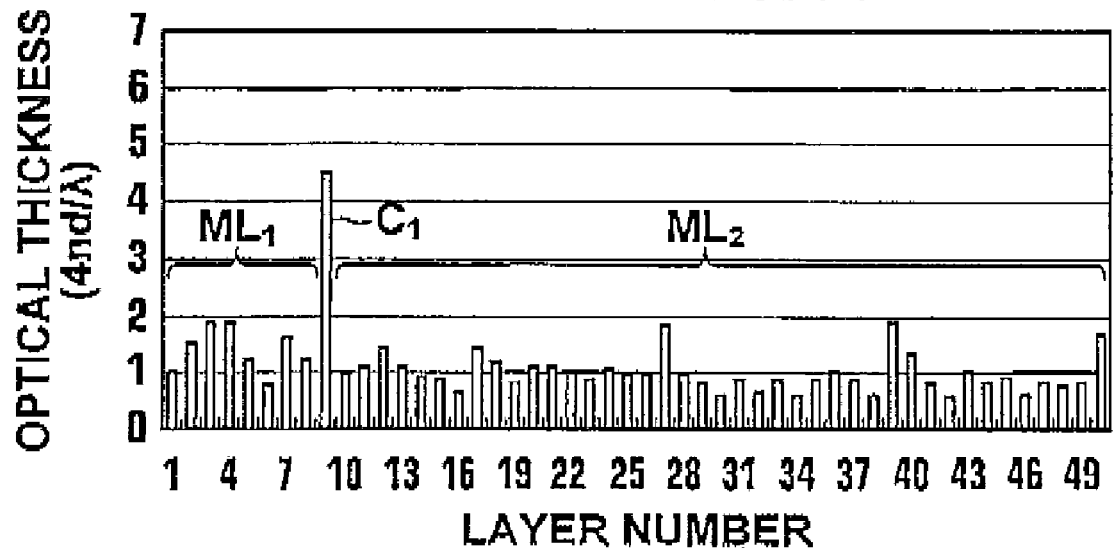
FIG. 2A is a diagram illustrating Design Example 1-1 of the structure of a coating of the negative dispersion mirror according to the present invention.

Hereinafter, embodiments of the present invention will be described with reference to drawings.

<First Negative Dispersion Mirror of the Present Invention>

FIG. 1 is a schematic diagram illustrating the structure of a negative dispersion mirror 1 according to a first embodiment of the present invention.

The negative dispersion mirror 1 in the present embodiment is a mirror including a glass substrate 3 and a dielectric multilayer coating structure 4 formed on the glass substrate 3. Further, the dielectric multilayer coating structure 4 includes two mirror-function layer portions $ML_1$ and $ML_2$ and E cavity layer C. Each of the two mirror-function layer portions $ML_1$ and $ML_2$ includes a plurality of layers deposited one on another The cavity layer C is provided between the two mirror-function layer portions $ML_1$ and $ML_2$ and generates resonance of light L having a predetermined wavelength between the two mirror-function layer portions $ML_1$ and $ML_2$. In the structure of the present invention, only a single cavity layer C is provided within the multilayer coating structure.

Each layer of the multilayer coating structure 4 is deposited one on another in the order of the first layer, the second layer, . . . , the (k−1)th layer, the k-th layer, the (K+1)th layer, . . . , the n-th layer from the substrate-3-side. The layers from the first layer to the (k−1)th layer form the mirror-function layer portion $ML_1$. The k-th layer forms the cavity layer C. The layers from the (k+1)th layer to the n-th layer form the mirror-function layer portion $ML_2$.

The negative dispersion mirror 1 has a dispersion value with respect to light L having a predetermined wavelength in the range of −600 $fs^2$ to −3000 $fs^2$ and a reflectance with respect to the light L having the predetermined wavelength in the range of 97% to 99.5%. Here, the light L having the predetermined wavelength has a bandwidth that is greater than or equal to 10 nm. Specifically, the dispersion value of the negative dispersion mirror 1 is a predetermined value in the range of −600 $fs^2$ to −3000 $fs^2$ with respect to light that has a bandwidth greater than or equal to 10 nm. Further, the reflectance of the negative dispersion mirror 1 is a predetermined value in the range of 97% to 99.5% with respect to light that has a bandwidth greater than or equal to 10 nm. The dispersion value and the reflectance may be set at arbitrary values within these ranges, respectively.

Each of the mirror-function layer portions $ML_1$ and $ML_2$ is formed by layers having a relatively high refractive index $n_1$ and layers having a relatively low refractive index $n_2$ ($<n_1$) that are alternately deposited one on another. It is desirable that the total number of the alternately deposited layers in each of the mirror function-layer portions $ML_1$ and $ML_2$ is greater than or equal to eight. For example, odd-number layers (the first layer, the third layer, . . . ) should be formed as high refractive index layers and even-number layers (the second layer, the fourth layer, . . . ) should be formed as low refractive index layers. If at least eight layers are deposited one on another in a single mirror-function layer portion, it is possible to sufficiently obtain the reflectance of the negative dispersion mirror that is greater than or equal to 97%.

Specifically, the high refractive index layer may essentially consist of a material that is selected from the group consisting of Ti-oxide, Zr-oxide, Hf-oxide, Nb-oxide, Al-oxide, Zn-oxide, Y-oxide, Sc-oxide, La-oxide, Ce-oxide, Pr-oxide, Ta-oxide and Zn-sulfide or of a mixture or compound containing at least one of the oxides and the sulfide.

Further, the low refractive index layer may essentially consist of a material selected from the group consisting of Si-oxide, Ca-fluoride, Li-fluoride, Mg-fluoride, Na-fluoride, Th-fluoride, Al-fluoride, Hf-fluoride, La-fluoride, Y-fluoride and Zr-fluoride or a mixture or compound containing at least one of the oxide and the fluorides.

The low refractive index layer and the high refractive index layer should be made of a dielectric that has a relatively low refractive index and a dielectric that has a relatively high refractive index, respectively, and any kind of known material may be used.

Meanwhile, the refractive index of the cavity layer is not particularly limited. If the material that is used to form the high refractive index layer or the low refractive index layer of the mirror-function layer portion is used as the material for the cavity layer, it is not necessary to prepare an additional material for the cavity layer. Therefore, it is desirable to use the material used in the mirror-function layer portion because it is possible to prevent an increase in the cost and an increase in the number of steps.

The center wavelength λ of the predetermined wavelength should be set at an arbitrary wavelength in the range of 1000 nm to 1100 nm or in the range of 700 nm to 900 nm. Further, the optical thickness of each layer is set based on the arbitrary wavelength λ.

Generally, the cavity layer has a relatively thick optical thickness compared with other layers. Here, the optical thickness of the cavity layer C is greater than or equal to twice the value of λ/4, namely, greater than or equal to λ/2. Optionally, the optical layer thickness of the cavity layer C may be four to eight times greater than the value of λ/4. Meanwhile, the optical thickness of each layer forming the mirror-function layers $ML_1$ and $ML_2$ is greater than equal to the half of the value of λ/4 and less than twice the value of λ/4, namely, greater than or equal to λ/8 and less than λ/2. The optical thickness is represented by "n·d", which is the product of the refractive index n of the layer and the coating thickness d (nm) of the layer.

Next, concrete examples of the structure of coating will be described. FIGS. 2A, 3A, 4A, 5A, 6A and 7A are diagrams for Design Examples 1-1 through 1-6, respectively. FIGS. 2A, 3A, 4A, 5A, 6A and 7A illustrate the optical thickness of each layer with respect to a predetermined center wavelength. FIGS. 2B, 3B, 4B, 5B, 6B and 7B are graphs showing reflectances and negative dispersion values that are realized by the coating structure of Design Examples 1-1 through 1-6, which are illustrated in FIGS. 2A, 3A, 4A, 5A, 6A and 7A, respectively. Design Examples 1-1 through 1-4 have been designed by setting the center wavelength λ at 1045 nm. Design Examples 1-5 and 1-6 have been designed by setting the center wavelength λ at 800 nm. All of the values have been obtained by simulation.

In FIGS. 2A, 3A, 4A, 5A, 6A and 7A, the horizontal axis represents the layer numbers and the vertical axis represents the optical thickness (4nd/λ), which is normalized by the value of λ/4. The first layer is the closest to the substrate aide and the 50th layer is the closest to the air side (outer side). In FIGS. 2B, 3B, 4B, 5B, 6B and 7B, the horizontal axis represents the predetermined wavelength (nm) of light and the vertical axis represents the reflectance (%) and the negative dispersion value ($fs^2$).

Figure 2B:
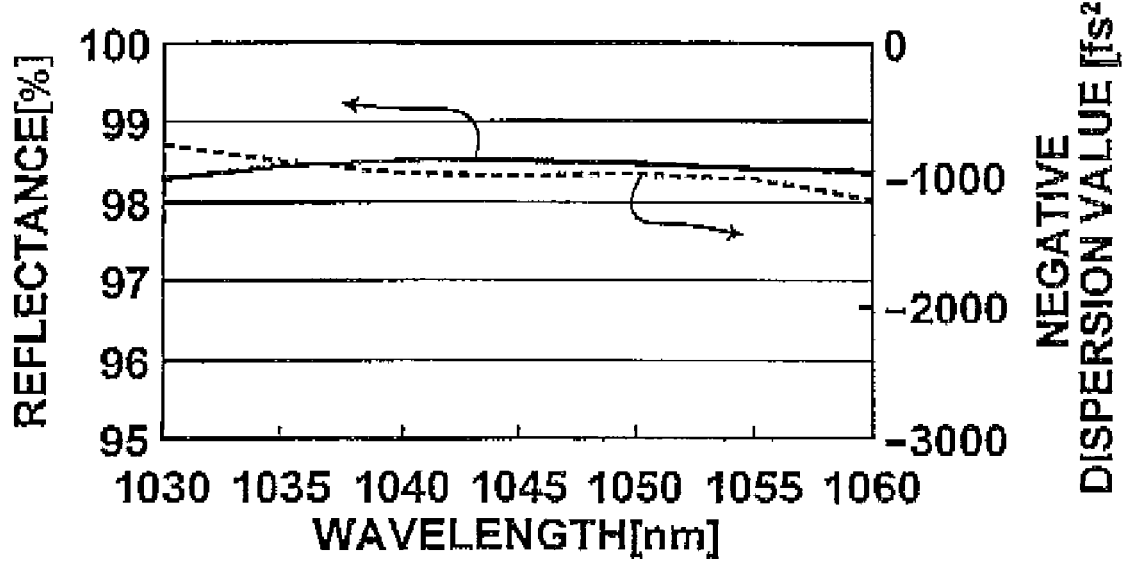
FIG. 2B is a graph showing the reflectance and the dispersion value in the negative dispersion mirror of Design Example 1-1.

In the multilayer coating structure of Design Example 1-1, which is illustrated in FIG. 2A, the first through eighth layers form a mirror-function layer $ML_1$, the ninth layer forms a cavity layer C and the tenth through 50th layers form a mirror-function layer $ML_2$. In Design Example 1-1, the cavity layer C is positioned relatively close to the substrate. FIG. 2B indicates that the mirror that has the coating structure as illustrated in FIG. 2A has a characteristic that the reflectance=98.5% and the negative dispersion value=−1000 $fs^2$ are satisfied at least in the range of ±5 nm with respect to the center wavelength of 1045 nm.

Figure 3A:
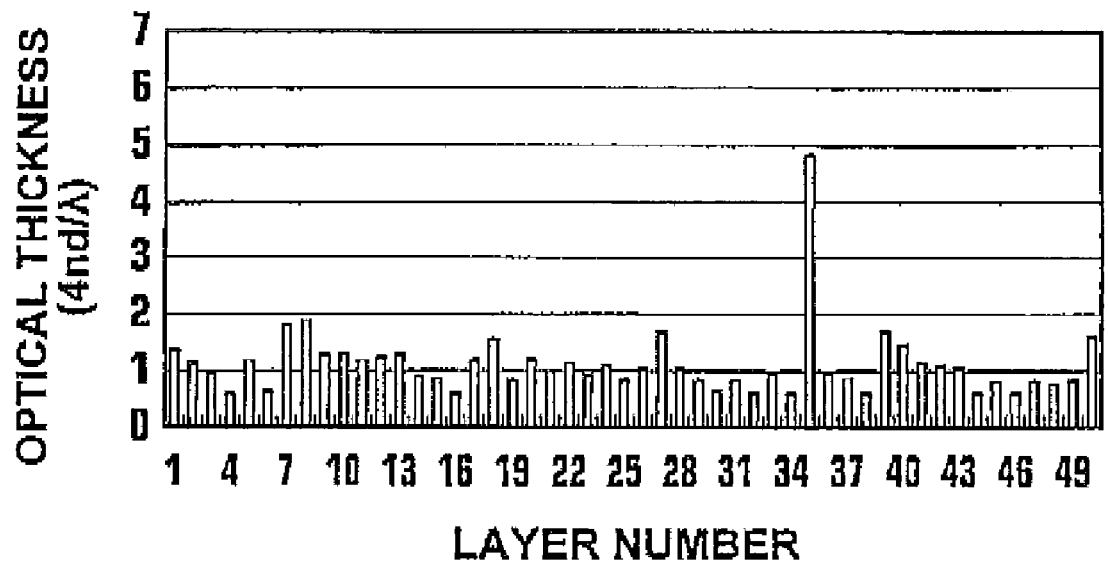
FIG. 3A is a diagram illustrating Design Example 1-2 of the structure of a coating of the negative dispersion mirror according to the present invention.
Figure 3B:
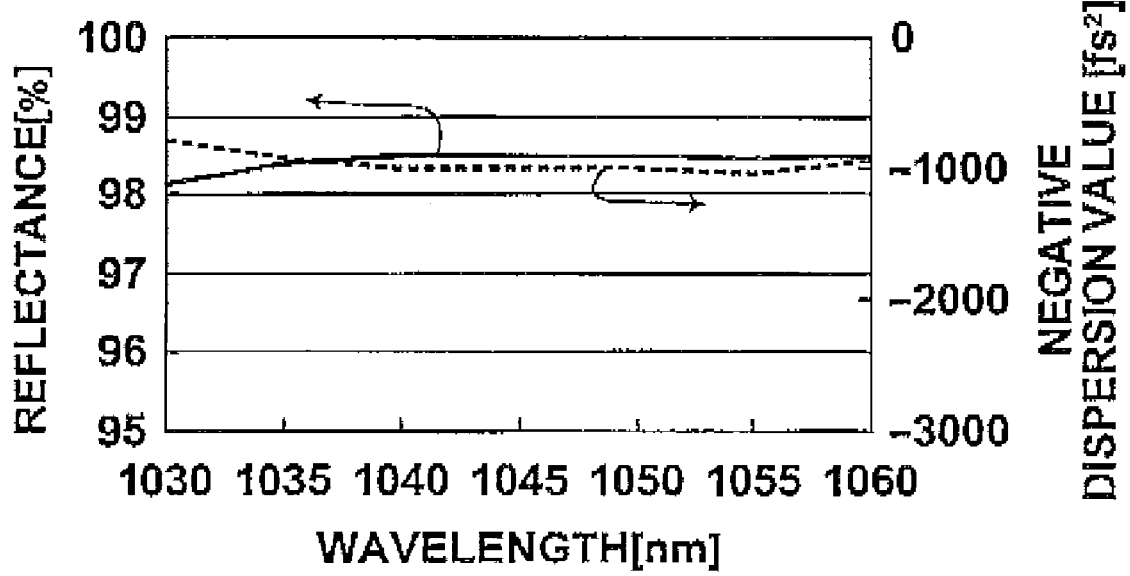
FIG. 3B is a graph showing the reflectance and the dispersion value in the negative dispersion mirror of Design Example 1-2.

In the multilayer coating structure of Design Example 1-2, which is illustrated in FIG. 3A, the first through 34th layers form a mirror-function layer $ML_1$ the 35th layer forms a cavity layer C and the 36th through 50th layers form a mirror-function layer $ML_2$. In Design Example 1-2, the cavity layer C is positioned away from the substrate compared with Design Example 1-1. FIG. 3B indicates that the mirror that has the coating structure as illustrated in FIG. 3A has a characteristic that the reflectance=98.5% and the negative dispersion value=−1000 $fs^2$ are satisfied at least in the range of ±5 nm with respect to the center wavelength of 1045 nm.

Design Example 1-1 and Design Example 1-2 have different coating structures from each other. However, substantially the same characteristic can be obtained in the range of 1040 nm to 1050 nm.

Figure 4A:
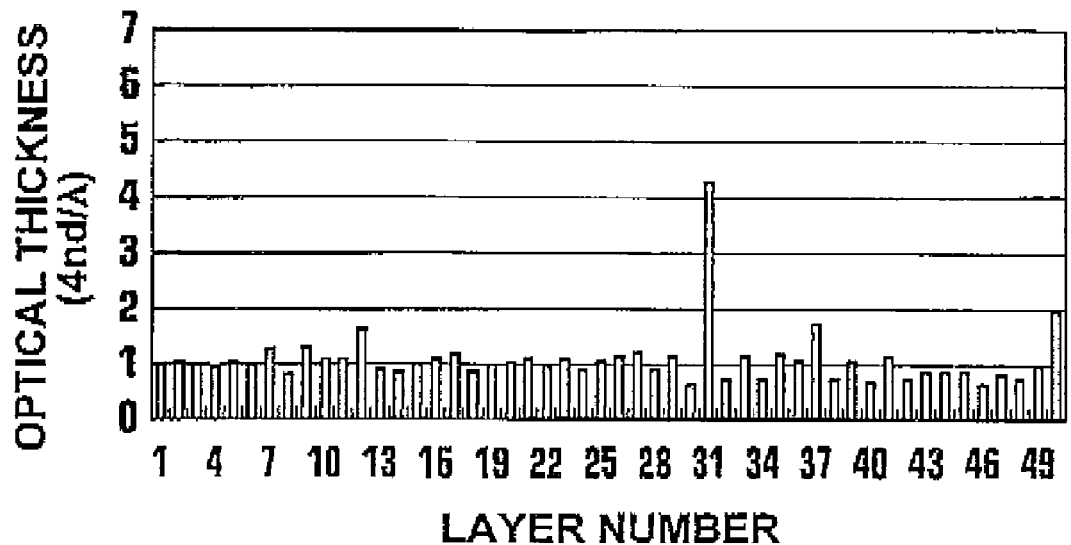
FIG. 4A is a diagram illustrating Design Example 1-3 of the structure of a coating of the negative dispersion mirror according to the present invention.
Figure 4B:
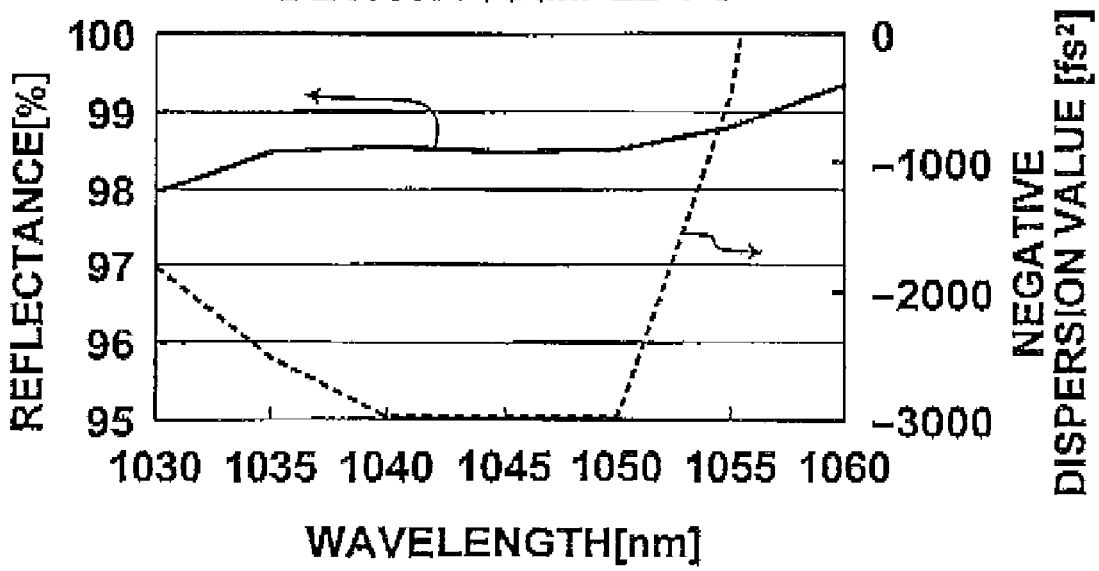
FIG. 4B is a graph showing the reflectance and the dispersion value in the negative dispersion mirror of Design Example 1-3.

In the multilayer coating structure of Design Example 1-3, which is illustrated in FIG. 4A, the first through 30th layers form a mirror-function layer $ML_1$, the 31st layer forms a cavity layer C and the 32nd through 50th layers form a mirror-function layer $ML_2$. FIG. 4B indicates that the mirror that has the coating structure as illustrated in FIG. 4A has a characteristic that the reflectance=98.5% and the negative dispersion value=−3000 fs² are satisfied at least in the range of ±5 nm with respect to the center wavelength of 1045 nm.

Figure 5A:
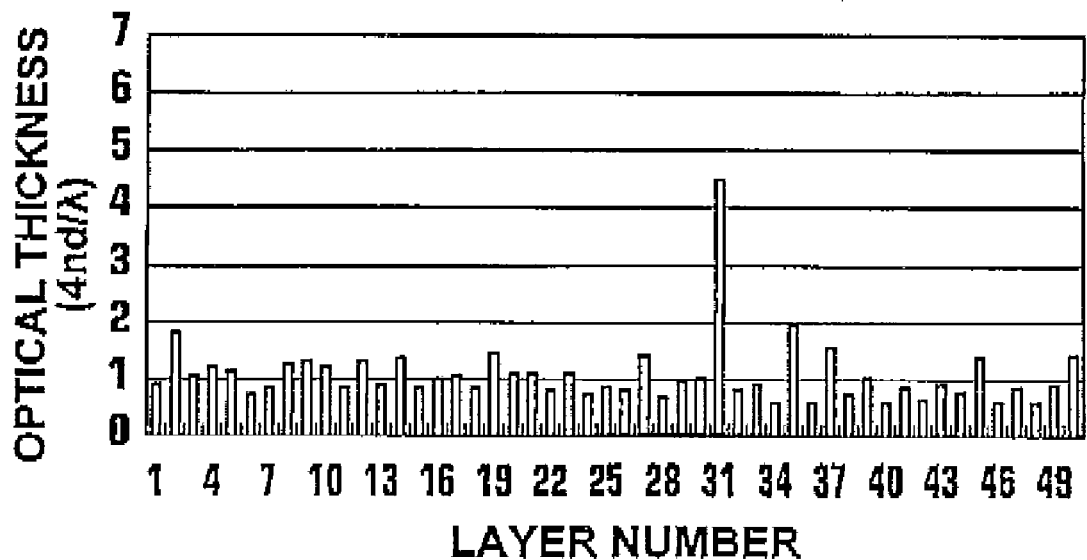
FIG. 5A is a diagram illustrating Design Example 1-4 of the structure of a coating of the negative dispersion mirror according to the present invention.
Figure 5B:
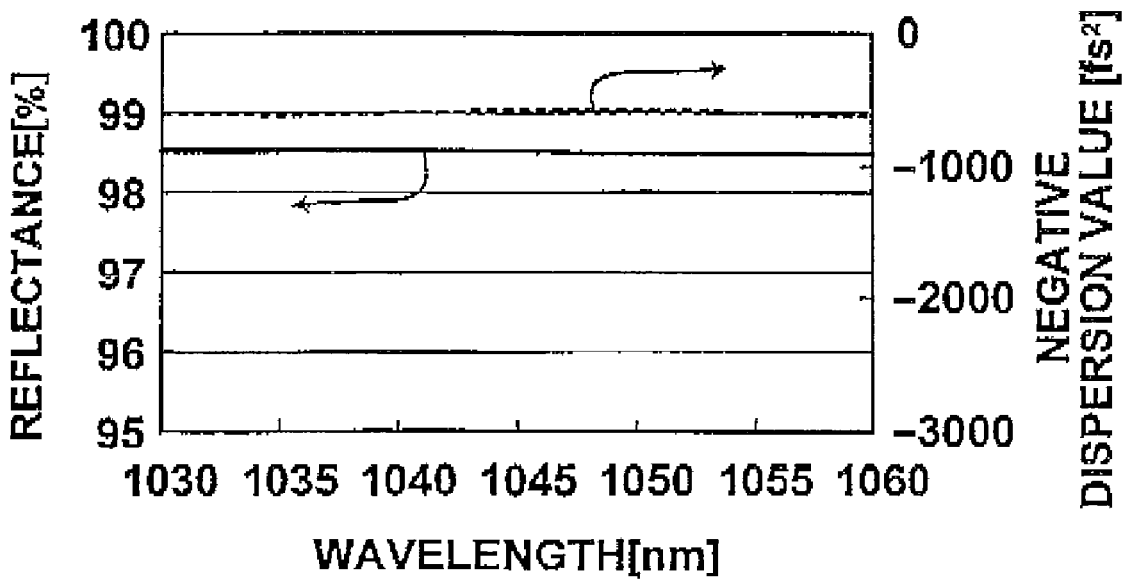
FIG. 5B is a graph showing the reflectance and the dispersion value in the negative dispersion mirror of Design Example 1-4.

In the multilayer coating structure of Design Example 1-4, which is illustrated in FIG. 5A, the first through 30th layers form a mirror-function layer $ML_1$, the 31st layer forms a cavity layer C and the 32nd through 50th layers form a mirror-function layer $ML_2$ in a manner similar to Design Example 1-3. However, FIG. 5B indicates that the mirror that has the coating structure as illustrated in FIG. 5A has a characteristic that the reflectance=98.5% and the negative dispersion value=−600 fs² are satisfied at least in the range of ±5 nm with respect to the center wavelength of 1045 nm.

In Design Example 1-3 and Design Example 1-4, the layer number of the cavity layer C is the same, the optical thickness of the cavity layer C is substantially the same and the total number of layers forming each of the mirror-function layers is the same. However, completely different characteristics are obtained between Design Example 1-3 and Design Example 1-4. It appears that the difference in the characteristics between the two examples is caused by a difference in the optical thickness of each layer forming the mirror-function layers $ML_1$ and $ML_2$.

Figure 6A:
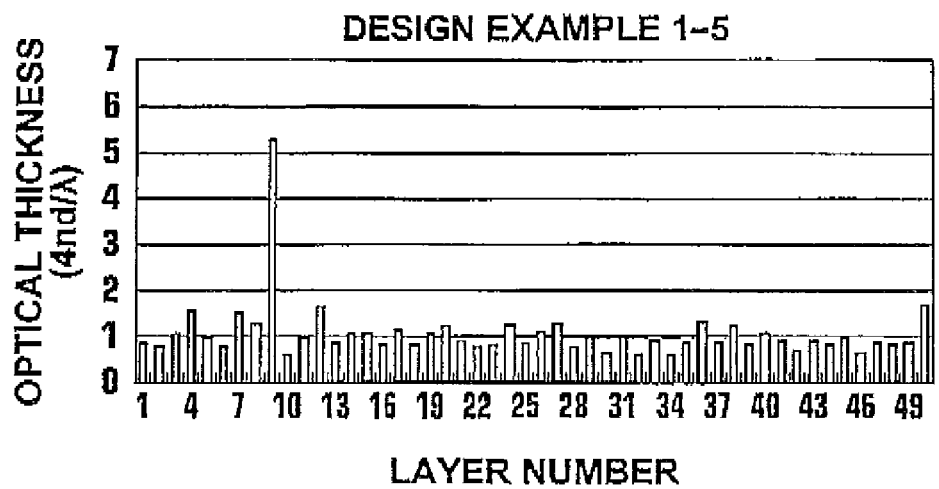
FIG. 6A is a diagram illustrating Design Example 1-5 of the structure of a coating of the negative dispersion mirror according to the present invention.
Figure 6B:
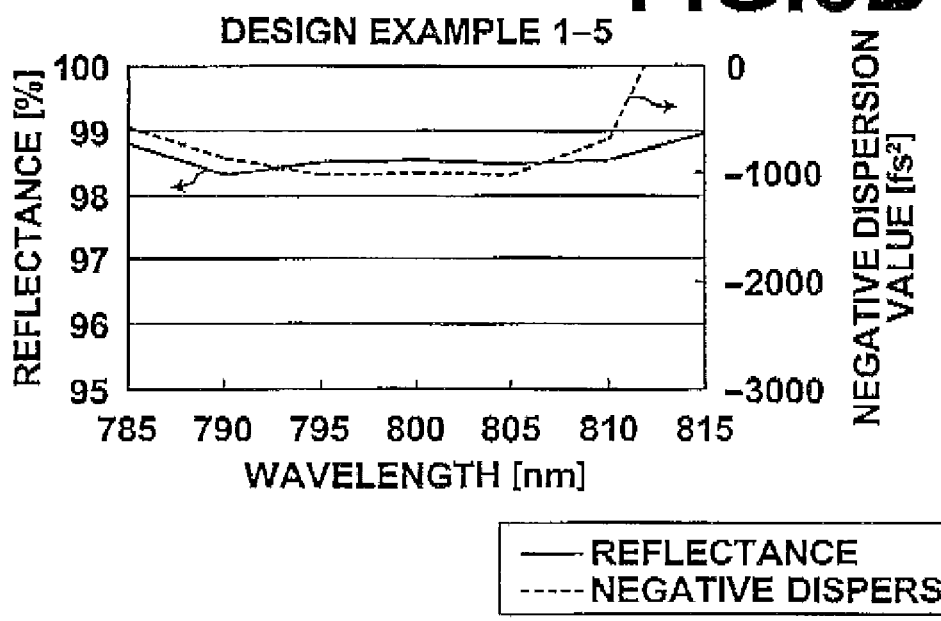
FIG. 6B is a graph showing the reflectance and the dispersion value in the negative dispersion mirror of Design Example 1-5.

In the multilayer coating structure of Design Example 1-5, which is illustrated in FIG. 6A, the first through eighth layers form a mirror-function layer $ML_1$, the ninth layer forms a cavity layer C and the 10th through 50th layers form a mirror-function layer $ML_2$ in a manner similar to Design Example 1-1. FIG. 6B indicates that the mirror that has the coating structure as illustrated in FIG. 6A has a characteristic that the reflectance=98.5% and the negative dispersion value=−1000 fs² are satisfied at least in the range of ±5 nm with respect to the center wavelength of 800 nm.

Figure 7A:
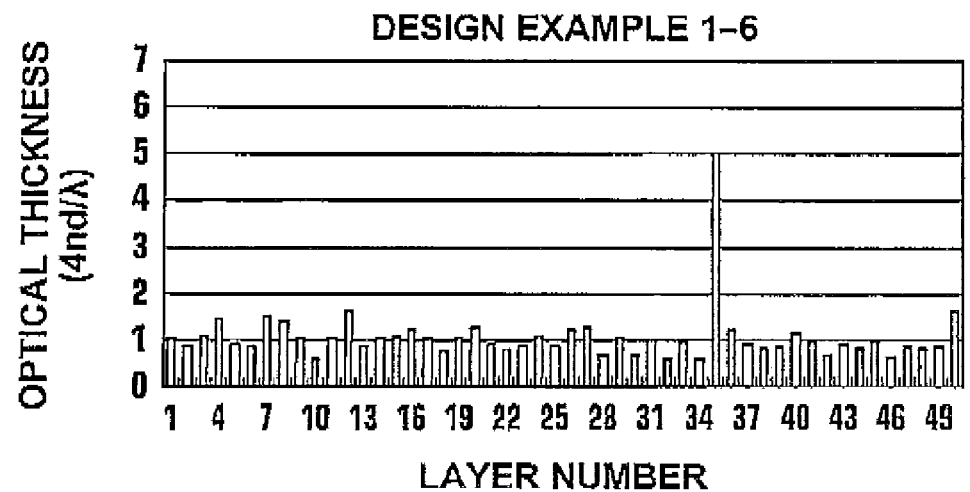
FIG. 7A is a diagram illustrating Design Example 1-6 of the structure of a coating of the negative dispersion mirror according to the present invention.
Figure 7B:
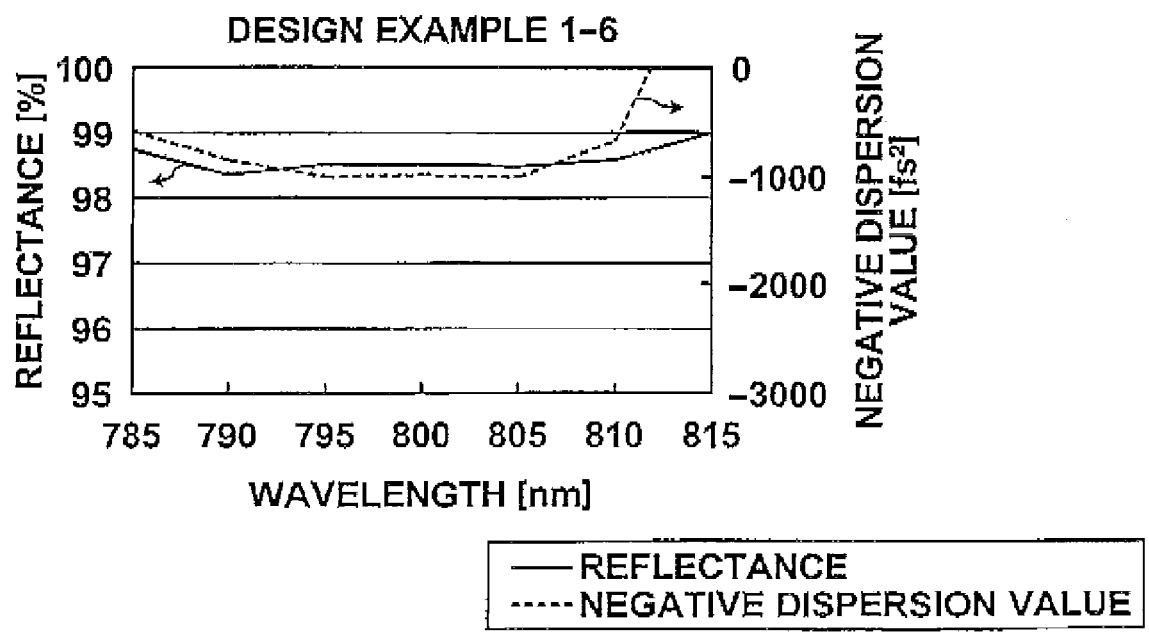
FIG. 7B is a graph showing the reflectance and the dispersion value in the negative dispersion mirror of Design Example 1-6.

In the multilayer coating structure of Design Example 1-6, which is illustrated in FIG. 7A, the first through 34th layers form a mirror-function layer $ML_1$, the 35th layer forms a cavity layer C and the 36th through 50th layers form a mirror-function layer $ML_2$ in a manner similar to Design Example 1-2. FIG. 7B indicates that the mirror that has the coating structure as illustrated in FIG. 7A has a characteristic that the reflectance=98.5% and the negative dispersion value=1000 fs² are satisfied at least in the range of ±5 nm with respect to the center wavelength of 800 nm.

Design Example 1-5 and Design Example 1-6 have different coating structures from each other. However, in Design Example 1-5 and Design Example 1-6, substantially the same characteristic can be obtained in the range of 795 nm to 805 nm.

In all of the design examples, the optical thickness of the cavity layer, which is normalized by λ/4, is a value between 4 and 5. Further, the optical thickness of each layer forming the mirror-function layers is greater than or equal to 0.5 and less than 2 with respect to the base value at 1. However, it is not necessary that the optical thickness of the cavity layer is between 4 and 5 as long as the value of the optical thickness is greater than or equal to 2. Further, it is not necessary that the number of layers forming the multilayer coating structure is 50. Further, in the aforementioned design examples, the center wavelength λ was set at 1045 nm or 800 nm. However, the center wavelength may be set at an arbitrary value. When the mirror is used in a mode-locked solid-state laser apparatus, a mirror that has a center wavelength in 1 μm band (1000 nm to 1100 nm) or 0.8 μm band (700 nm to 900 nm) may optionally be used.

A center wavelength λ, a desirable dispersion value in the range of −600 fs² to −3000 fs² and a desirable reflectance in the range of 97% to 99.5% are set. Then, other initial conditions, such as the numer of layers, a refractive index (coating material), coating structure and an approximate coating thickness (the optical thickness of each layer forming the mirror-function layers is set at a value in the vicinity of the center wavelength λ/4 and the optical thickness of the cavity layer is set at λ/4×n, which is an integer times the center wavelength), are set. The setting of the coating structure includes an approximate position of the cavity layer, the number of layers forming each of the mirror-function layers and the like. After the initial conditions are set, computer simulation is performed (simulation using thin-film calculation software "Essential Macleod"). After then, these initial conditions are manually corrected or automatically corrected by a computer. Accordingly, the coating structures in the aforementioned design examples can be obtained.

Figure 8:
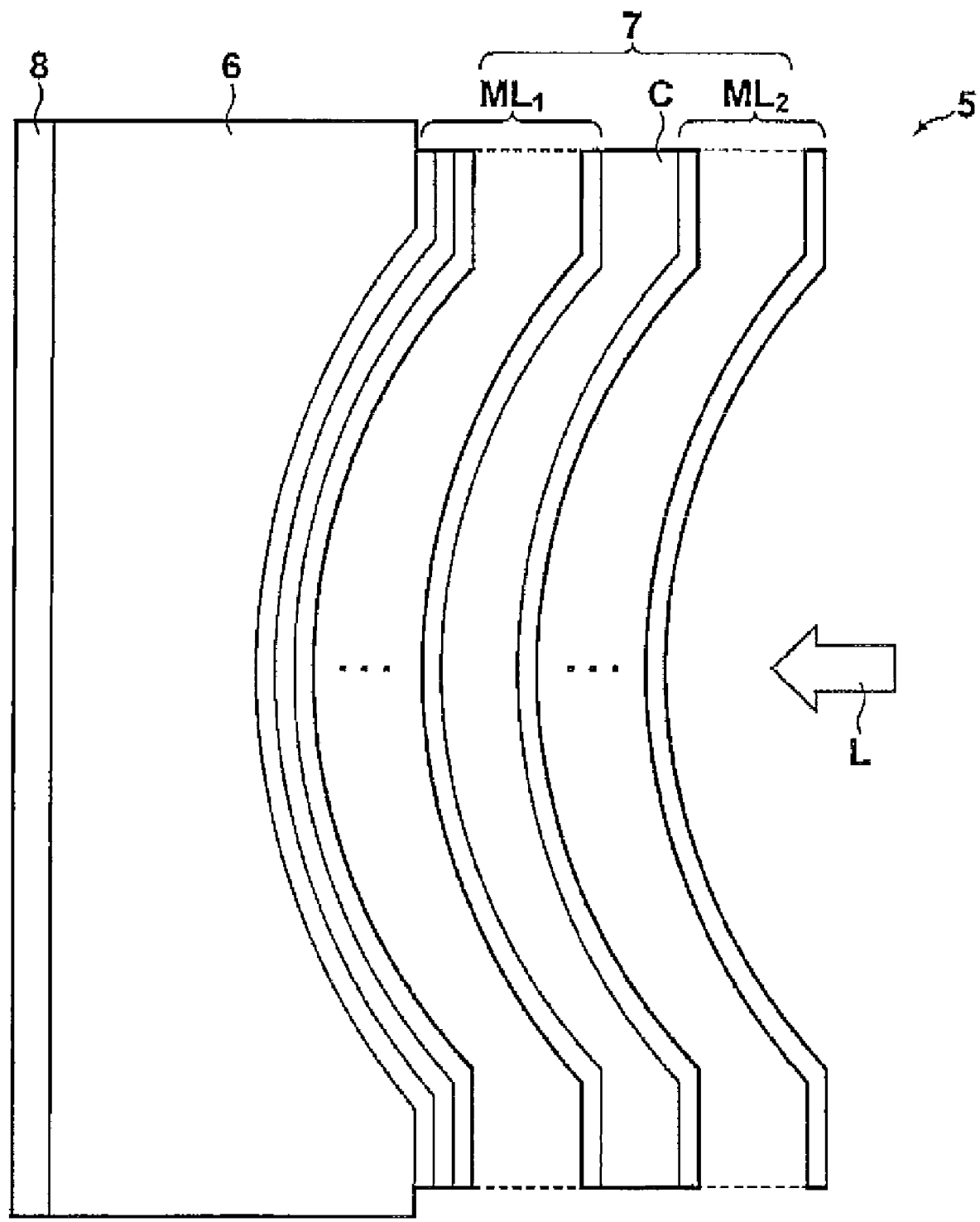
FIG. 8 is a schematic diagram illustrating the structure of a negative dispersion mirror that is used as an output mirror.

When the first negative dispersion mirror according to the present invention is used as an output mirror of a mode-locked solid-state laser apparatus, a negative dispersion mirror 5 according to a second embodiment of the present invention, as illustrated in FIG. 8, may optionally be used. The negative dispersion mirror 5 includes a glass substrate 6 having a concave surface and a multilayer coating structure 7 for light L that has a predetermined wavelength, the multilayer coating structure 7 being provided on the concave surface of the glass substrate 6. The structure of the multilayer coating structure 7 is similar to Embodiment 1, as described above. Specifically, the multilayer coating structure 7 includes two mirror-function layer portions $ML_1$ and $ML_2$ and a cavity layer C. Each of the two mirror-function layer portions $ML_1$ and $ML_2$ includes a plurality of layers deposited one on another. Further, the cavity layer C is provided between the two mirror-function layer portions $ML_1$ and $ML_2$ and generates resonance of light L having a predetermined wavelength between the two mirror-function layer portions $ML_1$ and $ML_2$. The dispersion value with respect to the light L that has the predetermined wavelength is in the range of −600 fs² to −3000 fs² and the reflectance is in the range of 97% to 99.5% Specifically, the coating structure in Design Examples 1-1 through 1-6, as described above, may be adopted.

The light L that has the predetermined wavelength is output from a solid-state laser medium and resonates within the resonator. The wavelength of the light L is determined based on the structure of the mode-locked solid-state laser apparatus in which the negative dispersion mirror 5 is adopted. For example, when Yb:KYW(K(WO$_4$)$_2$) is used as a solid-state laser medium, λ=1045 nm. When Yb:KGW(Gd(WO$_4$)$_2$) is used as the solid-state laser medium, λ=1040 nm. When YB:YAG is used, λ=1050 nm. When Yb:Y$_2$O$_3$ is used, λ=1076 nm. When Alexandrite (BeAl$_2$O$_4$:Cr$^{3+}$) is used, λ=750 m. When Cr$^{3+}$:LiSrAlF$_6$ is used, λ=850 nm. When Cr$^{3+}$:LiCaAlF$_6$ is used, λ=850 nm. When Ti:Al$_2$O$_3$ is used, λ=800 nm.

Further, an antireflection coating 8 is provided on a surface of the glass substrate 6, the surface on the opposite side of the surface on which the multilayer coating structure is provided. The antireflection coating 8 is provided to prevent light that has passed through the multilayer coating structure 7 from being reflected at a surface of the substrate 6, the surface facing the concave surface thereof. The reflectance of the mirror with respect to light L that enters the mirror from the multilayer-coating-structure-7-deposited side of the mirror is in the range of 97% to 99.5%. Therefore, 3% to 0.5% component of the light is transmitted through the mirror toward the antireflection coating 8.

It the negative dispersion mirror illustrated in FIG. 8 is used as an output mirror of the mode-locked solid-state laser apparatus, it is possible to reduce the size of the solid-state laser apparatus. Further, it is possible to obtain stable pulse laser oscillation in the femtosecond regime.

<Second Negative Dispersion Mirror of the Present Invention>

FIG. 9 is a schematic diagram illustrating the structure of a negative dispersion mirror 101 according to a third embodiment of the present invention.

The negative dispersion mirror 101 in the present embodiment is a mirror including a glass substrate 103 and a dielectric multilayer coating structure 104 formed on the glass substrate 103. Further, the dielectric multilayer coating structure 104 includes at least three mirror-function layer portions $ML_1, ML_2, \ldots ML_{m+1}$ and cavity layers $C_1, C_2, \ldots C_m$. Each of the mirror-function layer portions $ML_1, ML_2, \ldots ML_{m+1}$ includes a plurality of layers deposited one on another. The cavity layers $C_1, C_2, \ldots C_m$ are provided between the mirror-function layer portions and generate resonance of light L having a predetermined wavelength between the mirror-function layer portions. In the second negative dispersion mirror of the present invention, the plurality of cavity layers are arranged across the entire multilayer coating structure at predetermined intervals with the mirror-function layer portion therebetween.

Each layer of the multilayer coating structure 104 is deposited one on another in the order of the first layer, the second layer, ..., the (k−1)th layer, the k-th layer, the (K+1)th layer, ..., the n-th layer from the substrate-103-side The layers from the first layer to the (k−1)th layer form the mirror-function layer portion $ML_1$. The k-th layer forms the cavity layer $C_1$ and so on. The mirror-function layer portions $ML_m$ and the cavity layers $C_m$ are alternately deposited one on another from the substrate side. The mirror-function layer portion $ML_{m+1}$ is arranged at a position that is closest to the air side. When the multilayer coating structure 104 has minimum structure, m=2. Specifically, the number of the mirror-function layer portions ML is three and the number of the cavity layers is two. Further, there is no upper limit for the value of m and the value of m may be increased or decreased, if desirable or necessary.

The cavity layers should not be arranged only in a part of the multilayer coating structure 104 in close proximity to each other. The cavity layers are evenly arranged across the entire multilayer coating structure. When the number of the cavity layers is three or greater, the cavity layers are arranged at substantially equal intervals in such a manner that the intervals are within ±35% of the average value of the intervals.

The negative dispersion mirror 101 has a dispersion value in the range of −600 fs$^2$ to −3000 fs$^2$ with respect to light L having a predetermined wavelength and a reflectance in the range of 97% to 99.5% with respect to the light L having the predetermined wavelength. Here, the light L having the predetermined wavelength has a bandwidth that is greater than or equal to 10 nm. Specifically, the dispersion value of the negative dispersion mirror 101 is a predetermined value in the range of −600 fs$^2$ to −3000 fs$^2$ with respect to light that has a bandwidth greater than or equal to 10 nm. Further, the reflectance of the negative dispersion mirror 1 is a predetermined value in the range of 97% to 99.5% with respect to light that has a bandwidth greater than or equal to 10 nm. The dispersion value and the reflectance may be set at arbitrary values within these ranges, respectively.

Each of the mirror-function layer portions $ML_1$ and $ML_2$ is formed by layers having a relatively high refractive index $n_1$ and layers having a relatively low refractive index $n_2$ ($<n_1$) that are alternately deposited one on another. It is desirable that the total number of the alternately deposited layers in each of the mirror function-layer portions $ML_1$ and $ML_2$ is greater than or equal to five. For example, odd-number layers (the first layer, the third layer, ...) should be formed as high refractive index layers and even-number layers (the second layer, the fourth layer, ...) should be formed as low refractive index layers.

Specifically, the high refractive index layer may essentially consist of a material that is selected from the group consisting of Ti-oxide, Zr-oxide, Hf-oxide, Nb-oxide, Al-oxide, Zn-oxide, Y-oxide, Sc-oxide, La-oxide, Ce-oxide, Pr-oxide, Ta-oxide and Zn-sulfide or of a mixture or compound containing at least one of the oxides and the sulfide.

Further, the low refractive index layer may essentially consist of a material selected from the group consisting of Si-oxide, Ca-fluoride, Li-fluoride, Mg-fluoride, Na-fluoride, Th-fluoride, Al-fluoride, Hf-fluoride, La-fluoride, Y-fluoride and Zr-fluoride or a mixture or compound containing at least one of the oxide and the fluorides.

The low refractive index layer and the high refractive index layer should be made of a dielectric that has a relatively low refractive index and a dielectric that has a relatively high refractive index, respectively, and any kind of known material may be used.

Meanwhile, the refractive index of the cavity layer is not particularly limited. It the material that is used to form the high refractive index layer or the low refractive index layer of the mirror-function layer portions is used as the material for the cavity layer, it is not necessary to prepare an additional material for the cavity layer. Therefore, it is desirable to use the material used in the mirror-function layer portion because it is possible to prevent an increase in the cost and an increase in the number of steps.

The center wavelength λ of the predetermined wavelength should be set at an arbitrary wavelength in the range of 1000 nm to 1100 nm or in the range of 700 nm to 900 nm. Further, the optical thickness of each layer is set based on the arbitrary wavelength λ.

Generally, the cavity layer has a relatively great optical thickness compared with other layers. Here, the optical thickness of the cavity layer C is greater than or equal to twice the value of λ/4, namely, greater than or equal to λ/2. Optionally, the optical layer thickness of the cavity layer C may be four to eight times greater than the value of λ/4. Meanwhile, the optical thickness of each layer forming the mirror-function layer portions $ML_1, ML_2 \ldots$ is greater than equal to the half of the value of λ/4 and less than twice the value of λ/4, namely, greater than or equal to λ/8 and less than λ/2. The optical thickness is represented by "n·d" which is the product of the refractive index n of the layer and the coating thickness d (nm) of the layer.

Next, concrete examples of the structure of coating will be described. FIGS. 10A through 21A are diagrams for Design Examples 2-1 through 2-12, respectively. FIGS. 10A through 21A illustrate the optical thickness of each layer with respect to a predetermined center wavelength λ, FIGS. 10B through 21B are graphs showing reflectances and negative dispersion values that are realized by the coating structure of Design Examples 2-1 through 2-12, which are illustrated in FIGS. 10 through 21A, respectively. Design Examples 2-1 through 2-10 have been designed by setting the center wavelength λ at 1045 nm. Design Examples 2-11 and 2-12 have been designed by setting the center wavelength λ at 800 nm. All of the values have been obtained by simulation.

In FIGS. 10A through 21A, the horizontal axis represents the layer numbers and the vertical axis represents the optical thickness (4nd/λ) normalized by the value of λ/4. The first layer is the layer closest to the substrate side and the 50th layer is the layer closest to the air side (outer side). In FIGS. 10B through 21B, the horizontal axis represents the predetermined wavelength (nm) of light and the vertical axis represents the reflectance (%) and the negative dispersion value ($fs^2$).

Figure 10A:
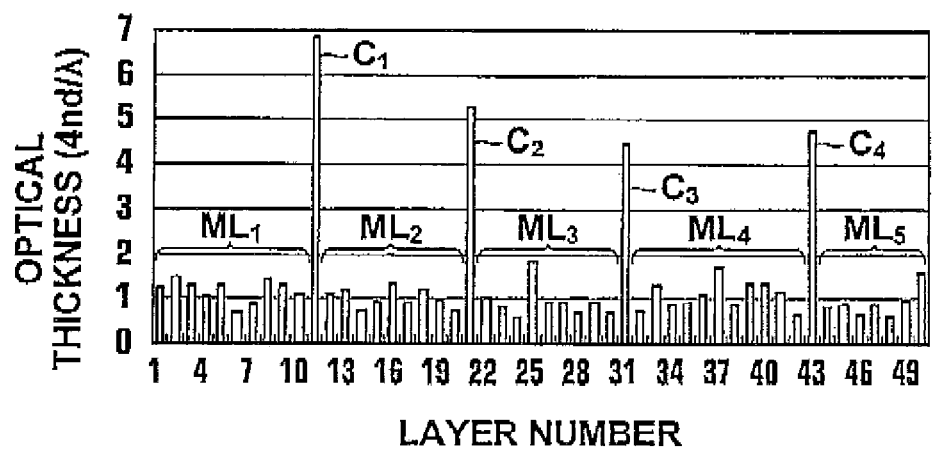
FIG. 10A is a diagram illustrating Design Example 2-1 of the structure of a coating of the negative dispersion mirror according to the present invention.

In the multilayer coating structure of Design Example 2-1, which is illustrated in FIG. 10A, the first through tenth layers form the mirror-function layer portion $ML_1$, the 11th layer forms the cavity layer $C_1$, the 12th through 20th layers form the mirror-function layer portion $ML_2$, the 21st layer forms the cavity layer $C_2$, the 22nd through 30th layers form the mirror-function layer portion $ML_3$, the 31st layer forms the cavity layer $C_3$, the 32nd through 42nd layers form the mirror-function layer portion $ML_4$, the 43rd layer forms the cavity layer $C_4$ and the 44th through 50th layers form the mirror-function layer portion $ML_5$. The numbers of layers forming the mirror-function layer portions are 10, 9, 9, 11 and 7, respectively. The intervals between the cavity layers are 9 layers, 9 layers and 11 layers, respectively, and the average value of the intervals is 9.6. The cavity layers are arranged at substantially equal intervals.

Figure 10B:
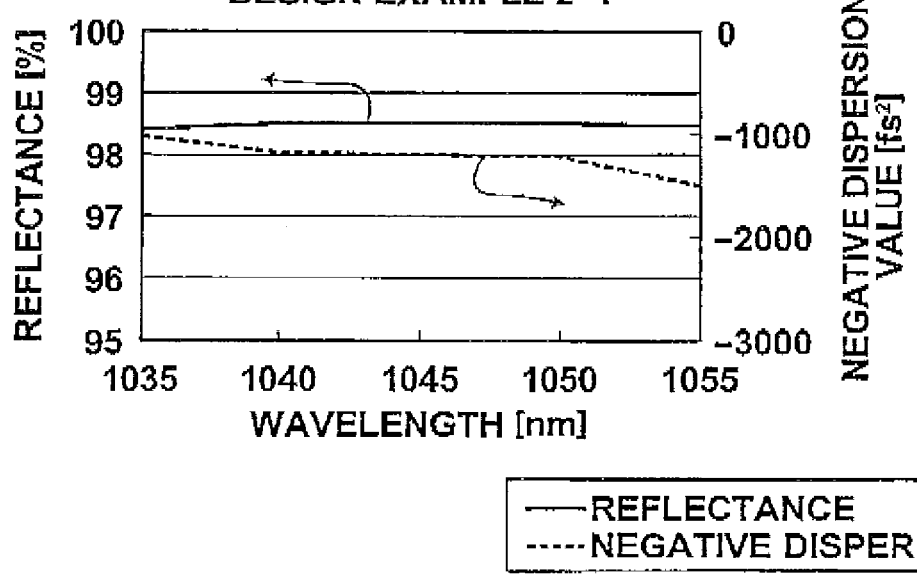
FIG. 10B is a graph showing the reflectance and the dispersion value in the negative dispersion mirror of Design Example 2-1.

FIG. 10B indicates that the mirror that has the coating structure as illustrated in FIG. 10A has a characteristic that the reflectance=98.5% and the negative dispersion value=−1200 $fs^2$ are satisfied at least in the range of ±5 nm with respect to the center wavelength of 1045 nm.

Figure 11A:
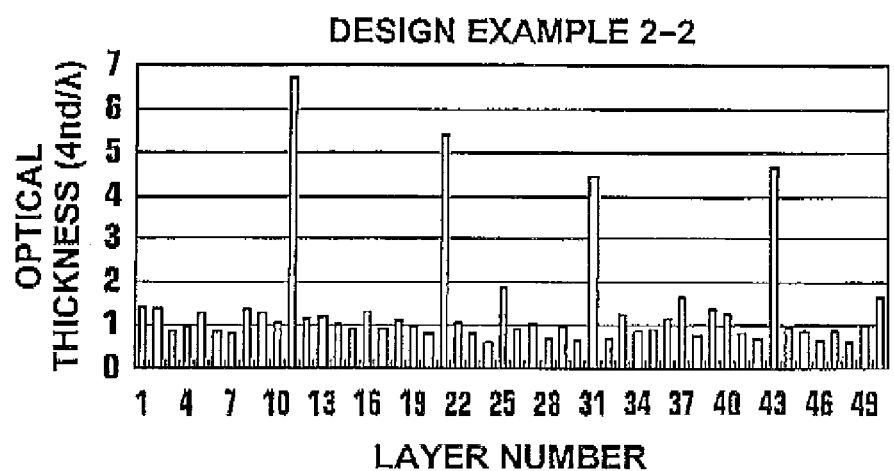
FIG. 11A is a diagram illustrating Design Example 2-2 of the structure of a coating of the negative dispersion mirror according to the present invention.
Figure 11B:
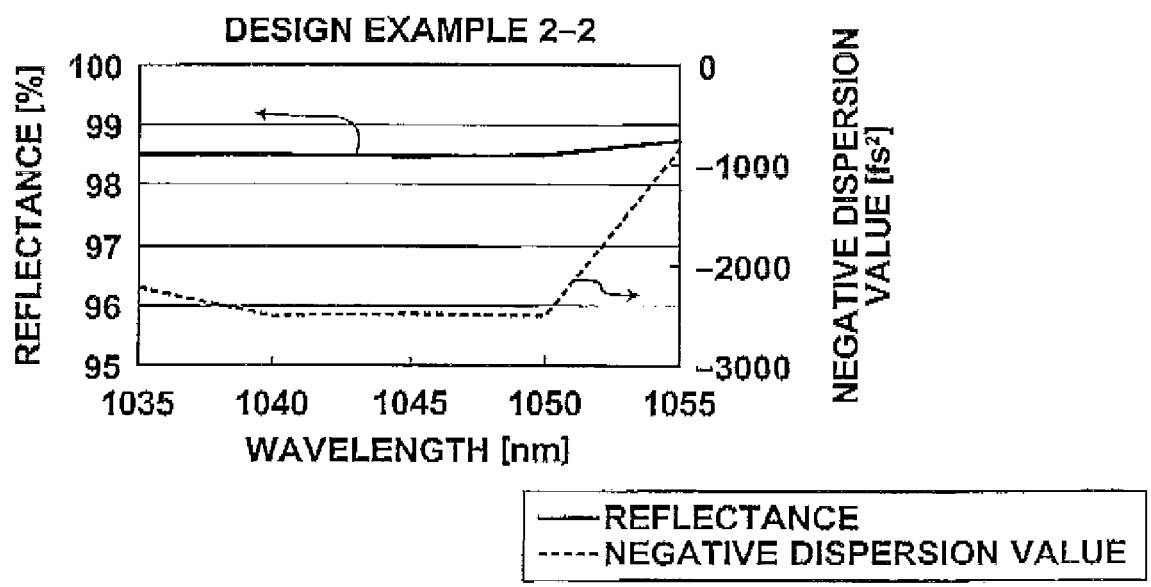
FIG. 11B is a graph showing the reflectance and the dispersion value in the negative dispersion mirror of Design Example 2-2.

In the multilayer coating structure of Design Example 2-2, illustrated in FIG. 11A, the number of layers forming each of the mirror-function layer portions ML and the cavity layers C is the same as that of Design Example 2-1. Further, the optical thickness of each of the cavity layers is substantially the same as that of each of the cavity layers of Design Example 2-1. However, the optical thickness of each layer forming the mirror-function layer portions, particularly, the mirror-function layer portion $ML_1$ and the mirror-function layer portion $ML_2$ on the substrate side is different from that of each layer of Design Example 2-1. FIG. 11B indicates that the mirror that has the coating structure as illustrated in FIG. 11A has a characteristic that the reflectance=98.5 and the negative dispersion value=−2500 $fs^2$ are satisfied at least in the range of ±5 nm with respect to the center wavelength of 1045 nm.

The structure of coating of Design Example 2-1 and that of Design Example 2-2 are similar to each other. However, in the range of 1040 nm to 1050 nm, the negative dispersion value of Design Example 2-1 is −1200 $fs^2$ and the negative dispersion value of Design Example 2-2 is −2500 $fs^2$ and they are significantly different from each other.

Figure 12A:
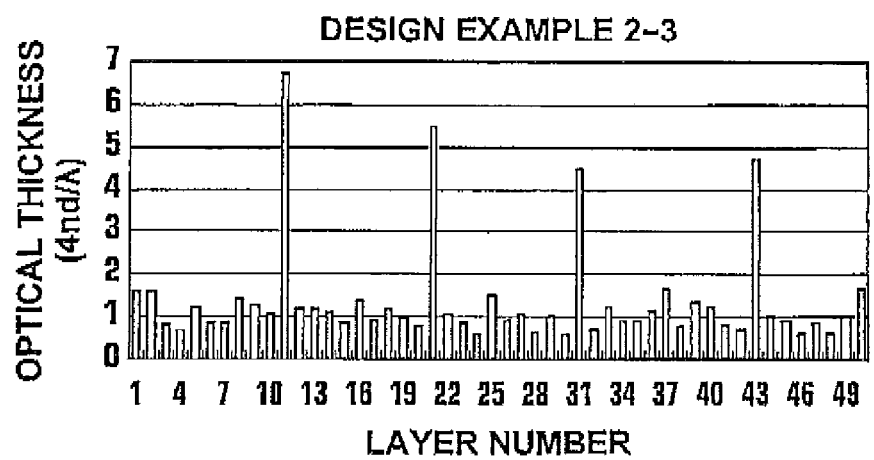
FIG. 12A is a diagram illustrating Design Example 2-3 of the structure of a coating of the negative dispersion mirror according to the present invention.
Figure 12B:
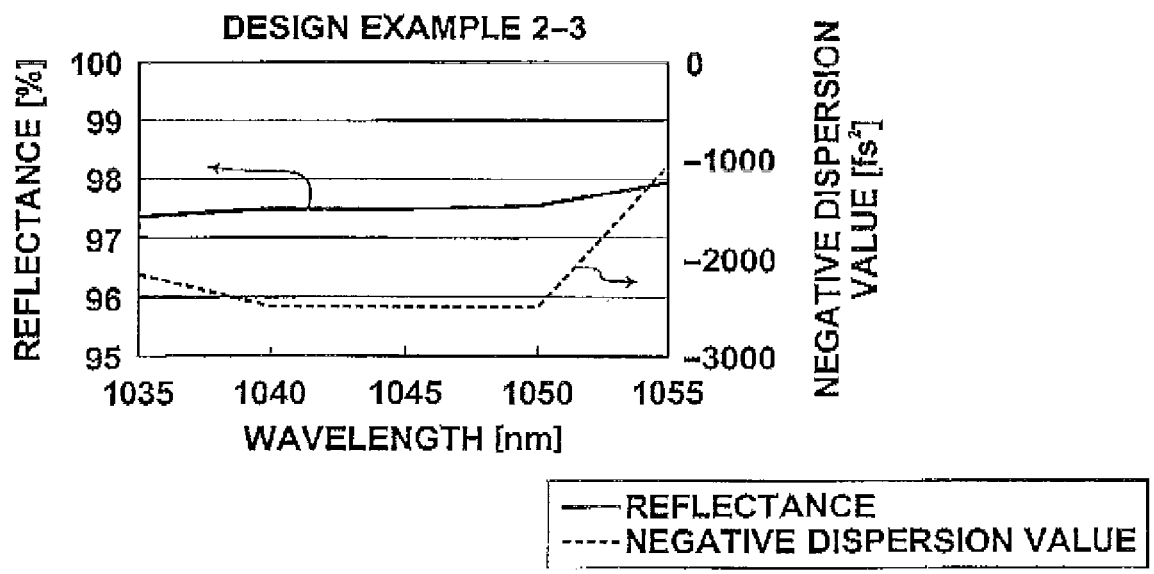
FIG. 12B is a graph showing the reflectance and the dispersion value in the negative dispersion mirror of Design Example 2-3.

In the multilayer coating structure of Design Example 2-3, illustrated in FIG. 12A, the number of layers forming each of the mirror-function layer portions ML and the cavity layers C is the same as that of Design Example 2-1. Further, the optical thickness of each of the cavity layers is substantially the same as that of each of the cavity layers of Design Example 2-1. However, the optical thickness of each layer forming the mirror-function layer portions, particularly, the mirror-function layer portion $ML_1$ and the mirror-function layer portion $ML_2$ on the substrate side is different from that of each layer of Design Examples 2-1 and 2-2. FIG. 12B indicates that the mirror that has the coating structure as illustrated in FIG. 12A has a characteristic that the reflectance=97.5% and the negative dispersion value=−2500 $fs^2$ are satisfied at least in the range of ±5 nm with respect to the center wavelength of 1045 nm.

Design Example 2-2 and Design Example 2-3 have different coating structures from each other. However, substantially the same characteristic can be obtained in the range of 1040 nm to 1050 nm in Design Examples 2-2 and 2-3.

Figure 13A:
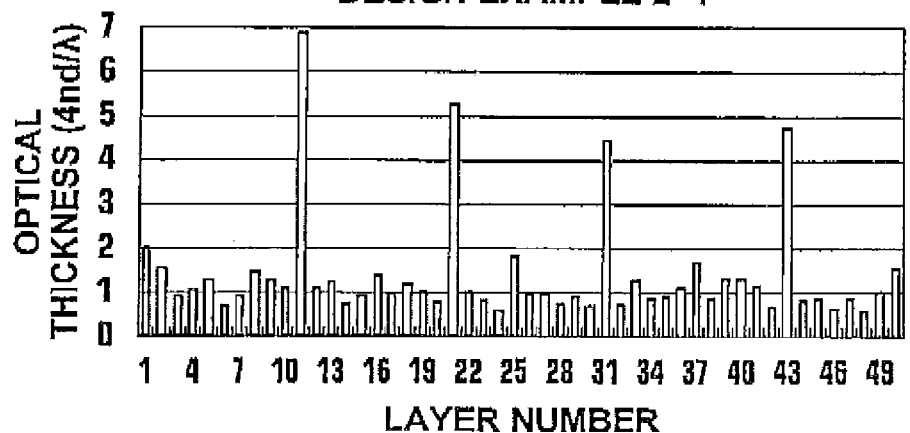
FIG. 13A is a diagram illustrating Design Example 2-4 of the structure of a coating of the negative dispersion mirror according to the present invention.
Figure 13B:
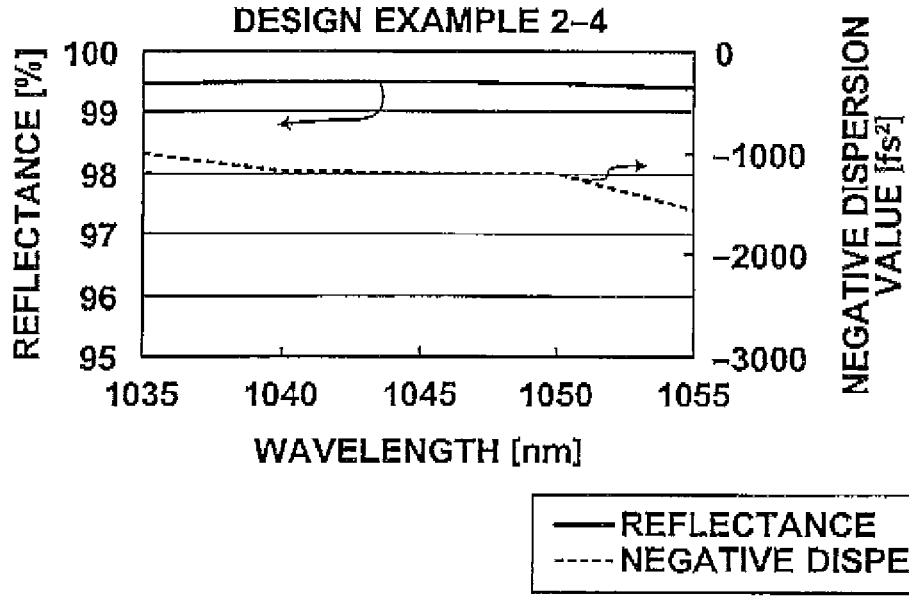
FIG. 13B is a graph showing the reflectance and the dispersion value in the negative dispersion mirror of Design Example 2-4.

In the multilayer coating structure of Design Example 2-4, illustrated in FIG. 13A, the number of layers forming each of the mirror-function layer portions ML and the cavity layers C is the same as that of Design Example 2-1. Further, the optical thickness or each of the cavity layers is substantially the same as that of each of the cavity layers of Design Example 2-1. However, the optical thickness of each layer forming the mirror-function layer portions, particularly, the mirror-function layer portion $ML_1$ and the mirror-function layer portion $ML_2$ on the substrate side is different from that of each layer of Design Example 2-1. FIG. 13B indicates that the mirror that has the coating structure as illustrated in FIG. 13A has a characteristic that the reflectance=99.5% and the negative dispersion value=−1200 $fs^2$ are satisfied at least in the range of ±5 nm with respect to the center wavelength of 1045 nm.

In Design Examples 2-1 through 2-4, the layer number (arrangement) of the layer forming each of the cavity layers $C_1, C_2, \ldots C_5$ is the same. Further, the optical thickness of the cavity layer is substantially the same. Further, the number of layers forming each of the mirror-function layer portions $ML_1, ML_2, \ldots ML_5$ is the same. However, significantly different characteristics are obtained.

The multilayer coating structures of Design Examples 2-5 through 2-8, illustrated in FIGS. 14A through 17A, differ from the multilayer coating structure of Design Example 2-1, in that each of the multilayer coating structures of Design Examples 2-5 through 2-8 includes a layer that has an extremely great optical thickness as the first layer, which is closest to the substrate, and that the mirror-function layer portion $ML_1$ is formed by the second through tenth layers. The layer numbers of layers forming each of the other mirror-function layer portions $ML_2, \ldots ML_5$ and the cavity layers $C_1, C_2, \ldots C_5$ and the number of layers forming each of the mirror-function layer portions $ML_2, \ldots ML_5$ and the cavity layers $C_1, C_2, \ldots C_5$ are the same as those of Design Example 2-1. Further, the optical thickness of each of the cavity layers is substantially the same as that of Design Example 2-1.

Figure 14A:
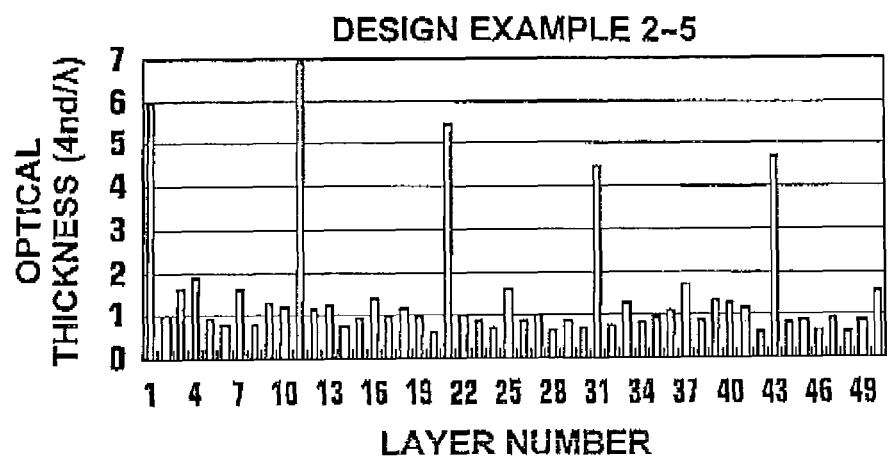
FIG. 14A is a diagram illustrating Design Example 2-5 of the structure of a coating of the negative dispersion mirror according to the present invention.
Figure 14B:
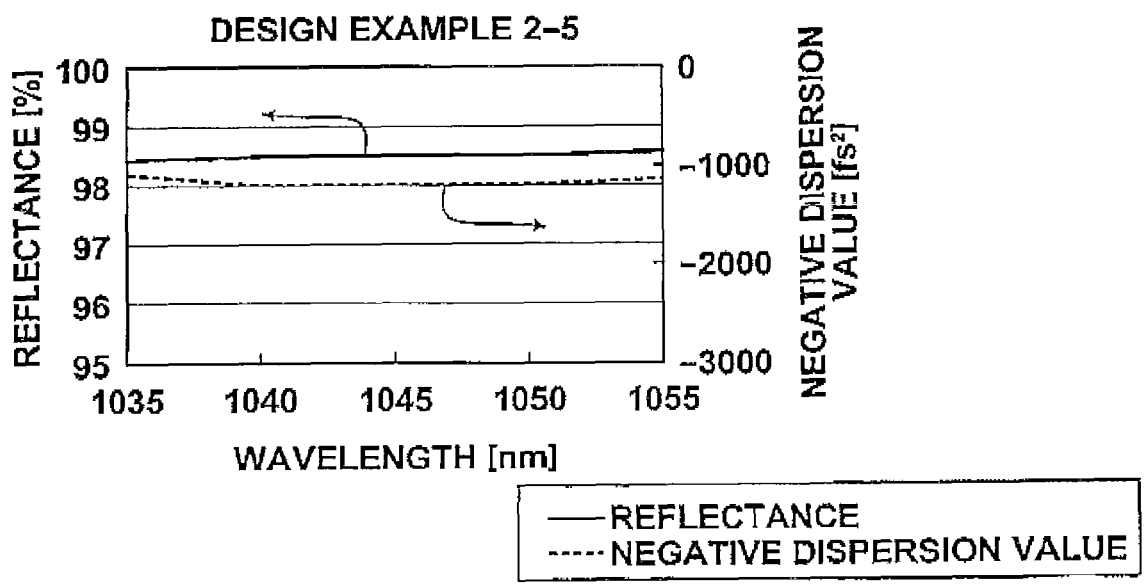
FIG. 14B is a graph showing the reflectance and the dispersion value in the negative dispersion mirror of Design Example 2-5.

FIG. 14B indicates that the mirror that has the coating structure as illustrated in FIG. 14A has a characteristic that the reflectance 98.5% and the negative dispersion value −1200 $fs^2$ are satisfied at least in the range of ±5 nm with respect to the center wavelength of 1045 nm.

Figure 15A:
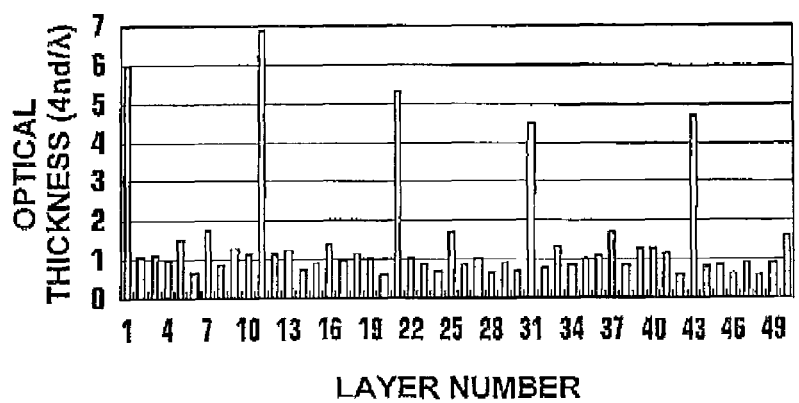
FIG. 15A is a diagram illustrating Design Example 2-6 of the structure of a coating of the negative dispersion mirror according to the present invention.
Figure 15B:
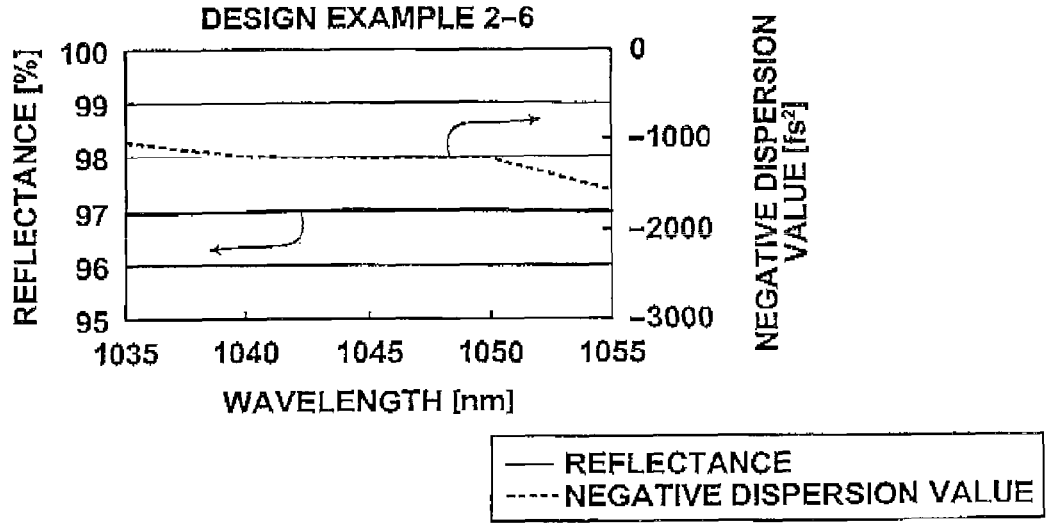
FIG. 15B is a graph showing the reflectance and the dispersion value in the negative dispersion mirror of Design Example 2-6.

FIG. 15B indicates that the mirror that has the coating structure as illustrated in FIG. 15A has a characteristic that the reflectance=97% and the negative dispersion value=−1200 $fs^2$ are satisfied at least in the range of ±5 nm with respect to the center wavelength of 1045 nm.

Figure 16A:
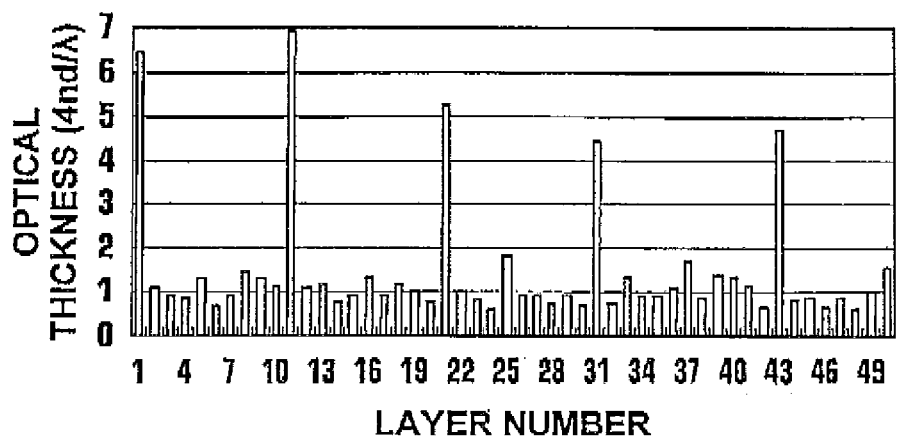
FIG. 16A is a diagram illustrating Design Example 2-7 of the structure of a coating of the negative dispersion mirror according to the present invention.
Figure 16B:
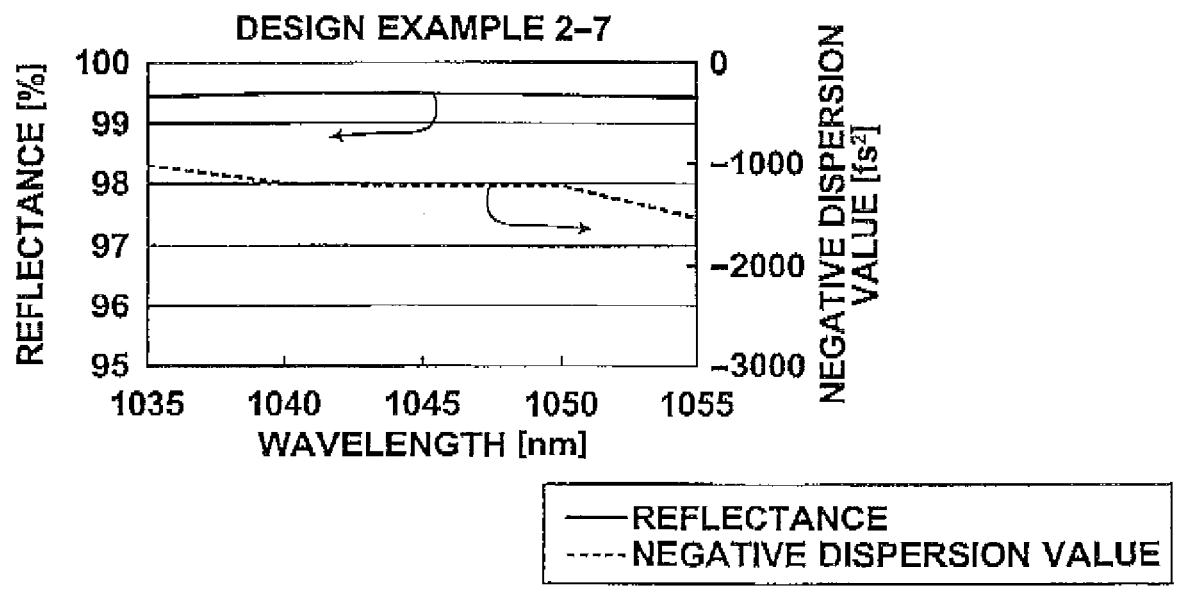
FIG. 16B is a graph showing the reflectance and the dispersion value in the negative dispersion mirror of Design Example 2-7.

FIG. 16B indicates that the mirror that has the coating structure as illustrated in FIG. 16A has a characteristic that the reflectance=99.5% and the negative dispersion value=−1200 $fs^2$ are satisfied at least in the range of ±5 nm with respect to the center wavelength of 1045 nm.

Figure 17A:
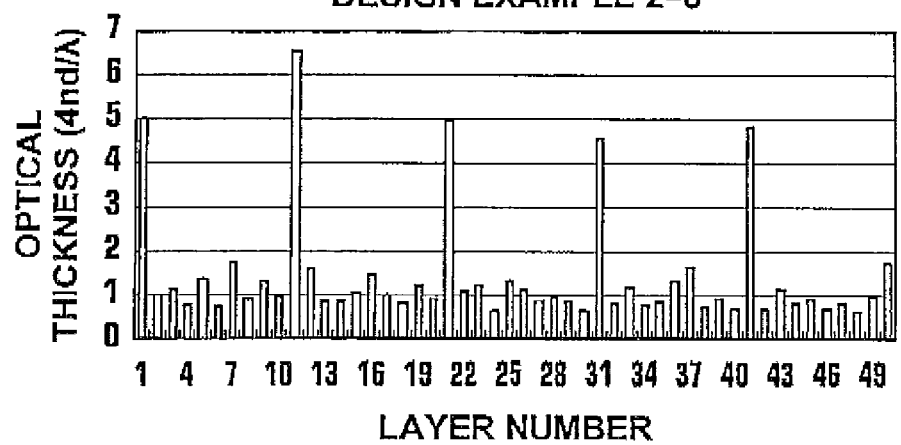
FIG. 17A is a diagram illustrating Design Example 2-8 of the structure of a coating of the negative dispersion mirror according to the present invention.
Figure 17B:
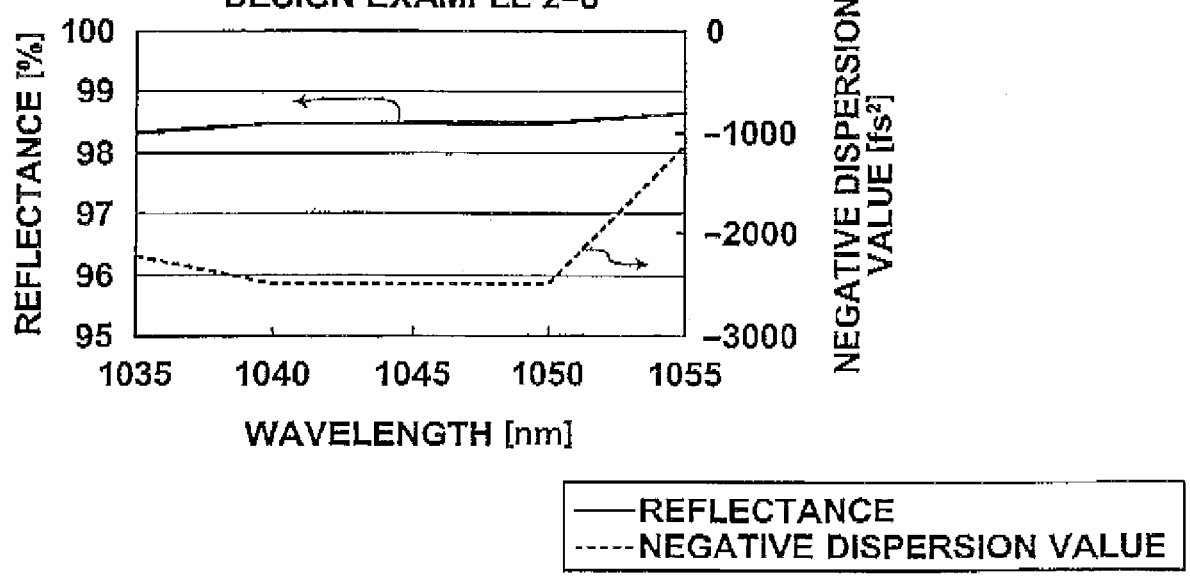
FIG. 17B is a graph showing the reflectance and the dispersion value in the negative dispersion mirror of Design Example 2-8.

FIG. 17B indicates that the mirror that has the coating structure as illustrated in FIG. 17A has a characteristic that the reflectance=98.5% and the negative dispersion value=−2500 $fs^2$ are satisfied at least in the range of ±5 nm with respect to the center wavelength of 1045 nm.

Even if a layer that has a great optical thickness is provided as the first layer, which is arranged closest to the substrate, as in Examples 2-5 through 2-8, it is possible to structure a mirror that has a negative dispersion value in the range of −600 $fs^2$ to −3000 $fs^2$ and a reflectance in the range of 97% to 99.5% in a manner similar to the case in which a layer that has a great optical thickness is not provided as the first layer, as in Design Examples 2-1 through 2-4.

Figure 18A:
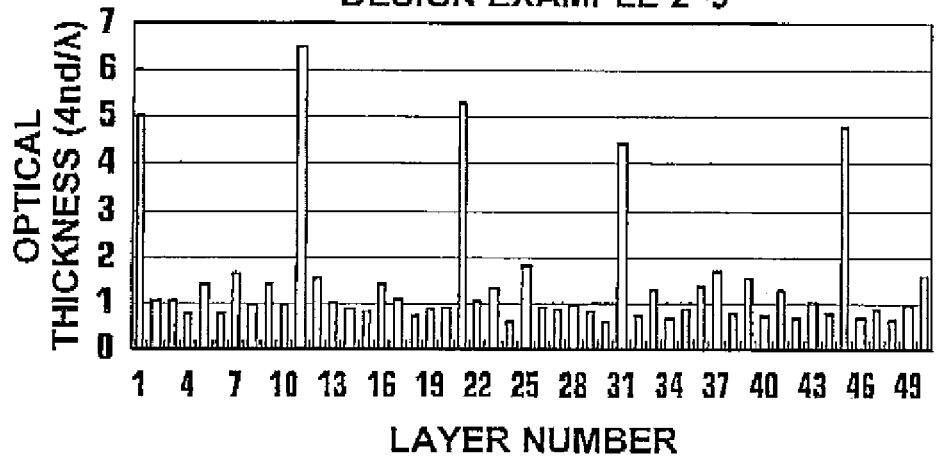
FIG. 18A is a diagram illustrating Design Example 2-9 of the structure of a coating of the negative dispersion mirror according to the present invention.

The multilayer coating structure of Design Example 2-9, illustrated in FIG. 18A, is similar to the multilayer coating structures of Design Examples 2-5 through 2-8 in that a layer that has a great optical thickness is provided as the first layer, which is closest to the substrate. In the multilayer coating structure of Design Example 2-9, the second through tenth layers form the mirror-function layer portion $ML_1$, the 11th layer forms the cavity layer $C_1$, the 12th through 20th layers form the mirror-function layer portion $ML_2$, the 21st layer forms the cavity layer $C_2$, the 22nd through 30th layers form the mirror-function layer portion $ML_3$, the 31st layer forms the cavity layer $C_3$, the 32nd through 44th layers form the mirror-function layer portion $ML_4$, the 45th layer forms the cavity layer $C_4$ and the 46th through 50th layers form the mirror-function layer portion $ML_5$. The numbers of layers forming the mirror-function layer portions are 9, 9, 9, 13 and 5, respectively. The intervals between the cavity layers are 9 layers, 9 layers and 13 layers, respectively, and the average value of the intervals is 10.3. The cavity layers are arranged at substantially equal intervals in the range of ±30% of the average value of the intervals.

Figure 18B:
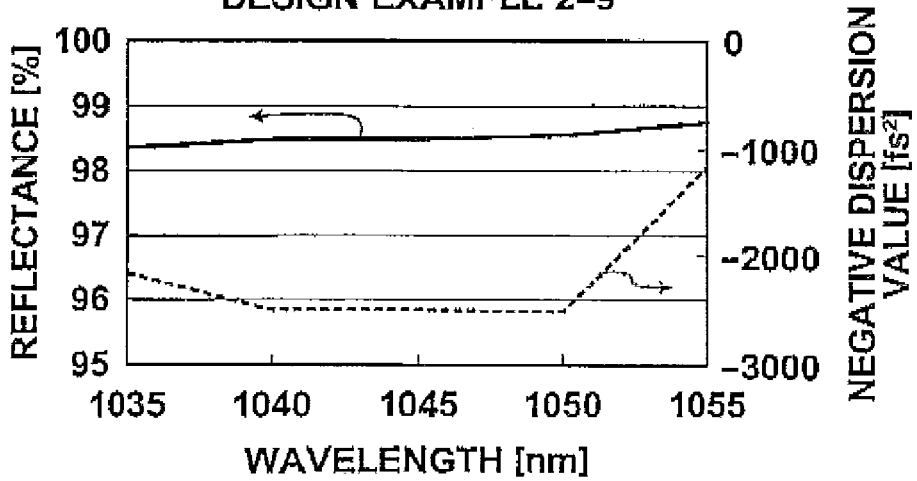
FIG. 18B is a graph showing the reflectance and the dispersion value in the negative dispersion mirror of Design Example 2-9.

FIG. 18B indicates that the mirror that has the coating structure as illustrated in FIG. 18A has a characteristic that the reflectance=98.5 and the negative dispersion value=−2500 $fs^2$ are satisfied at least in the range of ±5 nm with respect to the center wavelength of 1045 nm.

Figure 19A:
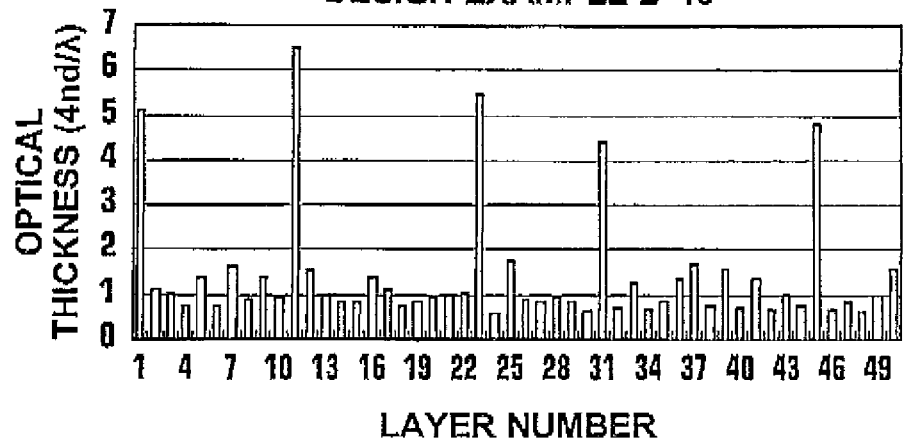
FIG. 19A is a diagram illustrating Design Example 2-10 of the structure of a coating of the negative dispersion mirror according to the present invention.

The multilayer coating structure of Design Example 2-10, illustrated in FIG. 19A, is similar to the multilayer coating structures of Design Examples 2-5 through 2-8 in that a layer that has a great optical thickness is provided as the first layer, which is closest to the substrate. In the multilayer coating structure of Design Example 2-10, the second through tenth layers form the mirror-function layer portion $ML_1$, the 11th layer forms the cavity layer $C_1$, the 12th through 22nd layers form the mirror-function layer portion $ML_2$, the 23rd layer forms the cavity layer $C_2$, the 24th through 30th layers form the mirror-function layer portion $ML_3$, the 31st layer forms the cavity layer $C_3$, the 32nd through 44th layers form the mirror-function layer portion $ML_4$, the 45th layer forms the cavity layer $C_4$ and the 46th through 50th layers form the mirror-function layer portion $ML_5$. The numbers of layers forming the mirror-function layer portions are 9, 11, 7, 13 and 5, respectively. The intervals between the cavity layers are 11 layers, 7 layers and 13 layers, respectively, and the average value of the intervals is 10.3. The cavity layers are arranged at substantially equal intervals in the range of ±35% of the average value of the intervals.

Figure 19B:
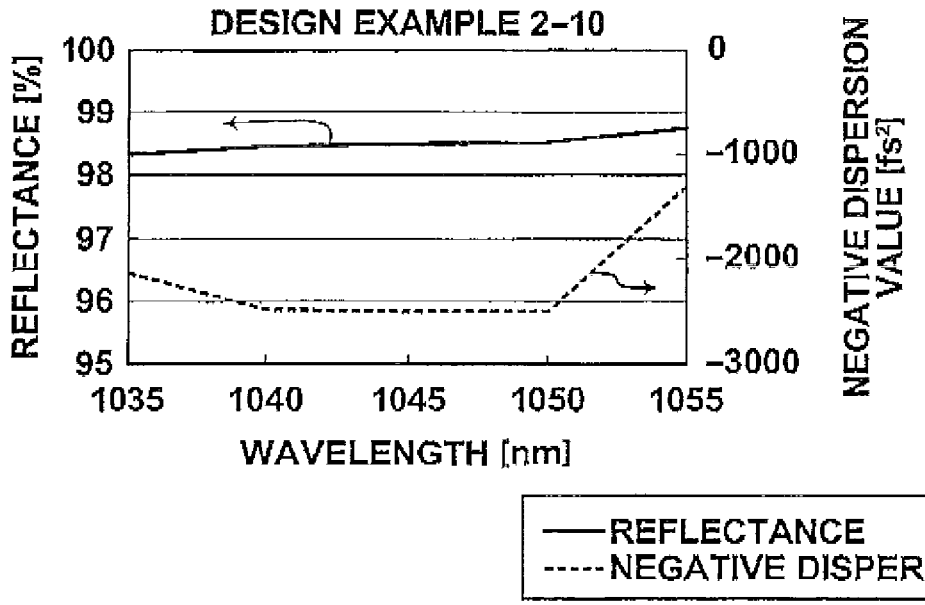
FIG. 19B is a graph showing the reflectance and the dispersion value in the negative dispersion mirror of Design Example 2-10.

FIG. 19B indicates that the mirror that has the coating structure as illustrated in FIG. 19A has a characteristic that the reflectance=98.5% and the negative dispersion value=−2500 $fs^2$ are satisfied at least in the range of ±5 nm with respect to the center wavelength of 1045 nm.

In Design Examples 2-8, 2-9 and 2-10, the arrangement of a part of the cavity layers is different from each other. Further, the number of layers forming the mirror-function layer portions and the layer numbers of layers forming the mirror-function layer portions are slightly different from each other. However, as FIGS. 17B, 18B and 19B show, all of Design Examples 2-8, 2-9 and 2-10 satisfy the reflectance=98.5% and the negative dispersion value=−2500 $fs^2$ with respect to the wavelength in the range of 1040 nm to 1050 nm. Further, the behavior of the wavelength-dependency of the reflectance and the negative dispersion value is the same in all of Design Examples 2-9, 2-9 and 2-10.

Figure 20A:
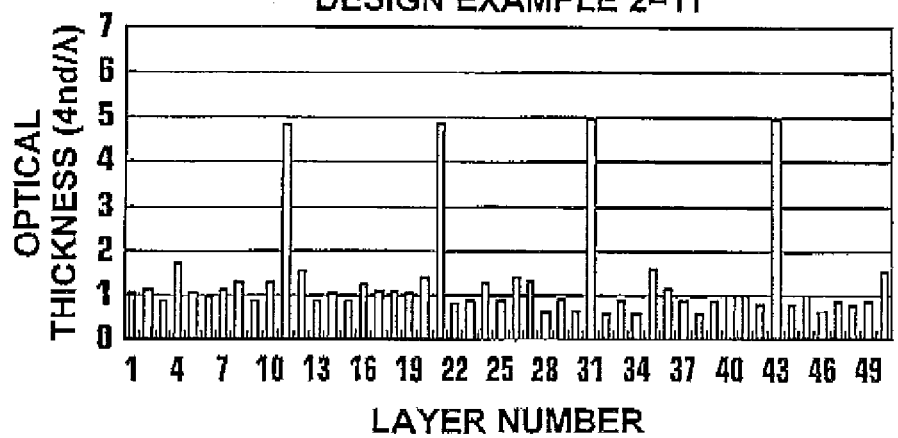
FIG. 20A is a diagram illustrating Design Example 2-11 of the structure of a coating of the negative dispersion mirror according to the present invention.
Figure 20B:
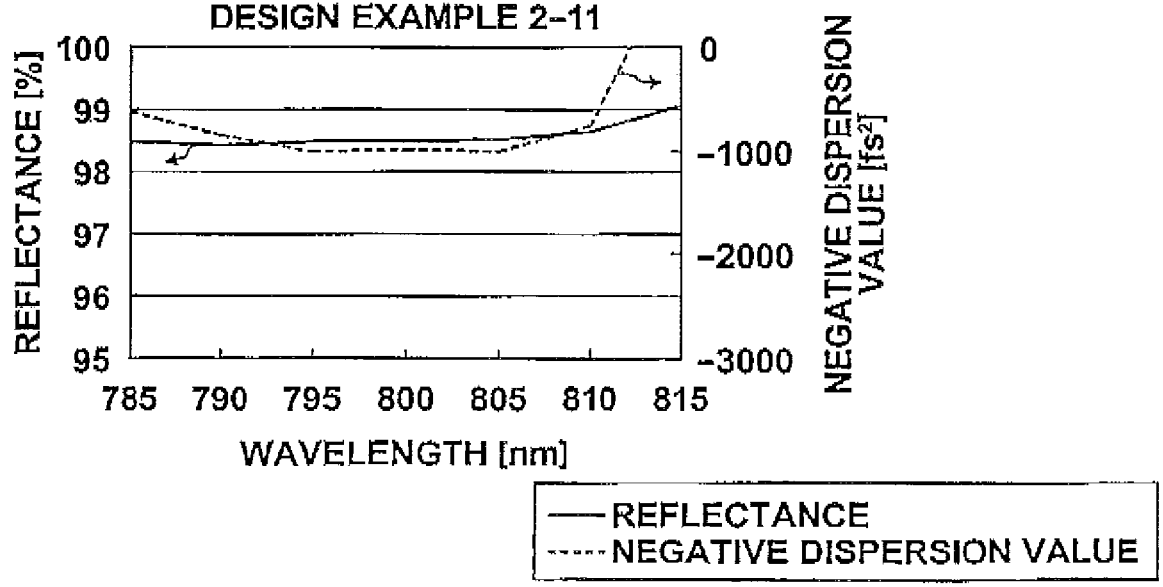
FIG. 20B is a graph showing the reflectance and the dispersion value in the negative dispersion mirror of Design Example 2-11.

In the multilayer coating structure of Design Example 2-11, illustrated in FIG. 20A, the number of layers forming each of the mirror function layer portions ML and the cavity layers C is the same as that of layers of Design Examples 2-1 through 2-4. However, the optical thickness of each layer of Design Example 2-11 is different from that of each layer of Design Examples 2-1 through 2-4. In Design Example 2-11, the optical thickness of each of the cavity layers is substantially similar to each other. FIG. 20B indicates that the mirror that has the coating structure as illustrated in FIG. 20A has a characteristic that the reflectance=98.5% and the negative dispersion value=−1000 $fs^2$ are satisfied at least in the range of ±5 nm with respect to the center wavelength of 800 nm.

Figure 21A:
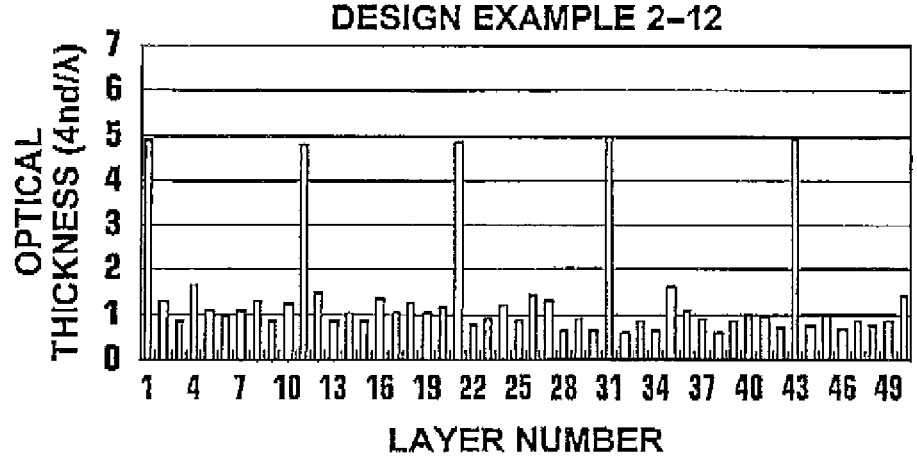
FIG. 21A is a diagram illustrating Design Example 2-12 of the structure of a coating of the negative dispersion mirror according to the present invention.
Figure 21B:
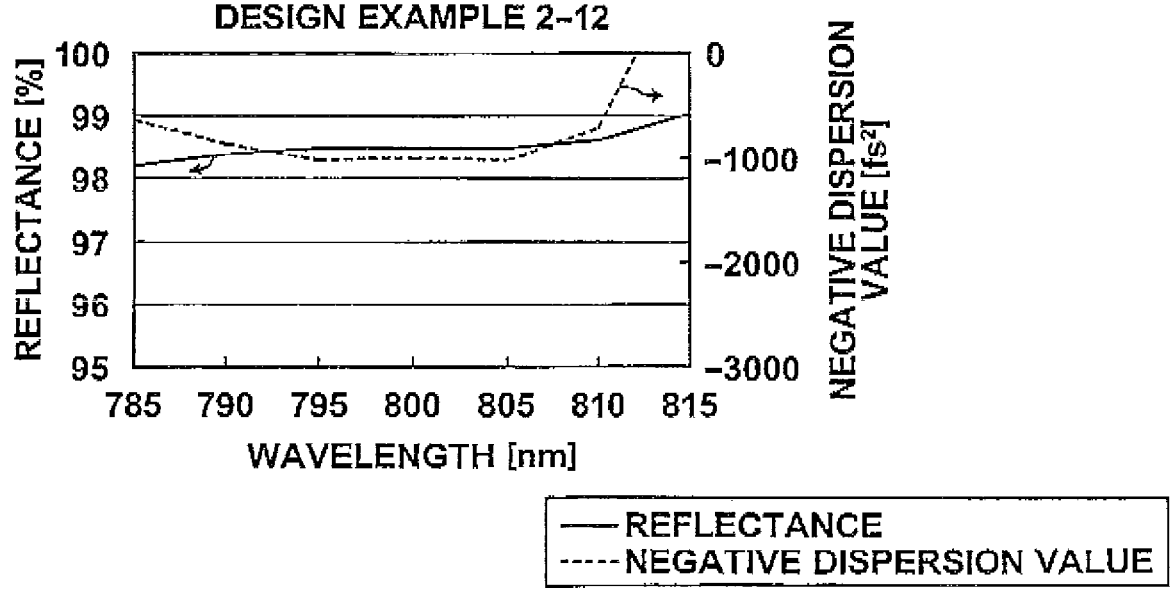
FIG. 21B is a graph showing the reflectance and the dispersion value in the negative dispersion mirror of Design Example 2-12.

In the multilayer coating structure of Design Example 2-12, illustrated in FIG. 21A, the number of layers forming each of the mirror function layer portions ML and the cavity layers C is the same as that of layers of Design Examples 2-5 through 2-8. However, the optical thickness of each layer of Design Example 2-12 is different from that of each layer of Design Examples 2-5 through 2-8. In Design Example 2-12, the optical thickness of each of the cavity layers is substantially the same. FIG. 21B indicates that the mirror that has the coating structure as illustrated in FIG. 21A has a characteristic that the reflectance=98.5% and the negative dispersion value=−1000 $fs^2$ are satisfied at least in the range of ±5 nm with respect to the center wavelength of 800 nm.

The optical thickness of the first layer, which is closest to the substrate, of Design Example 2-11 is significantly different from that of the first layer of Design Example 2-12. However, other coating structures are substantially similar to each other. Further, the wavelength-dependency characteristic of the reflectance and the negative dispersion value of Design Example 2-11 and that of Design Example 2-12 are the same at least for the wavelength range of 795 nm to 805 nm.

In all of the design examples, the optical thickness of the cavity layer, which is normalized by $\lambda/4$, is a value between 4 and 7. Further, the optical thickness of each layer forming the mirror-function Layer portions is greater than or equal to 0.5 and less than 2 with respect to the base value at 1. However, it is not necessary that the optical thickness of the cavity layer is between 4 and 7 as long as the value of the optical thickness is greater than or equal to 2. Further, in each of the design examples, the number of the layers forming the multilayer coating structure is 50 and the number of the mirror-function layer portions is five and the number of the cavity layers is four. However, the numbers are not limited to these numbers. Further, in the aforementioned design examples, the center wavelength $\lambda$ is set at 1045 nm or 800 nm. However, the center wavelength may be set at an arbitrary value. When the mirror is used in a mode-locked solid-state laser apparatus, a mirror that has a center wavelength in 1 μm band (1000 nm to 1100 nm) or 0.8 μm band (700 nm to 900 nm) may optionally be used.

A center wavelength $\lambda$, a desirable dispersion value in the range of −600 $fs^2$ to −3000 $fs^2$ and a desirable reflectance in the range of 97% to 99.5% are set. Then, other initial conditions, such as the number of layers, a refrarctive index (coating material), coating structure and an approximate coating thickness (the optical thickness of each layer forming the mirror-function layer portions is set at a value in the vicinity of the center wavelength $\lambda/4$ and the optical thickness of the cavity layer is set at $\lambda/4 \times n$, which is an integer times the center wavelength or the like) are set The setting of the coating structure includes an approximate position of the cavity layer, the number of layers forming each of the mirror-function layer portions and the like. After the initial conditions are set, computer simulation is performed (simulation using thin-film calculation software "Essential Macleod"). After then, these initial conditions are manually corrected or automatically corrected by a computer. Accordingly, the coating structures in the aforementioned design examples can be obtained.

When the second negative dispersion mirror according to the present invention is used as an output mirror of a mode-locked solid-state laser apparatus, a negative dispersion mirror 105 according to a fourth embodiment of the present invention, as illustrated in FIG. 22, may optionally be used. The negative dispersion mirror 105 includes a glass substrate 106 having a concave surface and a multilayer coating structure 107 for light L that has a predetermined wavelength, the multilayer coating structure 107 being provided on the concave surface of the glass substrate 106. The structure of the multilayer coating structure 107 is similar to Embodiment 3, as described above. Specifically, the multilayer coating structure 107 includes at least three mirror-function layer portions $ML_1$, $ML_2$ ... $ML_5$ (in this example, five mirror-function layer portions are provided) and cavity layers $C_1$, $C_2$, ... $C_4$ (in this example, four cavity layers are provided). Each of the mirror-function layer portions includes a plurality of layers deposited one on another. Further, each of the cavity layers is provided between the mirror-function layer portions and generates resonance of light L having a predetermined wavelength between the mirror-function layer portions, which are arranged on both sides of the cavity layer. The dispersion value with respect to the light L that has the predetermined wavelength is in the range of $-600 \text{ s}^2$ to $-3000 \text{ fs}^2$ and the reflectance is in the range of 97% to 99.5%. Specifically, the coating structure in Design Examples 2-1 through 2-12, as described above, may be adopted.

The light L that has the predetermined wavelength is output from a solid-state laser medium and resonates within the resonator. The wavelength of the light L is determined based on the structure of the mode-locked solid-state laser apparatus in which the negative dispersion mirror 105 is adopted. For example, when Yb:KYW(K(WO$_4$)$_2$) is used as a solid-state laser medium, λ=1045 nm. When Yb:KGW(Gd(WO$_4$)$_2$) is used as the solid-state laser medium, λ=1040 nm. When Yb:YAG is used, λ=1050 nm. When Yb:Y$_2$O$_3$ is used, λ=1076 nm. When Alexandrite (BeAl$_2$O$_4$:Cr$^{3+}$) is used, λ=750 m. When Cr$^{3+}$:LiSrAlF$_6$ is used, λ=850 nm. When Cr$^{3+}$:LiCAlF$_6$ is used, λ=850 nm. When Ti:Al$_2$O$_3$ is used, λ=800 nm.

Further, an antireflection coating 108 is provided on a surface of the glass substrate 106, the surface on the opposite side of the surface on which the multilayer coating structure is provided. The antireflection coating 108 is provided to prevent light that has passed through the multilayer coating structure 107 from being reflected at a surface of the substrate 106, the surface facing the concave surface thereof. The reflectance of the mirror with respect to light L that enters the mirror from the multilayer-coating-structure-107-deposited side of the mirror is in the range of 97% to 99.5%. Therefore, 3% to 0.5% component of the light is transmitted through the mirror toward the antireflection coating 108.

If the negative dispersion mirror illustrated in FIG. 22 is used as an output mirror of the mode-locked solid-state laser apparatus, it is possible to reduce the size of the solid-state laser apparatus. Further, it is possible to obtain stable pulse laser oscillation in the femtosecond regime.

<Third Negative Dispersion Mirror of the Present Invention>

Figure 23:
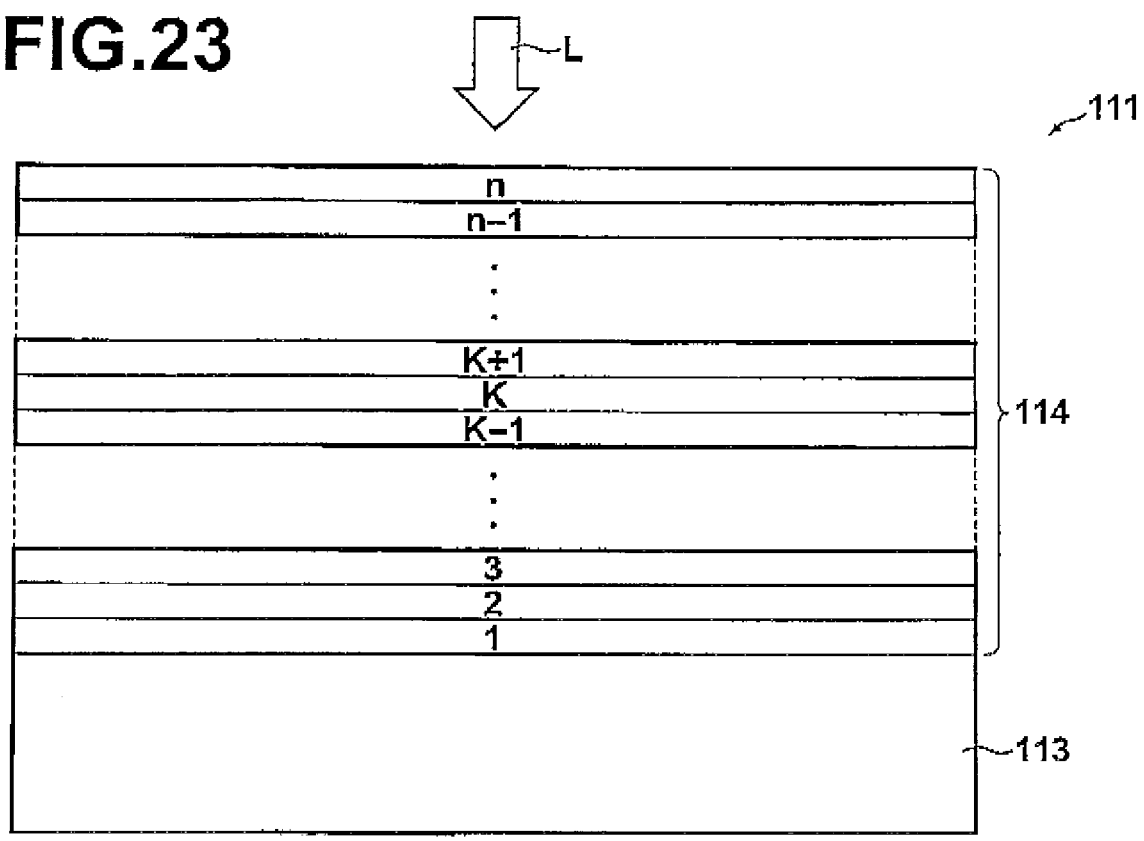
FIG. 23 is a schematic diagram illustrating the structure of a negative dispersion mirror according to an embodiment of the present invention.

FIG. 23 is a schematic diagram illustrating the structure of a negative dispersion mirror 111 according to a fifth embodiment of the present invention.

The negative dispersion mirror 111 in the present embodiment is a mirror including a glass substrate 113 and a dielectric multilayer coating structure 114 formed on the glass substrate 113. Further, the dielectric multilayer coating structure 114 includes layers having relatively high refractive index $n_1$ and layers having relatively low refractive index $n_2$ that are alternately deposited one on another.

Each layer of the multilayer coating structure 114 is deposited in the order of the first layer, the second layer . . . , the (k−1)th layer, the k-th layer, the (k+1)th layer . . . the n-th layer from the substrate 113 side. The optical thickness of each of the layers is in the range of λ/8 to λ/2. The variation amount in the optical thickness between the layers or among the layers has no particular regularity, in other words, the variation amounts are not particularly regular. Specifically, the optical thickness changes randomly The optical thickness of each layer is represented by "n·d", which is the product of the refractive index n of the layer and the coating thickness d (nm) of the layer.

The negative dispersion mirror 111 has a dispersion value in the range of $-100 \text{ fs}^2$ to $-1000 \text{ fs}^2$ with respect to light L having a predetermined wavelength and a reflectance in the range of 97% to 99.5% with respect to the light L having the predetermined wavelength Here, the light L having the predetermined wavelength has a bandwidth that is greater than or equal to 10 nm. Specifically, the dispersion value of the negative dispersion mirror 111 is a predetermined value in the range of $-100 \text{ fs}^2$ to $-1000 \text{ fs}^2$ with respect to light that has a bandwidth greater than or equal to 10 nm. Further, the reflectance or the negative dispersion mirror 1 is a predetermined value in the range of 97% to 99.5% with respect to light that has a bandwidth greater than or equal to 10 nm. The dispersion value and the reflectance may be set at arbitrary values within these ranges, respectively.

Specifically, the high refractive index layer may essentially consist of a material that is selected from the group consisting of Ti-oxide, Zr-oxide, Hf-oxide, Nb-oxide, Al-oxide, Zn-oxide, Y-oxide, Sc-oxide, La-oxide, Ce-oxide, Pr-oxide, Ta-oxide and Zn-sulfide or of a mixture or compound containing at least one of the oxides and the sulfide.

Further, the low refractive index layer may essentially consist of a material selected from the group consisting of Si-oxide, Ca-fluoride, Li-fluoride, Mg-fluoride, Na-fluoride, Th-fluoride, Al-fluoride, Hf-fluoride, La-fluoride, Y-fluoride and Zr-fluoride or a mixture or compound containing at least one of the oxide and the fluorides.

The low refractive index layer and the high refractive index layer should be made of a dielectric that has a relatively low refractive index and a di electric that has a relatively high refractive index, respectively, and any kind of known material may be used.

The center wavelength λ of the predetermined wavelength should be set at an arbitrary wavelength in the range of 1000 nm to 1100 nm or in the range of 700 nm to 900 nm. Further, the optical thickness of each layer is set based on the arbitrary wavelength λ.

Next, concrete examples of the structure of coating will be a described. FIGS. 24A through 27A are diagrams for Design Examples 3-1 through 3-4, respectively. FIGS. 24A through 27A illustrate the optical thickness of each layer with respect to a predetermined center wavelength. FIGS. 24B through 27B are graphs showing reflectances and negative dispersion values that are realized by the coating structure of Design Examples 3-1 through 3-4, which are illustrated in FIGS. 24A through 27A, respectively. Design Examples 3-1 through 3-3 have been designed by setting the center wavelength λ at 1045 nm. Design Example 3-4 has been designed by setting the center wavelength λ at 800 nm. All of the values have been obtained by simulation.

In FIGS. 24A through 27A, the horizontal axis represents the layer numbers and the vertical axis represents the optical thickness (4nd/λ) normalized by the value of λ/4. The first layer is the layer closest to the substrate side and the 48th or 50th layer is the layer closest to the air side (outer side). In FIGS. 24B through 27B, the horizontal axis represents the predetermined wavelength (nm) of light and the vertical axis represents the reflectance (%) and the negative dispersion value ($fs^2$).

Each of the multilayer coating structures of Design Examples 3-1 through 3-3, illustrated in FIGS. 24A through 26A, includes the first through 48th layers. The multilayer coating structure of Design Example 3-4, illustrated in FIG. 27A, includes the first through 50th layers. Further, the optical thickness of each layer normalized by the value of λ/4 is greater than or equal to 0.5 and less than 2 with respect to the base value at 1.

Figure 24A:
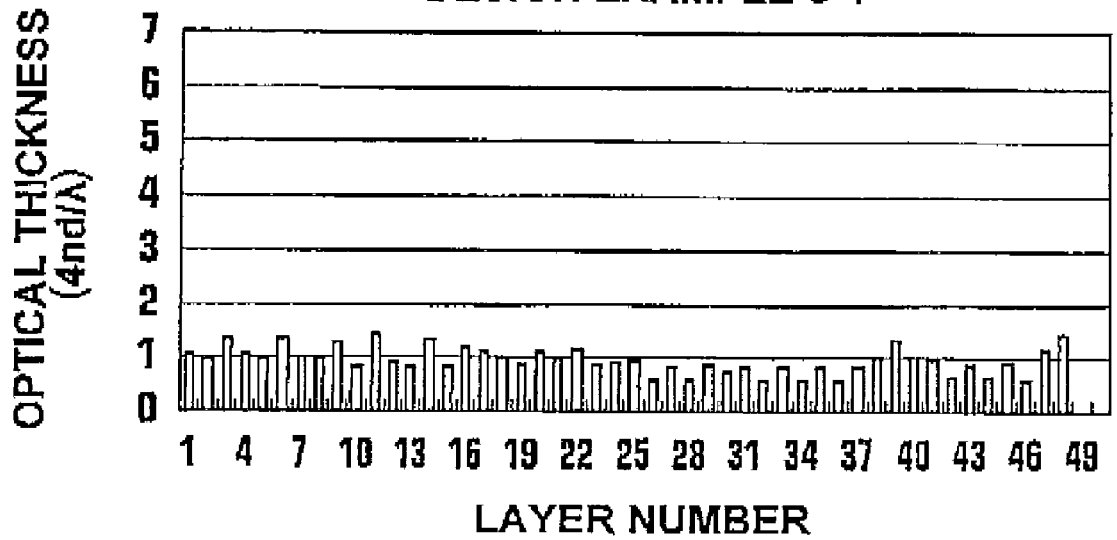
FIG. 24A is a diagram illustrating Design Example 3-1 of the structure of a coating of the negative dispersion mirror according to the present invention.
Figure 24B:
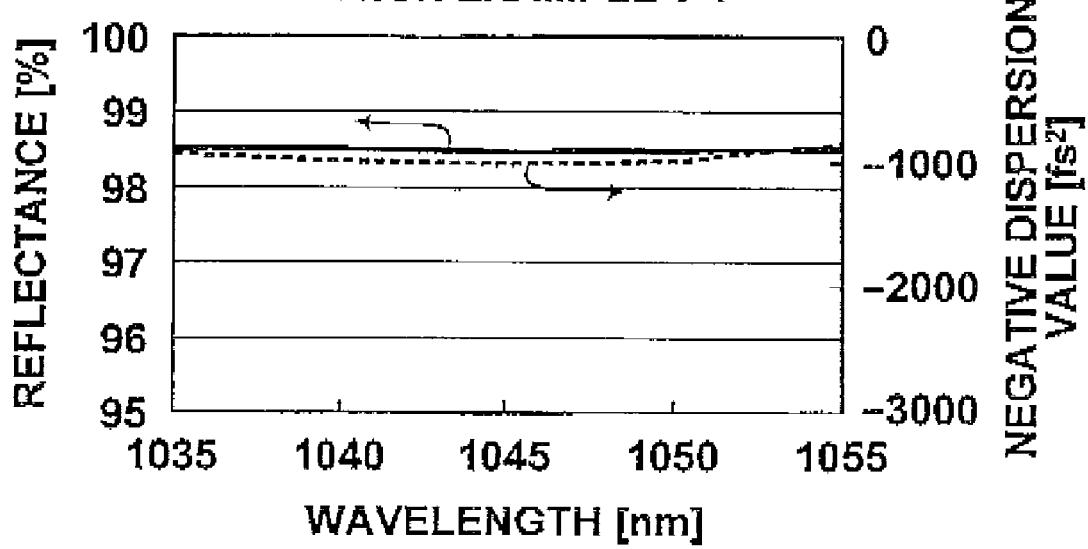
FIG. 24B is a graph showing the reflectance and the dispersion value in the negative dispersion mirror of Design Example 3-1.

FIG. 24B indicates that the mirror that has the coating structure as illustrated in FIG. 24A has a characteristic that the reflectance=98.5% and the negative dispersion value=−1000 $fs^2$ are satisfied at least in the range of ±5 nm with respect to the center wavelength of 1045 nm.

Figure 25A:
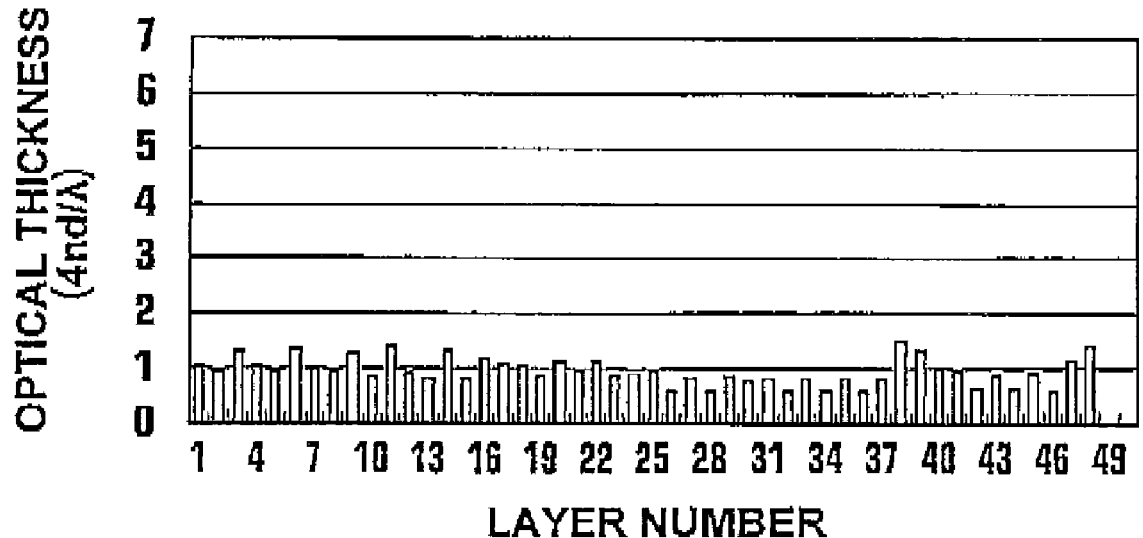
FIG. 25A is a diagram illustrating Design Example 3-2 of the structure of a coating of the negative dispersion mirror according to the present invention.
Figure 25B:
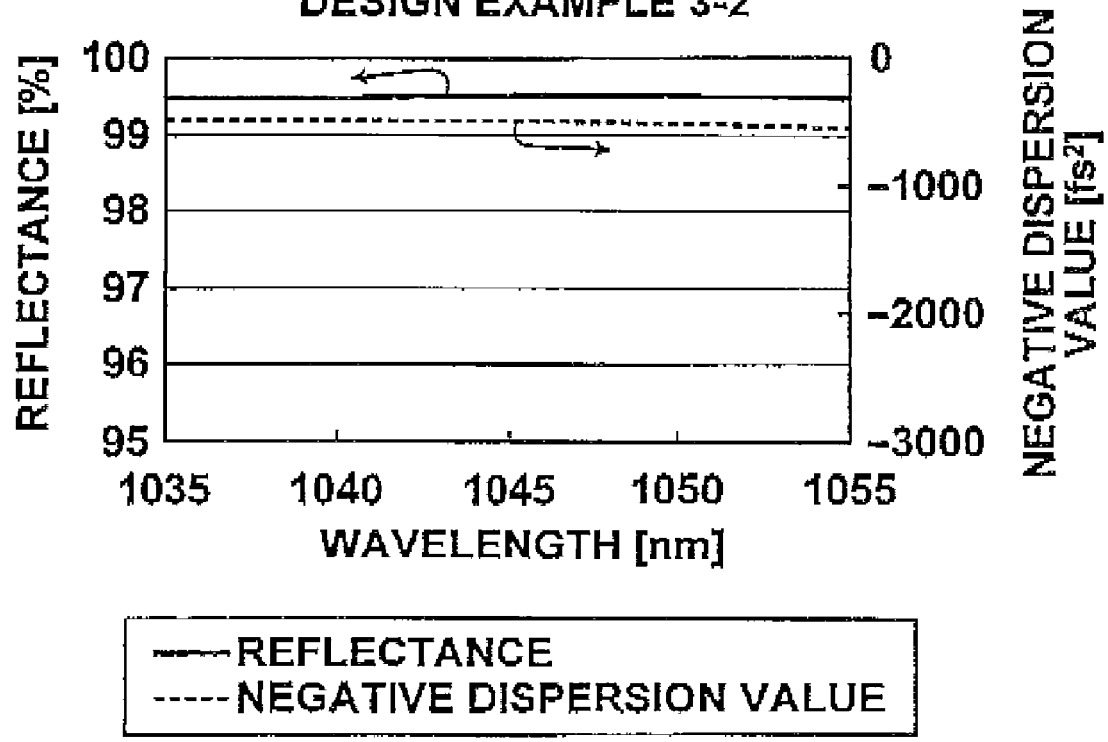
FIG. 25B is a graph showing the reflectance and the dispersion value in the negative dispersion mirror of Design Example 3-2.

FIG. 25B indicates that the mirror that has the coating structure as illustrated in FIG. 25A has a characteristic that the reflectance=99.5% and the negative dispersion value=−500 $fs^2$ are satisfied at least in the range of ±5 nm with respect to the center wavelength of 1045 nm.

Figure 26A:
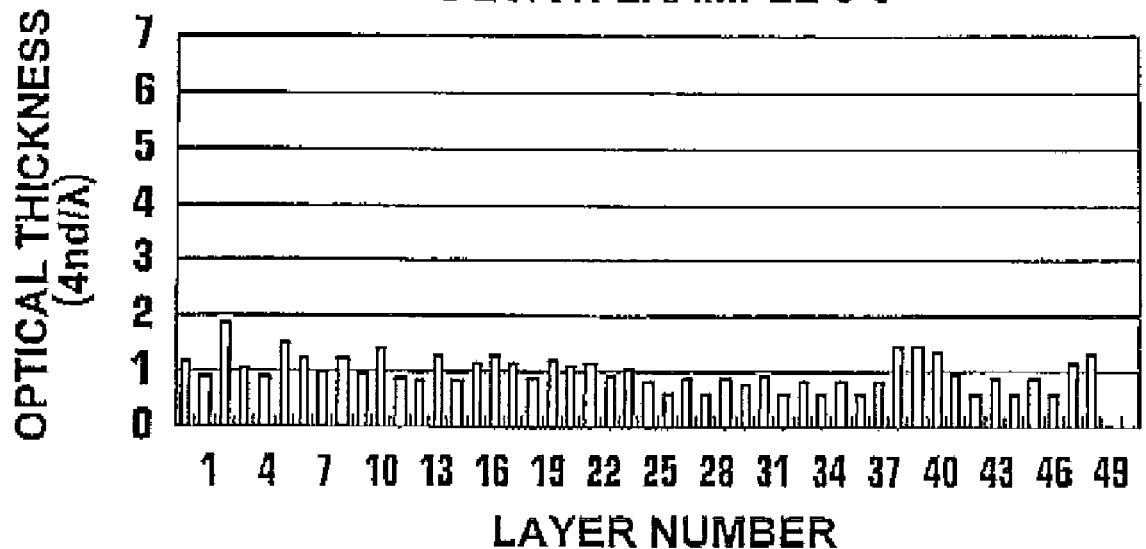
FIG. 26A is a diagram illustrating Design Example 3-3 of the structure of a coating of the negative dispersion mirror according to the present invention.
Figure 26B:
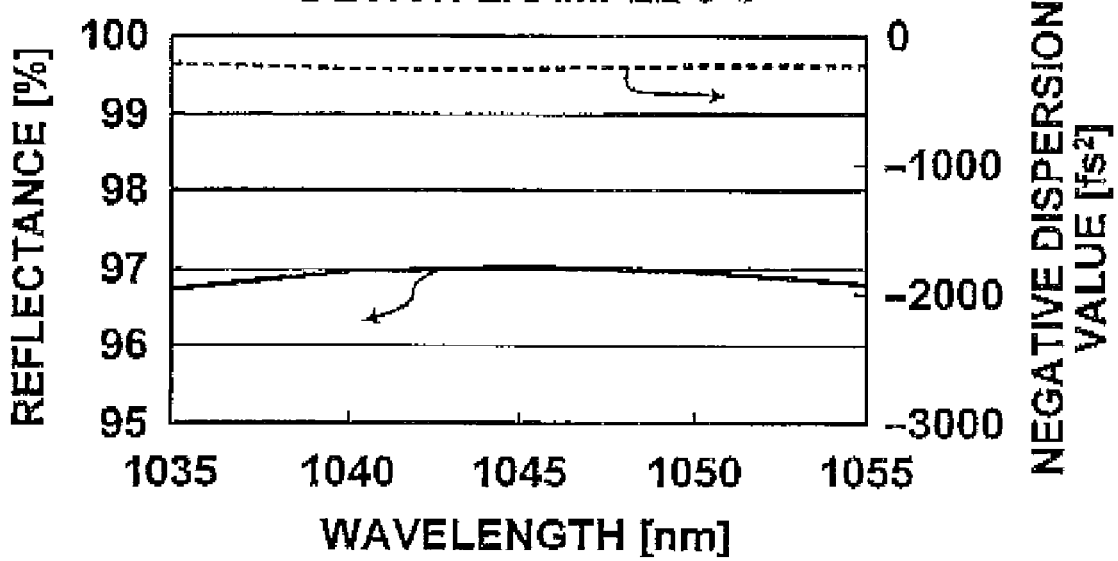
FIG. 26B is a graph showing the reflectance and the dispersion value in the negative dispersion mirror of Design Example 3-3.

FIG. 26B indicates that the mirror that has the coating structure as illustrated in FIG. 26A has a characteristic that the reflectance=97% and the negative dispersion value=−250 $fs^2$ are satisfied at least in the range of ±5 nm with respect to the center wavelength of 1045 nm.

Figure 27A:
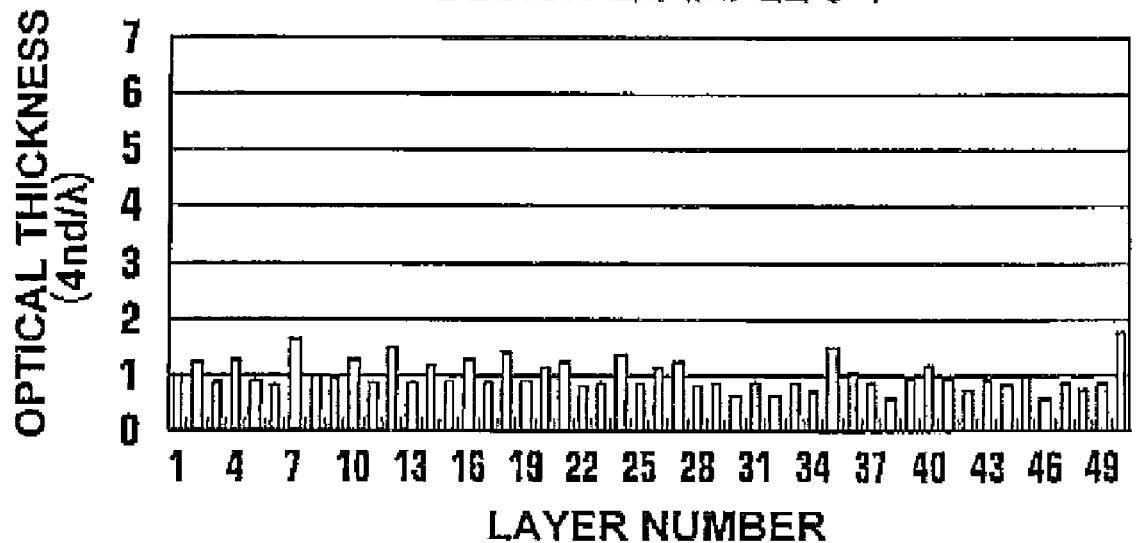
FIG. 27A is a diagram illustrating Design Example 3-4 of the structure of a coating of the negative dispersion mirror according to the present invention.
Figure 27B:
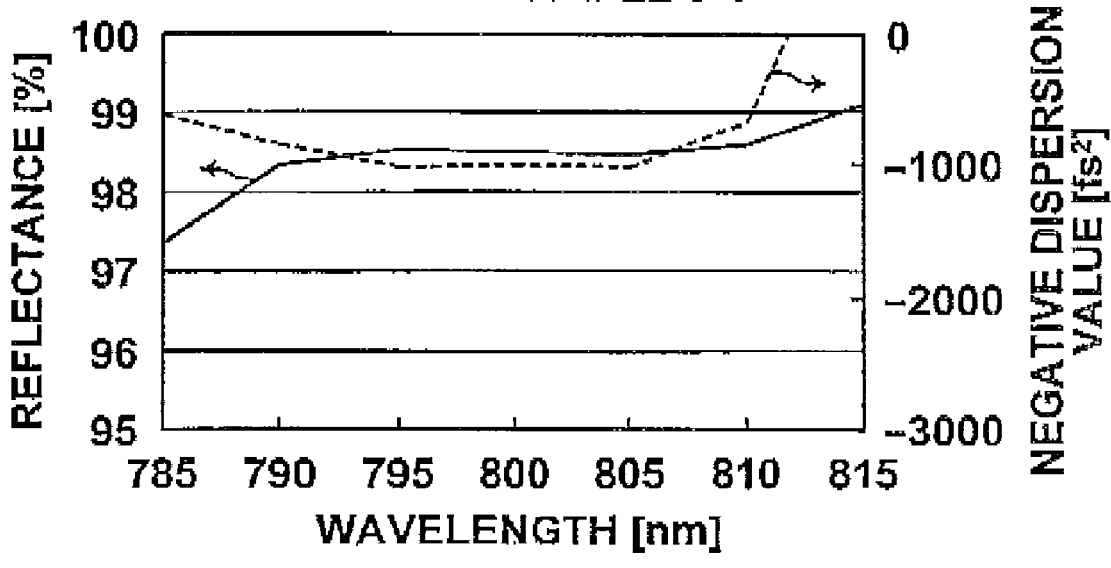
FIG. 27B is a graph showing the reflectance and the dispersion value in the negative dispersion mirror of Design Example 3-4.

FIG. 27B indicates that the mirror that has the coating structure as illustrated in FIG. 27A has a characteristic that the reflectance =98.5% and the negative dispersion value=−1000 $fs^2$ are satisfied at least in the range of ±5 nm with respect to the center wavelength of 800 nm.

The number of the layers forming the multilayer coating structure is limited neither to 48 nor to 50. Further, in the aforementioned design examples, the center wavelength λ is set at 1045 nm or 800 nm. However, the center wavelength may be set at an arbitrary value. When the mirror is used in a mode-locked solid-state laser apparatus, a mirror that has a center wavelength in 1 μm band (1000 nm to 1100 nm) or 0.8 μm band (700 nm to 900 nm) may optionally be used.

A center wavelength λ, a desirable dispersion value in the range of −100 $fs^2$ to −1000 $fs^2$ and a desirable reflectance in the range of 97% to 99.5% are set. Then, other initial conditions, such as the number of layers, a refractive index (coating material), coating structure and an approximate coating thickness (the optical thickness of each layer forming the mirror-function layer portions is set at a value in the vicinity of the center wavelength λ/4 and the optical thickness of the cavity layer is set at λ/4×n, which is an integer times the center wavelength or the like) are set. The setting of the coating structure includes an approximate position of the cavity layer, the number of mirror layers and the like. After the initial conditions are set, computer simulation is performed (simulation using thin-film calculation software "Essential Macleod"). After then, these initial conditions are manually corrected or automatically corrected by a computer. Accordingly, the coating structures in the aforementioned design examples can be obtained.

Figure 28:
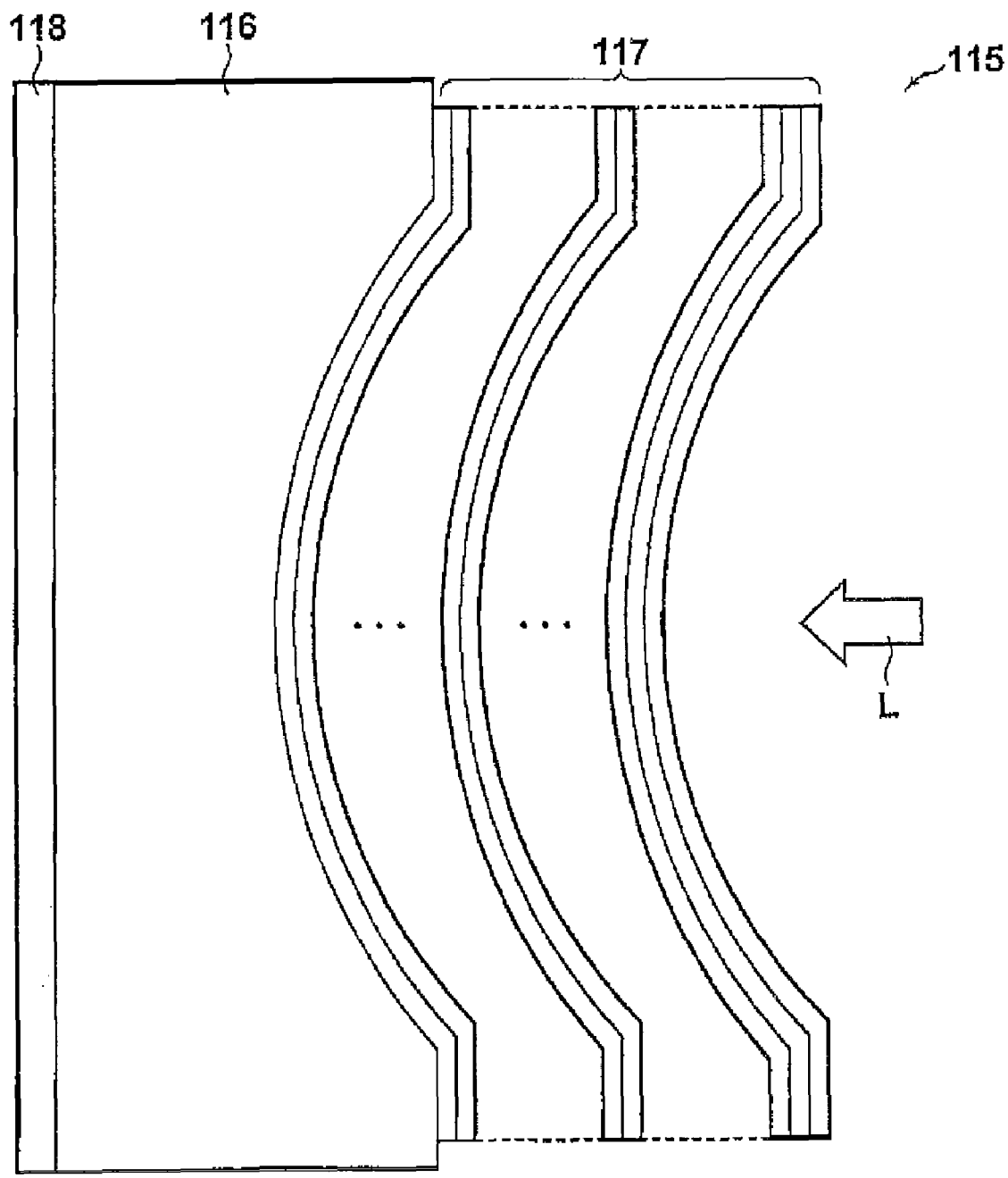
FIG. 28 is a schematic diagram illustrating the structure of a negative dispersion mirror that is used as an output mirror.

When the negative dispersion mirror according to the present invention is used as an output mirror of a mode-locked solid-state laser apparatus, a negative dispersion mirror 27 according to a sixth embodiment of the present invention, as illustrated in FIG. 28, may optionally be used. The negative dispersion mirror 27 includes a glass substrate 116 having a concave surface and a multilayer coating structure 117 for light L that has a predetermined wavelength, the multilayer coating structure 117 being provided on the concave surface of the glass substrate 116. The structure of the multilayer coating structure 117 is similar to Embodiment 5, as described above. Specifically, layers having relatively high refractive index $n_1$ and layers having relatively low refractive index $n_2$ are alternately deposited one on another. Further, the dispersion value with respect to the light L that has the predetermined wavelength is in the range of −100 $fs^2$ to −1000 $fs^2$ and the reflectance is in the range of 97% to 99.5%. Specifically, the coating structure in Design Examples 3-1 through 3-4, as described above, may be adopted.

The light L that has the predetermined wavelength is output from a solid-state laser medium and resonates within the resonator. The wavelength of the light L is determined based on the structure of the mode-locked solid-state laser apparatus in which the negative dispersion mirror 115 is adopted. For example, when Yb;KYW(K(WO$_4$)$_2$) is used as a solid-State laser medium, λ=1045 nm. When Yb:KGW (Gd(WO$_4$)$_2$) is used as the solid-state laser medium, λ=1040 nm. When Yb:YAG is used, λ=1050 nm. When Yb:Y$_2$O$_3$ is used, λ=1076 nm. When Alexandrite (BeAl$_2$O$_4$:Cr$^{3+}$) is used, λ=750 m. When Cr$^{3+}$:LiSrAlF$_6$ is used, λ=850 nm. When Cr$^{3+}$:LiCaAlF$_6$ is used, λ=850 nm. When Ti:Al$_2$O$_3$ is used, λ=800 nm.

Further, an antireflection coating 118 is provided on a surface of the glass substrate 116, the surface on the opposite side of the surface on which the multilayer coating structure is provided. The antireflection coating 118 is provided to prevent light that has passed through the multilayer coating structure 117 from being reflected at a surface of the substrate 116, the surface facing the concave surface thereof. The reflectance of the mirror with respect to light L that enters the mirror from the multilayer-coating-structure-117-deposited side of the mirror is in the range of 97% to 99.5%. Therefore, 3% to 0.5% component of the light is transmitted through the mirror toward the antireflection coating 118.

If the negative dispersion mirror illustrated in FIG. 28 is used as an output mirror of the mode-locked solid-state laser apparatus, it is possible to reduce the size of the solid-state laser apparatus. Further, it is possible to obtain stable pulse laser oscillation in the femtosecond regime.

<Mode-locked Solid-State Laser Apparatus>

Next, a mode-locked solid-state laser apparatus including the negative dispersion mirror illustrated in FIG. 8 will be described. Here, an apparatus including the negative dispersion mirror 5, illustrated in FIG. 8, will be described. However, the negative dispersion mirror 105, illustrated in FIG. 22, and the negative dispersion mirror 115, illustrated in FIG. 28, may be used instead of the negative dispersion mirror 5.

Figure 29:
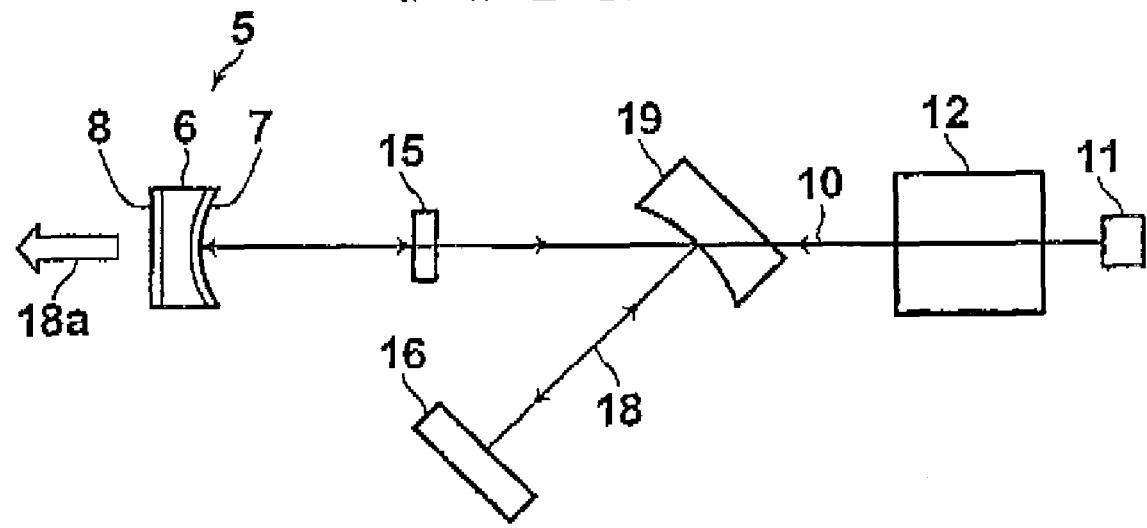
FIG. 29 is a schematic diagram illustrating the configuration of a mode-locked solid-state laser apparatus according to a first embodiment of the present invention.

FIG. 29 is a schematic diagram illustrating a side view of a soliton-type mode-locked solid-state laser apparatus according to an embodiment of the present invention. As illustrated in FIG. 29, the mode-locked solid-state laser apparatus includes a semiconductor laser 11, an excitation optical system 12, the negative dispersion mirror 5, as described above with reference to FIG. 8, an SESAM (semiconductor saturable absorber mirror) 16, a solid-state laser medium 15 and a concave mirror 19. The semiconductor laser 11 outputs excitation light 10 and the excitation optical system 12 causes the excitation light 10 to enter a resonator. The negative dispersion mirror 5 functions as a concave-surface output mirror that forms an end of the resonator. The SESAM 16 forms the other end of the resonator. The solid-state laser medium 15 is arranged within the resonator. The concave mirror 19 reflects oscillation light 18 that resonates within the resonator and guides the reflected light to the output mirror (negative dispersion mirror) and the SESAM 16. The concave mirror 19 transmits the excitation light 10 that has entered the concave mirror 19. Further, the concave mirror 19 has a function as a dichroic mirror that reflects the oscillation light 19.

In the present embodiment, Yb:KYW crystal is used as an example of the solid-state laser medium 15. As the semiconductor laser 11, a laser that outputs excitation light 10 for exciting the solid-state laser medium 15 is used.

In the aforementioned configuration, the excitation light 10 is output from the solid-state laser 11 and caused to enter the concave mirror 19 from the back side thereof by the excitation optical system 12. The excitation light 10 that has entered the concave mirror 19 is transmitted through the concave mirror 19 and enters the resonator. Further, the excitation light 10 enters the solid(state Laser medium 15 and excites the solid-state laser medium 15. Accordingly, light having a predetermined wavelength (here, the central wavelength is 1045 nm) is generated and the generated light oscillates by the action of the resonator. Laser oscillation light 18 partially passes through the negative dispersion mirror 5 and the light that has passed through the negative dispersion mirror 5 is output to the outside as output light 18a.

Here, the negative group-velocity dispersion by the action of the negative dispersion device 7 provided in the output mirror 5 within the laser resonator is combined with self-phase modulation mainly in the solid-state laser medium 15, thereby the pulse oscillation light (output light) 18a in the femtosecond regime being obtained. Specifically, mode-locking is started by the SESAM 16 and the pulse is maintained and stabilized. Further, the group-velocity dispersion and the self-phase modulation balance with each other and a soliton pulse is formed. Then, the mode-locked pulse becomes sharp (steep) and a stable soliton pulse in the femtosecond regime can be generated.

In the mode-locked solid-state laser apparatus illustrated in FIG. 29, a negative dispersion mirror 5 that has a dispersion value at $-800 \text{ fs}^2$ and a reflectance at 98.3% may optionally be used.

In the mode-locked solid-state laser apparatus, the dispersion value of the negative dispersion mirror that is necessary to stabilize soliton-mode pulse oscillation can be determined based on the solid-state laser medium, the arrangement of optical devices arranged in the resonator and the structure of the resonator, such as the length of the resonator.

Figure 30:
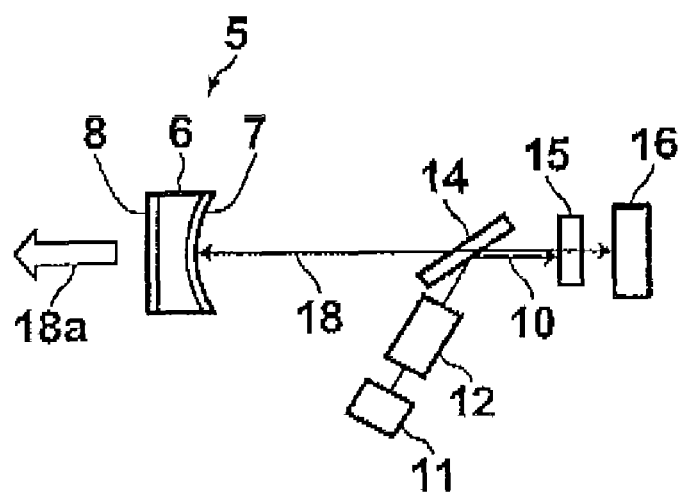
FIG. 30 is a schematic diagram illustrating the configuration of a mode-locked solid-state laser apparatus according to a second embodiment of the present invention.

FIG. 30 is a schematic diagram illustrating the configuration of the mode-locked solid-state laser apparatus according to the second embodiment of the present invention. This mode-locked solid-state laser apparatus includes the semiconductor laser 11, the excitation optical system 12, a dichroic mirror 14, the negative dispersion mirror 5, the SESAM 16 and the solid-state laser medium 15. The semiconductor laser 11 outputs excitation light 10 and the excitation optical system 12 causes the excitation light 10 to enter a resonator. The dichroic mirror 14 is arranged within the resonator. The dichroic mirror 14 reflects the excitation light 10 that has been caused, by the excitation optical system 12, to enter the resonator diagonally with respect to the optical axis of the resonator from the outside of the resonator. Further, the dichroic mirror 14 reflects the excitation light 10 toward the solid-state laser medium 15. Further, the dichroic mirror 14 transmits oscillation light 10 that resonates within the resonator. The negative dispersion mirror 5 forms an end of the resonator and the SESAM 16 forms the other end of the resonator. The solid-state laser medium 15 is arranged within the resonator that is formed by the SESAM 16 and the negative dispersion mirror 5. The resonator includes no mirror reflecting the oscillation light other than the SESAM 16 and the output mirror 5, which form the ends of the resonator, and the resonator has linear resonator structure. The solid-state laser medium 15 and the SESAM 16 are arranged in close proximity to each other.

In the aforementioned configuration, the excitation light 10 is output from the solid-state laser 11 and caused to enter the resonator diagonally with respect to the optical axis of the resonator by the excitation optical system 12. The excitation light 10 that has entered the resonator is reflected by the dichroic mirror 14 and enters the solid-state laser medium 15, thereby exciting the solid-state laser medium 15. Accordingly, light that a predetermined wavelength is generated and the generated light oscillates by the action of the resonator. The laser oscillation light 18 partially passes through the output mirror 5 and the light that has passed through the output mirror 5 is output to the outside as output light 18a. In the apparatus that is configured as described above, the beam waist of the laser oscillation light 18 that resonates in the resonator is formed only on the SESAM 16.

A more concrete example of the configuration of the mode-locked solid-state laser apparatus illustrated in FIG. 30 will be described. As the solid-state laser medium 15, Yb:Y$_2$O$_3$ medium, in which ceramic medium Y$_2$O$_3$ (yttria), which is mother material, is doped with Yb ions, is used. Light at 1075 nm in the fluorescence spectrum of the Yb:Y$_2$O$_3$ medium is used as the oscillation light.

Here, the Yb:Y$_2$O$_3$ medium 15 is a medium doped with Yb ions at 10 at %, and the thickness of the Yb:Y$_2$O$_3$ medium 15 is 0.65 mm. Further, coating that efficiently transmits both the excitation light 10 with a wavelength of 980 nm and the oscillation light 18 with a wavelength of 1075 nm band has been applied to both sides of the Yb:Y$_2$O$_3$ medium 15.

As the SESAM 16, a SESAM produced by BATOP GmbH with modulation depth of 0.4% and with saturation fluence of 120 µJ/cm$^2$ is used.

The curvature radius of the concave surface of the negative dispersion mirror 5 is 30 mm. Further, the negative dispersion mirror 5 and the SESAM 16 are arranged in such a manner that a resonator length that is defined by a distance between the mirror surface of the negative dispersion mirror 5 and the mirror surface of the SESAM 16 becomes 30 mm (in air). The Yb:Y$_2$O$_3$ medium 15 is arranged at a position so that distance d from the SESAM 16 is 6 mm.

As the semiconductor laser 11, a broad-area-type laser that has a light emission width of 100 µm at the wavelength of 980nm and output power at 2W is used. The excitation optical system 12 is a condensing lens and a lens that can condense light so that the beam diameter of the excitation light in the Yb:Y$_2$O$_3$ medium 15 becomes approximately 100 µm is used as the excitation optical system (condensing lens) 12. The condensing lens 12 is arranged in close proximity to the dichroic mirror 14 in such a manner that the optical path of the resonator is not interrupted. The excitation light 10 is condensed by the condensing lens 12 so that the beam waist is positioned in the vicinity of the center of the Yb:Y$_2$O$_3$ medium 15 with respect to the thickness direction of the medium.

The dichroic mirror 14 is a quartz plate that is a square of 1 mm×1 mm, and that has a thickness of 0.3 mm. Coating that efficiently reflects the excitation light 10 that has a wavelength of 980 nm and efficiently transmits the oscillation light is that has a wavelength of 1075 nm band when the light enters at Brewster's angle has been applied to the quartz plate. The dichroic mirror 14 is arranged in close proximity to the Yb:Y$_2$O$_3$ medium 15.

In the mode-locked solid-state laser apparatus according the present embodiment, light that has a wavelength of 1075 nm band, which has been output from the Yb:Y$_2$O$_3$ medium 15 by being excited by the excitation light 10, resonates between the negative dispersion mirror 5 and the SESAM 16. The light is mode-locked by the SESAM 16 and output as output light (pulsed laser) 18a from the negative dispersion mirror 5.

The negative dispersion mirror 5, which functions as a concave output mirror, generates negative group-velocity dispersion. The negative dispersion mirror 5 compensates positive group-velocity dispersion that is generated in the resonator and generates a state in which the group-velocity dispersion in the whole resonator has been fully Compensated (group-velocity dispersion=0) or a state in which the group-velocity dispersion in the resonator has become negative (group-velocity dispersion<0). If such a negative dispersion mirror 5 is provided, it becomes possible to induce soliton mode locking. Further, it becomes possible to obtain pulsed light that has a pulse width less than or equal to a picosecond.

For example, in the resonator of the mode-locked solid-state laser apparatus illustrated in FIG. 30, if a negative dispersion mirror 5 (or the negative dispersion mirror 105) that has a group-velocity dispersion of −3000 fs$^2$ is provided, the group-velocity dispersion in the whole resonator becomes −2700 fs$^2$. Then, it is possible to obtain pulsed laser light that has a pulse width of 800 fs.

Further, another concrete example of the configuration of the mode-locked solid-state laser apparatus illustrated in FIG. 30 will be described. As the solid-state laser medium 15, Yb:YAG medium, in which ceramic medium YAG as a mother material is doped with Yb ions, is used. Light at 1050 nm in the fluorescence spectrum of the Yb:YAG medium is used as the oscillation light.

Here, the Yb:YAG medium 15 is a medium doped with Yb ions at 20 at %, and the thickness of the Yb:YAG medium 15 is 1 mm. Further, coating that efficiently transmits both the excitation light 10 with a wavelength of 940 nm and the oscillation light 18 with a wavelength of 1050 nm band has been applied to both sides of the Yb:YAG medium 15.

As the SESAM 16, a SESAM produced by BATOP GmbH with modulation depth of 0.4% and with saturation fluence of 120 μJ/cm$^2$ is used.

The curvature radius of the concave surface of the negative dispersion mirror 5 is 30 mm. Further, the negative dispersion mirror 5 and the SESAM 16 are arranged in such a manner that a resonator length that is defined by a distance between the mirror surface of the negative dispersion mirror 5 and the mirror surface of the SESAM 16 becomes 30 mm (in air). The Yb:YAG medium 15 is arranged at a position so that distance d from the SESAM 16 is 6 mm.

As the semiconductor laser 11, a broad-area type laser that has a light emission width of loom at the wavelength of 940 nm and output power at 2W is used. The excitation optical system 12 is a condensing lens and a lens that can condense light so that the beam diameter of the excitation light in the YB:YAG medium 15 becomes approximately 100 μm is used as the excitation optical system (condensing lens) 12. The condensing lens 12 is arranged in close proximity to the dichroic mirror 14 in such a manner that the optical path of the resonator is not interrupted. The excitation light 10 is condensed by the condensing lens 12 so that the beam waist is positioned in the vicinity of the center of the Yb:YAG medium 15 with respect to the thickness direction of the medium.

The dichroic mirror 14 is a quartz plate that is a square of 1 mm×1 mm, and that has a thickness of 0.3 mm. Coating that efficiently reflects the excitation light 10 that has a wavelength of 940 nm and efficiently transmits the oscillation light 18 that has a wavelength of 1050 nm band when the light enters at Brewster's angle has been applied to the quartz plate. The dichroic mirror 14 is arranged in close proximity to the Yb:YAG medium 15.

In the mode-locked solid-state laser apparatus according the present embodiment, light that has a wavelength of 1050 nm band, which has been output from the Yb:YAG medium 15 by being excited by the excitation light 10, resonates between the negative dispersion mirror 5 and the SESAM 16. The light is mode-locked by the SESAM 16 and output as output light (pulsed laser) 18a from the negative dispersion mirror 5.

The negative dispersion mirror 5, which functions as a concave output mirror, generates negative group-velocity dispersion. The negative dispersion mirror 5 compensates positive group-velocity dispersion that is generated in the resonator and generates a state in which the group-velocity dispersion in the whole resonator has been fully compensated (group-velocity dispersion=0) or a state in which the group-velocity dispersion in the resonator has become negative (group-velocity dispersion<0). If such a negative dispersion mirror 5 is provided, it becomes possible to induce soliton mode locking. Further, it becomes possible to obtain pulsed light that has a pulse width less than or equal to a picosecond.

For example, in the resonator of the mode-locked solid-state laser apparatus illustrated in FIG. 30, if a negative dispersion mirror 5 (or the negative dispersion mirrors 105 or 115) that has a group-velocity dispersion of −1000 fs$^2$ is provided, the group-velocity dispersion in the whole resonator becomes −950 fs$^2$. Then, it is possible to obtain pulsed laser light that has a pulse width of 800 fs.

Generally, $F_{sat,L}$ of Yb-doped solid-state laser medium is high. Therefore, if the threshold value of mode-locking is high and the resonator length L is 30 mm, which is short, pulse energy within the resonator becomes small. Therefore, normally, if the resonator length is so short, mode-locking does not occur. However, if the group-velocity dispersion within the resonator is compensated as described above and a state called as soliton mode-locking is formed, the threshold value of mode locking can be lowered Hence, it becomes possible to induce mode-locking even if the resonator length is short at 30 mm.

As described above, if the negative dispersion mirror according to the present invention is used as the output mirror, it becomes possible to provide a mode-locked solid-state laser apparatus that has a very small size, and that can generate femtosecond regime pulse oscillation. Further, since the number of optical elements (parts) that form the resonator can be reduced, the resonator can operate stably. Further, since large negative dispersion can be compensated, soliton pulse oscillation becomes stable.

As the solid-state laser medium, a solid-state laser medium, such as Yb:Y$_2$O$_3$ and Nd:YVO$_4$, may be used. Alternatively, a solid-state laser medium, such as Nd:GdVO$_4$, Nd:YAG, Nd:glass, Yb:YAG, Yb:KY(WO$_4$)$_2$, Yb:KGd (WO$_4$)$_2$, Yb:Gd$_2$SiO$_5$ and Yb:Y$_2$SiO$_5$, in which various kinds of mother materials are doped with Nd ions or Yb ions, may be used. The Nd ions and Yb ions may be used in combination with various kinds of mother materials. Further, the ions with which the mother material is doped are not limited to the Nd ions and the Yb ions. As the ions with which the mother material is doped, all kinds of rare-earth ions may be adopted and transition-metal ions, such as Cr and Ti, may be adopted.

Further, the negative dispersion mirror according to the present invention may be used as an optical pulse compensation apparatus. Further, a mode-locked solid-state laser apparatus including the negative dispersion mirror of the present invention is appropriate as a light source for a nonlinear optical imaging apparatus, a laser processing apparatus and the like.

<Nonlinear Optical Imaging Apparatus>

Figure 31:
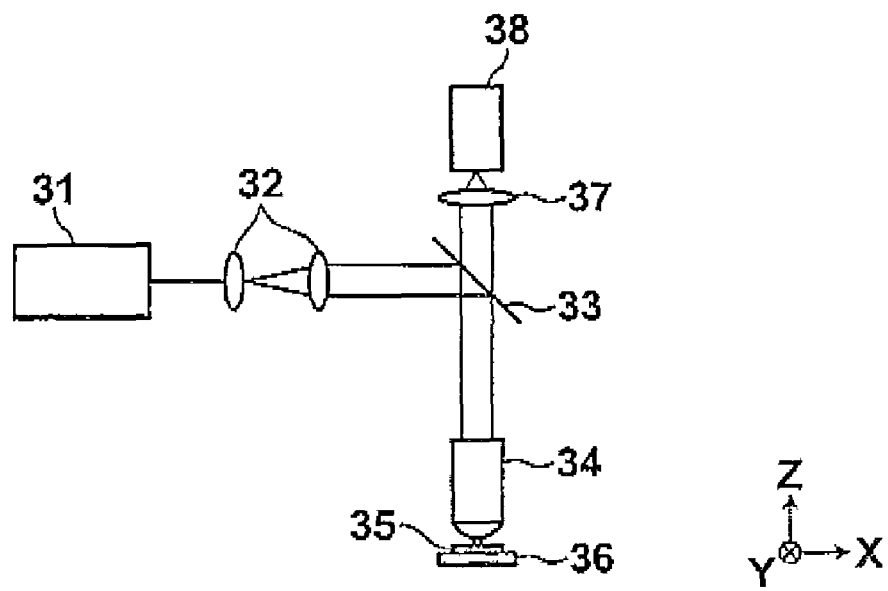
FIG. 31 is a schematic diagram illustrating an embodiment of a nonlinear optical imaging apparatus according to the present invention.

FIG. 31 is a schematic diagram illustrating a nonlinear optical imaging apparatus (multiphoton microscope) in which the mode-locked solid-state laser apparatus according to the present invention is used.

The nonlinear optical imaging apparatus of the present invention obtains a two-dimensional image or a three-dimensional image by detecting fluorescence output from a sample that is placed on a movable stage, the sample containing a substance to be measured that has been marked with a fluorescent marker. The sample is irradiated with excitation light to excite the sample while the condensing position of the excitation light is moved two-dimensionally or three-dimensionally relative to the sample by using the movable stage.

The nonlinear optical imaging apparatus according to the present embodiment includes a movable stage 36, a mode-locked solid-state laser apparatus 31, a lens pair 32, a dichroic mirror 33, an object lens 34, a photo multiplier tube 38 and a lens 37. A sample 35 is mounted on the movable stage 36 and the movable stage 36 moves the sample 35 within the x-y plane and in the depth direction. The mode-locked solid-state laser apparatus 31 is configured as illustrated in FIG. 30, for example. The mode-locked solid-state laser apparatus 31 outputs a pulsed laser beam as excitation light. The lens pair 32 magnifies the pulsed laser beam. The dichroic mirror 33 reflects the pulsed laser beam toward the sample 35 and transmits fluoresce that has been output from the sample 35. The object lens 34 condenses the pulsed laser beam onto the sample 35 and collects the fluorescence that has been output from the sample 35. The photo multiplier tube 38 detects the fluorescence that has been output from the sample 35. The lens 37 condenses the fluorescence onto the photo multiplier tube 38.

The pulsed laser beam output from the mode-locked solid-state laser apparatus 31 is magnified by the lens pair 32. Further, the magnified beam is reflected by the dichroic mirror 33 and irradiates the object lens 34. The pulsed laser beam that has passed through the object lens 34 is condensed onto the sample 35, which is mounted on the movable stage 36, and excites (pumps) the sample 35 by multiphoton absorption. Fluorescence output from the sample 35 is collected by the object lens 34 and transmitted through the dichroic mirror 33. Then, the fluorescence is condensed by the lens 37 onto the photo multiplier tube 38. The movable stage 36 is moved in the direction within the x-y plane and in the depth direction z so that very small regions (micro-regions) are three-dimensionally excited and fluorescence is obtained. Accordingly, three-dimensional imaging can be performed.

In a conventional mode-locked solid-state laser apparatus, which is used as a light source for a conventional nonlinear imaging apparatus, the size of the whole apparatus is large and the internal structure thereof is complex. Therefore, the apparatus is expensive and the output power is not stable. Therefore, there is a problem that the cost of the imaging apparatus becomes high and the quality of obtained images deteriorates. However, the mode-locked solid-state laser apparatus according to the present invention has a small size and can be produced at low cost. Further, the output power of the apparatus according to the present invention is stable. Therefore, if the mode-locked solid-state laser apparatus of the present invention is used as a light source of the nonlinear imaging apparatus, it becomes possible to reduce the cost of the imaging apparatus and to obtain highly accurate (precise) images.

<Design Modification Example of Embodiment of Nonlinear optical Imaging Apparatus>

Figure 32:
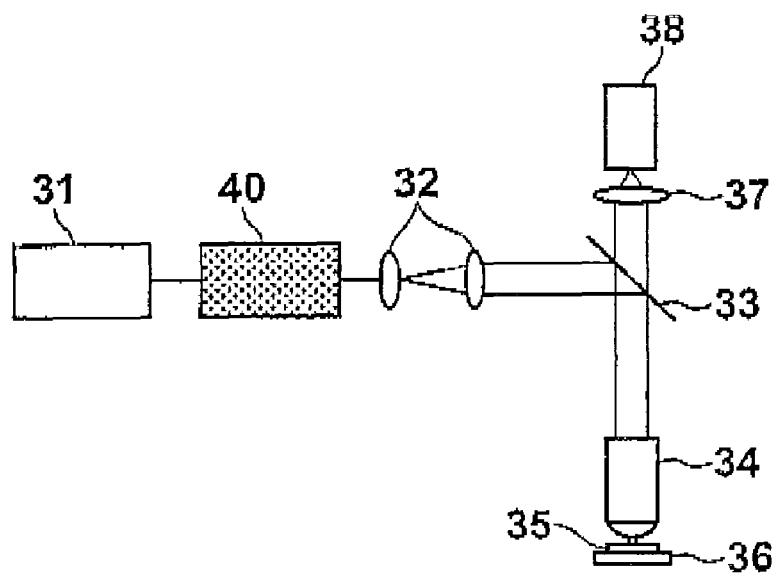
FIG. 32 is a diagram illustrating a design modification example of the embodiment illustrated in FIG. 31.

FIG. 32 is a diagram illustrating a design modification example of the nonlinear optical imaging apparatus illustrated in FIG. 31. In a nonlinear optical imaging apparatus in this design modification example, an optical pulse dispersion compensation apparatus 40 including a pair of negative dispersion mirrors of the present invention is provided in a light path of the pulsed laser beam in the nonlinear optical imaging apparatus illustrated in FIG. 31. The pulsed laser beam that is output from the mode-locked solid-state laser apparatus 31 is reflected by or transmitted through a plurality of optical parts (elements or devices) before the pulsed laser beam is condensed onto the sample 35. At that time, the pulse width of the pulsed laser beam becomes extremely wide because of the group-velocity dispersion (normal positive dispersion) of these optical members (parts). Therefore, the peak power of the pulsed beam laser that is condensed onto the sample 35 becomes low and the intensity of the excitation light becomes low, thereby the intensity of fluorescence becoming low. Consequently, the quality of the obtained images deteriorates in some cases. Therefore, as illustrated in FIG. 32, the optical pulse dispersion compensation apparatus 40 including a pair of negative dispersion mirrors according to the present invention is arranged in the light path of the pulsed bean laser to correct the group-velocity dispersion of the optical members forming the nonlinear optical imaging apparatus in advance. Accordingly, it becomes possible to condense the pulsed laser beam onto the sample at the original pulse width. Therefore, highly accurate imaging becomes possible.

<Optical Pulse Dispersion Compensation Apparatus>

Figure 33:
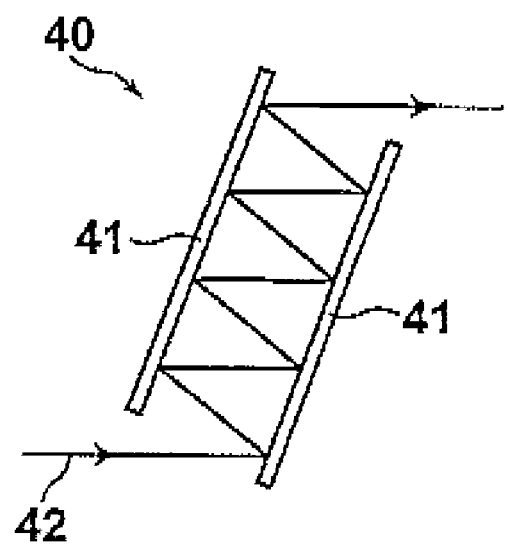
FIG. 33 is a schematic diagram illustrating an embodiment of an optical pulse dispersion compensation apparatus according to the present invention.

FIG. 33 is a schematic diagram illustrating the configuration of an optical pulse dispersion compensation apparatus 40 including a negative dispersion mirror according to the present invention. The optical pulse dispersion compensation apparatus 40 is provided in the aforementioned nonlinear optical imaging apparatus.

The optical pulse dispersion compensation apparatus 40 according to the present embodiment has a structure in which two negative dispersion mirrors 41 are arranged in parallel to each other. In each of the two negative dispersion mirrors 41, a multilayer coating structure according to Design Example 1-1 (or 2-1 or 3-1) is formed on a quartz substrate. In the optical pulse dispersion compensation apparatus 40, pulsed beam laser 42 is reflected multiple times between the negative dispersion mirrors 41. Since the pulsed beam laser 42 is reflected multiple times between the mirrors 41, it is possible to compensate the positive group-velocity dispersion that is generated in the nonlinear optical imaging apparatus.

Specifically, in the nonlinear optical imaging apparatus illustrated in FIG. 31, group-velocity dispersion affecting the pulsed laser beam before the pulsed laser beam is condensed onto the sample 35 is 8000 $fs^2$. Therefore, the pulsed laser beam is reflected eight times by mirrors 41 that have dispersion at $-1000$ $fs^2$ to compensate dispersion. Consequently, it becomes possible to condense the pulsed laser beam onto the sample 35 at a pulse width that is similar to the pulse width of the pulsed laser immediately after being output from the mode-locked solid-state laser apparatus 31. Hence, highly accurate imaging becomes possible.

<Laser Processing Apparatus>

Figure 34:
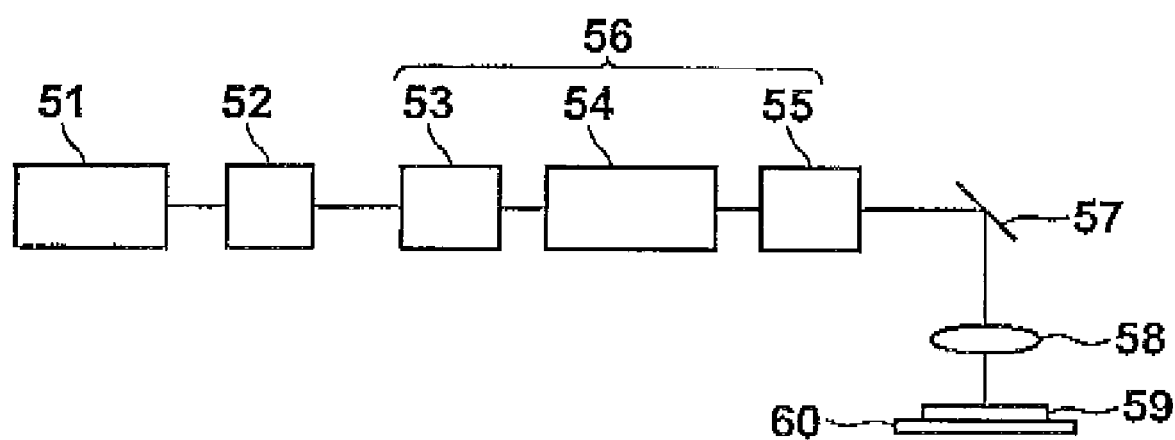
FIG. 34 is a schematic diagram illustrating an embodiment of a laser processing apparatus according to the present invention.

FIG. 34 is a schematic diagram illustrating the configuration of a laser processing apparatus including the mode-locked solid-state laser apparatus according to the present invention as a light source.

The laser processing apparatus according to the present embodiment includes a movable stage 60, a mode-locked solid-state laser apparatus 51, a pulse picker 52, a chirp pulse amplifier 56 including a pulse stretcher 53, a regeneration amplifier 54 and a pulse compressor 55, a mirror 57 and a lens 58. An object 59 to be processed, such as a thin metal film, which is a processing target, is mounted on the movable stage 60 and the movable stage 60 moves the object 59 to he processed within the x-y plane and in the depth direction. The mode-locked solid-state laser apparatus 51 is configured as illustrated in FIG. 30, for example. The mode-locked solid-state laser apparatus 51 outputs a pulsed laser beam as excitation light. The pulse picker 52 converts the pulse repetition frequency of the pulsed laser beam output from the mode-locked solid-state laser apparatus 51. The chirp pulse amplifier 56 compensates dispersion and stretches or compresses a pulse width. The mirror 57 reflects the pulsed laser beam that has entered the mirror 57 through the chirp pulse amplifier 56 and guides the reflected beam onto the object 59 to be processed. The lens 58 condenses the pulsed laser beam onto the object 59 to be processed.

The pulsed laser beam output from the mode-locked solid-state laser apparatus 51 is caused to enter the chirp pulse amplifier 56 including the pulse stretcher 53, the regeneration amplifier 54 that is made of Yb:KYW and the pulse compressor 55 after the pulse repetition frequency is converted to 1 kHz by the pulse picker 52. The pulse stretcher 53 and the pulse compressor 55 are formed by diffraction grating pairs. The diffraction grating pairs control the group-velocity dispersion of the pulse and stretch or compress the pulse width.

Here, a pair of negative dispersion mirrors, each including a substrate and a multilayer coating structure provided on the substrate, according to the present invention may be used instead of the diffraction grating pair. If the pair of negative dispersion mirrors according to the present invention is used, it is possible to stretch or compress the pulse width with lower power loss than the power loss that occurs when the diffraction grating pair is used. Further, it is possible to reduce the size of the apparatus compared with the size of the apparatus including the diffraction grating pair. As described above, the negative dispersion mirror according to the present invention may be used as a negative dispersion device (element) to compensate dispersion in an apparatus including an optical system, in which an increase in the pulse width of the pulsed laser beam induced by an increase in positive group-velocity dispersion may cause a problem.

The pulse width of the pulsed laser beam output from the mode-locked solid-state laser apparatus 51 is greatly stretched by the pulse stretcher 53, for example, from 250 fs to 100 ps. Then, the pulse energy of the pulsed laser beam is amplified to 5 mJ by the regeneration amplifier 54 that is made of Yb:KYW. Then, the pulse is compressed to 300 fs by the pulse compressor 55. Consequently, a pulsed laser beam with peak power of 16 GW can he obtained. The pulsed laser beam output from the chirp pulse amplifier 56 is condensed onto the object 59 to be processed, which is a thin metal film, on the movable stage 60. Accordingly, highly accurate micro-perforation (micro-drilling) can be performed.

The whole size of the conventional mode-locked solid-state laser apparatus that is used as the light source of the conventional laser processing apparatus is large compared with that of the mode-locked solid-state laser apparatus according to the present invention. Further, the internal structure of the conventional mode-locked solid-state laser apparatus is complex. Therefore, the conventional apparatus is expensive and the output power of the conventional apparatus is not stable. Therefore, there has been a problem that the cost of the laser processing apparatus becomes high and the accuracy of processing deteriorates. In contrast, the mode-locked solid-state laser apparatus according to the present invention has a small size, low cost and highly stable output power. Therefore, if the mode-locked solid-state laser apparatus according to the present invention is used in the laser processing apparatus, it is possible to reduce the cost of the laser processing apparatus and to perform highly accurate processing.

What is claimed is:

1. A negative dispersion mirror comprising:
    a substrate; and
    a dielectric multilayer coating structure formed on the substrate, the dielectric multilayer coating structure including
        two mirror-function layer portions, each formed by a plurality of layers deposited one on another, and
        a cavity layer that is arranged between the two mirror-function layer portions, and which causes light having a predetermined wavelength to resonate between the two mirror-function layer portions, and wherein a dispersion value with respect to the light having the predetermined wavelength is in the range of $-600$ fs$^2$ to $-3000$ fs$^2$ and a reflectance with respect to the light having the predetermined wavelength is in the range of 97% to 99.5%,
    wherein each of the mirror-function layer portions is formed by layers having a relatively high refractive index and layers having a relatively low refractive index that are alternately deposited one on another,
    the total number of the deposited layers in each of the mirror-function layer portions is greater than or equal to eight; and
    wherein the number of layers of the mirror-function portion arranged in a substrate side is less than that of the mirror-function portion arranged in an incident side.

2. A negative dispersion mirror, as defined in claim 1, wherein the substrate has a concave surface, and wherein the multilayer coating structure is formed on the concave surface.

3. A negative dispersion mirror, as defined in claim 1, wherein the predetermined wavelength has a bandwidth that is greater than or equal to 10 nm.

4. A negative dispersion mirror, as defined in claim 1, wherein the center wavelength of the predetermined wavelength is in the range of 1000 nm to 1100 nm.

5. A negative dispersion mirror, as defined in claim 1, wherein the center wavelength of the predetermined wavelength is in the range of 700 nm to 900 nm.

6. A negative dispersion mirror, as defined in claim 1, wherein when the center wavelength of the predetermined wavelength is $\lambda$, the optical thickness of the cavity layer is greater than or equal to $\lambda/2$.

7. A negative dispersion mirror, as defined in claim 1, wherein when the center wavelength of the predetermined wavelength is $\lambda$, the optical thickness of each layer forming the mirror-function layer portions is greater than or equal to $\lambda/8$ and less than $\lambda/2$.

8. An optical pulse dispersion compensation apparatus, comprising:
    at least two negative dispersion mirrors, each including
        a substrate, and
        a dielectric multilayer coating structure formed on the substrate, the multilayer coating structure including
            two mirror-function layer portions, each formed by a plurality of layers deposited one on another, and
            a cavity layer that is arranged between the two mirror-function layer portions, and which causes light having a predetermined wavelength to resonate between the two mirror-function layer portions, wherein the dispersion value of each of the negative dispersion mirrors with respect to the light having the predetermined wavelength is in the range of −600 fs$^2$ to −3000 fs$^2$ and the reflectance of each of the negative dispersion mirrors with respect to the light having the predetermined wavelength is in the range of 97% to 99.5%, the negative dispersion mirrors are arranged in such a manner that the multilayer coating structures thereof face each other, each of the mirror-function layer portions is formed by layers having a relatively high refractive index and layers having a relatively low refractive index that are alternately deposited one on another, the total number of the deposited layers in each of the mirror-function layer portions is greater than or equal to eight; and wherein the number of layers of the mirror-function portion arranged in a substrate side is less than that of the mirror-function portion arranged in an incident side.

9. A negative dispersion mirror comprising:
a substrate; and
a dielectric multilayer coating structure formed on the substrate, wherein a dispersion value with respect to light having a predetermined wavelength is in the range of −100 fs$^2$ to −1000 fs$^2$ and a reflectance with respect to the light having the predetermined wavelength is in the range of 97% to 99.5%, and wherein the multilayer coating structure is formed by layers that have a relatively high refractive index and layers that have a relatively low refractive index that are alternately deposited one on another, and wherein when the center wavelength of the predetermined wavelength is λ, the optical thickness of each of the layers randomly changes in the range of λ/8 to λ/2 for all layers of the multilayer coating structure.

10. A negative dispersion mirror, as defined in claim 9, wherein the substrate has a concave surfaces and wherein the multilayer coating structure is formed on the concave surface.

11. A negative dispersion mirrors as defined in claim 9, wherein the predetermined wavelength has a bandwidth that is greater than or equal to 10 nm.

12. A negative dispersion mirror, as defined in claim 9, wherein the center wavelength of the predetermined wavelength is in the range of 1000 nm to 1100 nm.

13. A negative dispersion mirror, as defined in claim 9, wherein the center wavelength of the predetermined wavelength is in the range of 700 nm to 900 nm.

14. An optical pulse dispersion compensation apparatus comprising:
at least two negative dispersion mirrors, each including a substrate and a dielectric multilayer coating structure formed on the substrate, and wherein the negative dispersion mirrors have dispersion values in the range of −100 fs$^2$ to −1000 fs$^2$ and reflectances in the range of 97% to 99.5% with respect to light having a predetermined wavelength, and wherein the multilayer coating structure is formed by layers that have a relatively high refractive index and layers that have a relatively low refractive index that are alternately deposited one on another, and wherein when the center wavelength of the predetermined wavelength is λ, the optical thickness of each of the layers randomly changes in the range of λ/8 to λ/2 for all layers of the multilayer coating structure, and wherein the negative dispersion mirrors are arranged in such a manner that the multilayer coating structures thereof face each other.

* * * * *